(12) United States Patent
Miyasaka

(10) Patent No.: US 7,349,559 B2
(45) Date of Patent: Mar. 25, 2008

(54) FINGERPRINT VERIFICATION METHOD AND FINGERPRINT VERIFICATION DEVICE

(75) Inventor: Mitsutoshi Miyasaka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 809 days.

(21) Appl. No.: 10/738,050

(22) Filed: Dec. 18, 2003

(65) Prior Publication Data

US 2004/0184642 A1 Sep. 23, 2004

(30) Foreign Application Priority Data

Dec. 27, 2002 (JP) .............................. 2002-381112

(51) Int. Cl.
*G06K 9/22* (2006.01)

(52) U.S. Cl. ..................... 382/124; 382/125; 382/190

(58) Field of Classification Search ......... 382/124–127
See application file for complete search history.

(56) References Cited

U.S. PATENT DOCUMENTS

| 2002/0049908 A1 | 4/2002 | Shimosato et al. |
| 2002/0168093 A1 | 11/2002 | Sanders et al. |

FOREIGN PATENT DOCUMENTS

| CN | 1195830 A | 10/1998 |
| EP | 0 862 131 A2 | 9/1998 |
| EP | 1 093 079 A2 | 4/2001 |
| JP | 56-024675 A | 3/1981 |
| JP | 60-221879 A | 11/1985 |
| JP | 01-131978 A | 5/1989 |
| JP | A 06-187089 | 7/1994 |
| JP | A 10-161628 | 6/1998 |
| JP | A-10-240932 | 9/1998 |
| JP | A 2000-148376 | 5/2000 |
| JP | A-2001-118065 | 4/2001 |
| JP | A 2002-101092 | 4/2002 |
| JP | A 2003-254706 | 9/2003 |

OTHER PUBLICATIONS

Mital, D. P et al., "An automated matching technique for fingerprint identification," May 21-23, 1997, IEEE, vol. 1, pp. 142-147.*
U.S. Appl. No. 10/375,111, filed Feb. 28, 2003, Miyasaka.
Chez, Z. "A Topology-Based Matching Algorithm for Fingerprint Authentication." *IEEE 1991* pp. 84-87.
Mital, Dinesh P. "An Automated Matching Technique for Fingerprint Identification." *IEEE 1997* pp. 142-147.

* cited by examiner

*Primary Examiner*—Jingge Wu
*Assistant Examiner*—John W Lee
(74) *Attorney, Agent, or Firm*—Oliff & Berridge, PLC

(57) ABSTRACT

A fingerprint verification method includes extracting $N_D$ sample feature points from a fingerprint image that has been sampled, assigning sample numerical values to each of the sample feature points as sample numerical value information. The sample numerical values are obtained from a plurality of sample connection lines, which connect each of the sample feature points with $L_D$ close sample feature points, which are close to each of the sample feature points. Based on results of comparison between the sample numerical value information and registration numerical value information, which is registration numerical values assigned to each of $N_R$ registration feature points, associating m sample feature points among the $N_D$ sample feature points with m registration feature points among the $N_R$ registration feature points. A position relationship among the m sample feature points is compared with a position relationship among the m registration feature points.

18 Claims, 36 Drawing Sheets

FINGERPRINT IMAGE ACQUISITION REGION

| SAMPLE FEATURE POINT | SAMPLE NUMERICAL VALUE INFORMATION |
|---|---|
| $B_i$ | $(L_{i1 \cdot i}, L_{i2}, L_{i3 \cdot i})$ |

| SAMPLE FEATURE POINT | SAMPLE NUMERICAL VALUE INFORMATION |
|---|---|
| Ti | ( −Li1 , Li2·i , −Li3 ) |

FEATURE POINT EXTRACTION REGION

FIG. 13

| SAMPLE FEATURE POINT | SAMPLE NUMERICAL VALUE INFORMATION | | | | COINCIDENCE REGISTRATION POINT | | | |
|---|---|---|---|---|---|---|---|---|
| TD1 | 15i | 18i | 20i | ✕ | TR1,TR3 | TR6 | TR7 | ✕ |
| TD2 | -19 | -16 | 24i | 31i | TR4,(TR5) | | (TR5) | (TR5),TR6 |
| TD3 | 20i | 13i | -6 | -20 | TR7 | | | |
| TD4 | 11i | 22i | -6 | -16 | | TR3 | | ✕ |
| BD1 | 12 | 22i | 12 18i | ✕ | (BR9),BR10 (BR18),BR19 | (BR9) | (BR18) | |
| BD2 | 20i | 12 18i | 18 | 4 | (BR18) | BR9,BR10 (BR18),BR19 | (BR18) | |
| BD3 | 15i | 18i | 17 | 15 | BR2,BR8 | BR18 | BR4,BR6 | ✕ |
| BD4 | 4 | 15 | 31 | ✕ | | BR10,BR11 BR13,BR14 | | |
| BD5 | 18 | 24i | 17 | 31i | BR4,BR6 | BR17 | BR16,BR17 | ✕ |
| BD6 | 31 | 17 31i | | | | (BR16),BR17 | (BR16),BR19 | BR10,BR11 BR13,BR14 |

SAMPLE NUMERICAL VALUE

ERROR VALUE

FIG. 16

| SAMPLE FEATURE POINT | SAMPLE NUMERICAL INFORMATION | | | | | COINCIDENCE REGISTRATION POINT | | | | | | | |
|---|---|---|---|---|---|---|---|---|---|---|---|---|---|
| TD1 | 15i | -26 | 20i | 30i | | TR1,TR3 | TR5,(TR7) | (TR7) | TR4,(TR7) | | | | |
| TD2 | -26 | (33i) | 24i | 31i | 37i | 25i | TR5,TR7 | | (TR5) | (TR5) | (TR5) | | |
| BD1 | 12 | 37i | 30i | | | | BR9,BR10 BR18,(BR19) | (BR19) | (BR13,BR19) | | | | |
| BD2 | 20i | 12 | 25i | | | | (BR18) | BR9,BR10 (BR18),BR19 | (BR18) | | | | |
| BD3 | 15i | (33i) | 18 | 35 | | | BR2,BR8 | | | BR4,BR6 | BR13,BR15 | | |
| BD5 | 18 | 24i | 17 | | | | BR4,BR6 | (BR17) | BR16,(BR17) | | | | |
| BD6 | 35 | 17 | 31i | | | | BR13,BR15 | (BR16),BR17,BR19 | (BR16),BR19 | | | | |

| SAMPLE FEATURE POINT | SAMPLE NUMERICAL VALUE INFORMATION |
|---|---|
| $P_i$ | ($L_{i1}$, $L_{i2}$, $L_{i3}$) |

| SAMPLE FEATURE POINT | SAMPLE NUMERICAL VALUE INFORMATION |
|---|---|
| $P_i$ | ( $\theta_{i12}$ , $\theta_{i23}$ , $\theta_{i31}$ ) |

| SAMPLE FEATURE POINT | SAMPLE NUMERICAL VALUE INFORMATION |
|---|---|
| $P_i$ | ( $L_{i1}$, $L_{i2}$, $L_{i3}$, $\theta_{i12}$, $\theta_{i23}$, $\theta_{i31}$ ) |

| SAMPLE FEATURE POINT | SAMPLE NUMERICAL VALUE INFORMATION |
|---|---|
| $P_i$ | $IP_{i12} = L_{i1} \cdot L_{i2} \cdot \cos\theta_{i12}$ |
|  | $IP_{i23} = L_{i2} \cdot L_{i3} \cdot \cos\theta_{i23}$ |
|  | $IP_{i31} = L_{i3} \cdot L_{i1} \cdot \cos\theta_{i31}$ |

| SAMPLE FEATURE POINT | SAMPLE NUMERICAL VALUE INFORMATION |
|---|---|
| $P_i$ | (a, b, c) |

| SAMPLE FEATURE POINT | SAMPLE NUMERICAL VALUE INFORMATION |
|---|---|
| $P_i$ | ( $a, b, c, \theta_{i12}, \theta_{i23}, \theta_{i31}$ ) |

| SAMPLE FEATURE POINT | SAMPLE NUMERICAL VALUE INFORMATION |
|---|---|
| $P_i$ | $IP_{i12} = a \cdot b \cdot \cos \theta_{i12}$ <br> $IP_{i23} = b \cdot c \cdot \cos \theta_{i23}$ <br> $IP_{i31} = c \cdot a \cdot \cos \theta_{i31}$ |

| SAMPLE FEATURE POINT | SAMPLE NUMERICAL VALUE INFORMATION |
|---|---|
| $B_i$ | ( $\theta_{i12 \cdot i}$ , $\theta_{i23 \cdot i}$ , $-\theta_{i31}$ ) |

| SAMPLE FEATURE POINT | SAMPLE NUMERICAL VALUE INFORMATION |
|---|---|
| $B_i$ | ( $L_{i1\cdot i}$, $L_{i2}$, $L_{i3\cdot i}$, $\theta_{i12\cdot i}$, $\theta_{i23\cdot i}$, $-\theta_{i31}$ ) |

| SAMPLE FEATURE POINT | SAMPLE NUMERICAL VALUE INFORMATION |
|---|---|
| $B_i$ | $IIP_{i12} = L_{i1 \cdot i} \cdot L_{i2} \cdot \cos\theta_{i12}$<br>$IIP_{i23} = L_{i2} \cdot L_{i3 \cdot i} \cdot \cos\theta_{i23}$<br>$IIP_{i31} = L_{i3 \cdot i} \cdot L_{i1 \cdot i} \cdot \cos\theta_{i31}$ |

| SAMPLE FEATURE POINT | SAMPLE NUMERICAL VALUE INFORMATION |
|---|---|
| $B_i$ | ( $a \cdot i$ , $b$ , $c \cdot i$ ) |

| SAMPLE FEATURE POINT | SAMPLE NUMERICAL VALUE INFORMATION |
|---|---|
| Ti | ( -a , b·i , -c ) |

| SAMPLE FEATURE POINT | SAMPLE NUMERICAL VALUE INFORMATION |
|---|---|
| $B_i$ | $IIP_{i12} = a \cdot i \cdot b \cdot \cos \theta_{i12}$ <br> $IIP_{i23} = b \cdot c \cdot i \cdot \cos \theta_{i23}$ <br> $IIP_{i31} = c \cdot i \cdot a \cdot i \cdot \cos \theta_{i31}$ |

US 7,349,559 B2

FINGERPRINT VERIFICATION METHOD AND FINGERPRINT VERIFICATION DEVICE

Japanese Patent Application No. 2002-381112, filed on Dec. 27, 2002, is hereby incorporated by reference in its entirety.

BACKGROUND OF THE INVENTION

The present invention relates to a fingerprint verification method and a fingerprint verification device.

In the field for which security protection is required, such as electronic payment, there may be a case where authentication processing using a fingerprint is performed for authenticating an individual. In the authentication processing, a fingerprint image is captured, for example. In this case, security protection can be improved by using a secret key and a public key which make a pair using program processing, and verifying the fingerprint using an image obtained by decoding the encoded fingerprint image.

Feature (minutiae) points can be extracted from the captured fingerprint image. The feature points of the fingerprint image are branch (bifurcation) points and terminal (end) points of the ridges of the fingerprint, for example. The distribution of the feature points differs depending on the fingerprint. Therefore, an individual can be authenticated by fingerprint verification processing which compares the positions of the extracted feature points with the positions of the feature points registered in advance.

BRIEF SUMMARY OF THE INVENTION

One aspect of the present invention relates to a fingerprint verification method using a fingerprint image, the method comprising:

extracting $N_D$ sample feature points ($N_D$ is an integer greater than or equal to four) from a fingerprint image that has been sampled;

assigning a sample numerical values to each of the sample feature points as sample numerical value information, the sample numerical values being obtained from a plurality of sample connection lines, which connect each of the sample feature points with $L_D$ close sample feature points ($2 \leq L_D \leq N_D - 1$, $L_D$ is an integer) which are close to each of the sample feature points;

based on results of comparison between the sample numerical value information and registration numerical value information which is registration numerical values assigned to each of $N_R$ registration feature points ($N_R$ is an integer greater than or equal to four), associating m sample feature points ($3 \leq m \leq N_D$ and $3 \leq m \leq N_R$, m is an integer) among the $N_D$ sample feature points with m registration feature points among the $N_R$ registration feature points; and comparing a position relationship among the m sample feature points with a position relationship among the m registration feature points.

Another aspect of the present invention relates to a fingerprint verification method using a fingerprint image, the method comprising:

extracting $N_D$ sample feature points ($N_D$ is an integer greater than or equal to four) from a fingerprint image that has been sampled;

assigning a sample numerical values to each of the sample feature points as sample numerical value information, the sample numerical values being obtained from a plurality of sample connection lines, which connect each of the sample feature points with $L_D$ close sample feature points ($2 \leq L_D \leq N_D - 1$, $L_D$ is an integer) which are close to each of the sample feature points;

comparing each of sample numerical values assigned to each of the sample feature points with each of registration numerical values assigned to each of $N_R$ registration feature points ($N_R$ is an integer greater than or equal to four), and assigning one registration feature point among the $N_R$ registration feature points to one sample numerical value among the sample numerical values which coincides with one registration numerical value among the registration numerical values, the one registration numerical value being assigned to the one registration feature point;

associating the m sample feature points ($3 \leq m \leq N_D$ and $3 \leq m \leq N_R$, m is an integer) with the m registration feature points, respectively, using the registration feature points assigned to the sample numerical values; and comparing a position relationship among the m sample feature points with a position relationship among the m registration feature points.

A further aspect of the present invention relates to a fingerprint verification device comprising:

a feature point extraction section which extracts $N_D$ sample feature points ($N_D$ is an integer greater than or equal to four) from a fingerprint image;

an image analysis section which assigns a sample numerical values to each of the sample feature points as sample numerical value information, the sample numerical values being obtained from a plurality of sample connection lines, which connect each of the sample feature points with $L_D$ close sample feature points ($2 \leq L_D \leq N_D - 1$, $L_D$ is an integer) which are close to each of the sample feature points, and based on results of comparison between the sample numerical value information and registration numerical value information which is registration numerical values assigned to each of $N_R$ registration feature points ($N_R$ is an integer greater than or equal to four), associates m sample feature points ($3 \leq m \leq N_D$ and $3 \leq m \leq N_R$, m is an integer) among the $N_D$ sample feature points with m registration feature points among the $N_R$ registration feature points; and a comparison section which compares a position relationship among the m sample feature points with a position relationship among the m registration feature points.

BRIEF DESCRIPTION OF THE SEVERAL VIEWS OF THE DRAWING

FIG. 13 is a diagram illustrating results for first comparison processing.

FIG. 16 is a diagram illustrating results for second comparison processing.

DETAILED DESCRIPTION OF THE EMBODIMENT

Embodiments of the present invention are described below. Note that the embodiments described hereunder do not in any way limit the scope of the invention defined by the claims laid out herein. Note also that all of the elements described below should not be taken as essential requirements for the present invention.

In the verification processing using the feature points of the fingerprint image, it is necessary to search for the area and the direction in the distribution of the registration feature points to which the feature points correspond, and to judge whether or not the distribution of the feature points coincides with the distribution of the registration feature points. However, in the case of using the secret key and the public key, management of the keys used for encoding and decoding is complicated. Moreover, since the fingerprint verification processing necessary for authenticating the genuine person is performed in addition to the image decode processing, the processing load is increased. In the fingerprint verification processing, it is necessary to perform processing for associating the feature points extracted from the captured fingerprint image with the characteristic feature points registered in advance for authenticating an individual. In the case of taking application to a portable information instrument such as an IC card into consideration, it is preferable that the verification processing be performed while reducing the processing load as much as possible.

According to the following embodiments, a fingerprint verification method and a fingerprint verification device capable of performing the fingerprint verification processing while reducing the processing load can be provided.

The embodiments of the present invention are described below in detail with reference to the drawings.

1. Fingerprint Verification Method

Figure 1:
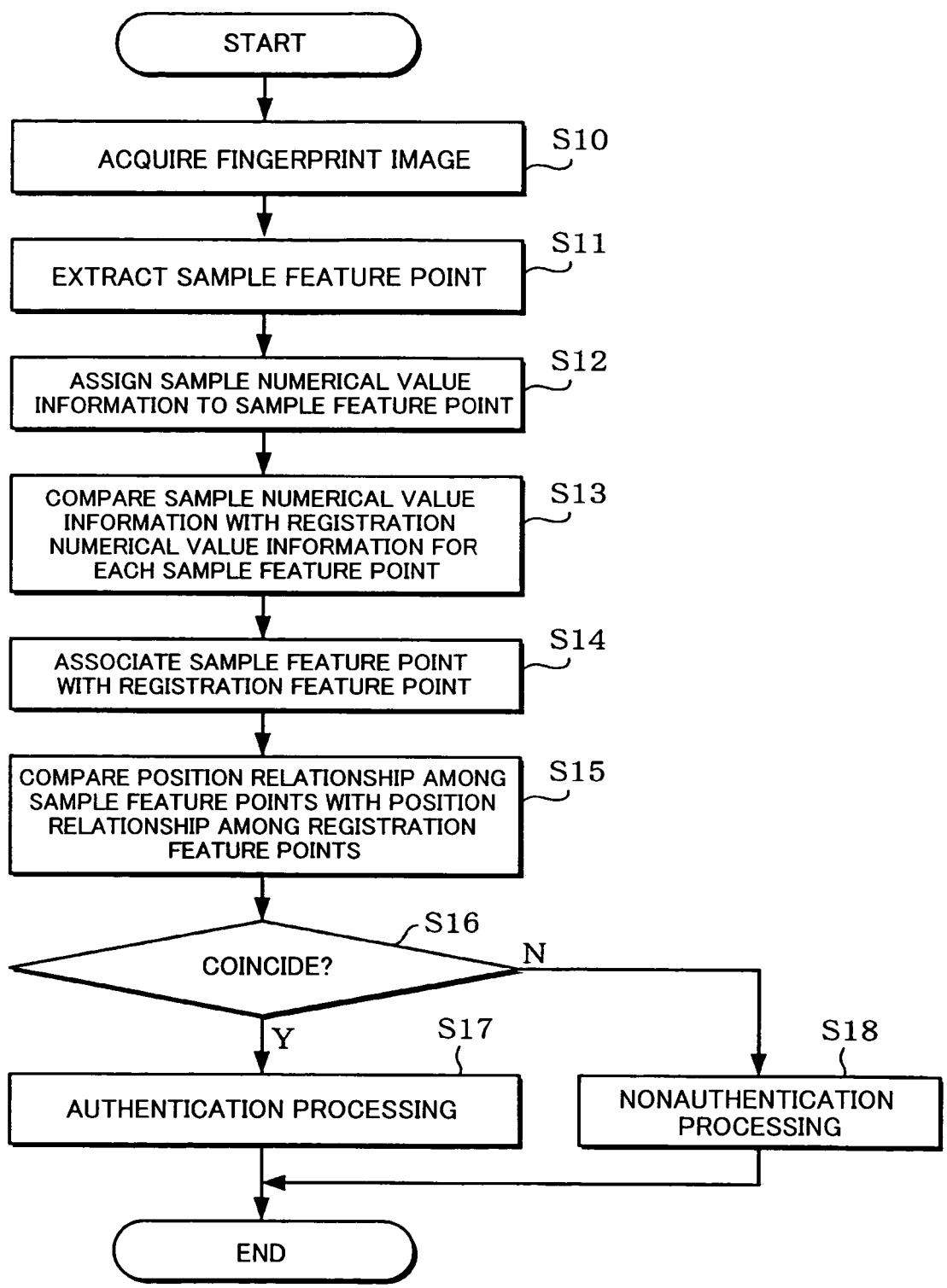
FIG. 1 is a flowchart showing an outline of a flow of fingerprint verification processing.

FIG. 1 shows an outline of a flow of fingerprint verification processing according to the following embodiments. In the fingerprint verification processing described below, a fingerprint is verified by using a fingerprint image acquired. First, a fingerprint image is acquired (step S10). $N_D$ feature points (sample feature points) ($N_D$ is an integer greater than or equal to four) are extracted from the acquired fingerprint image (step S11).

Figure 2:
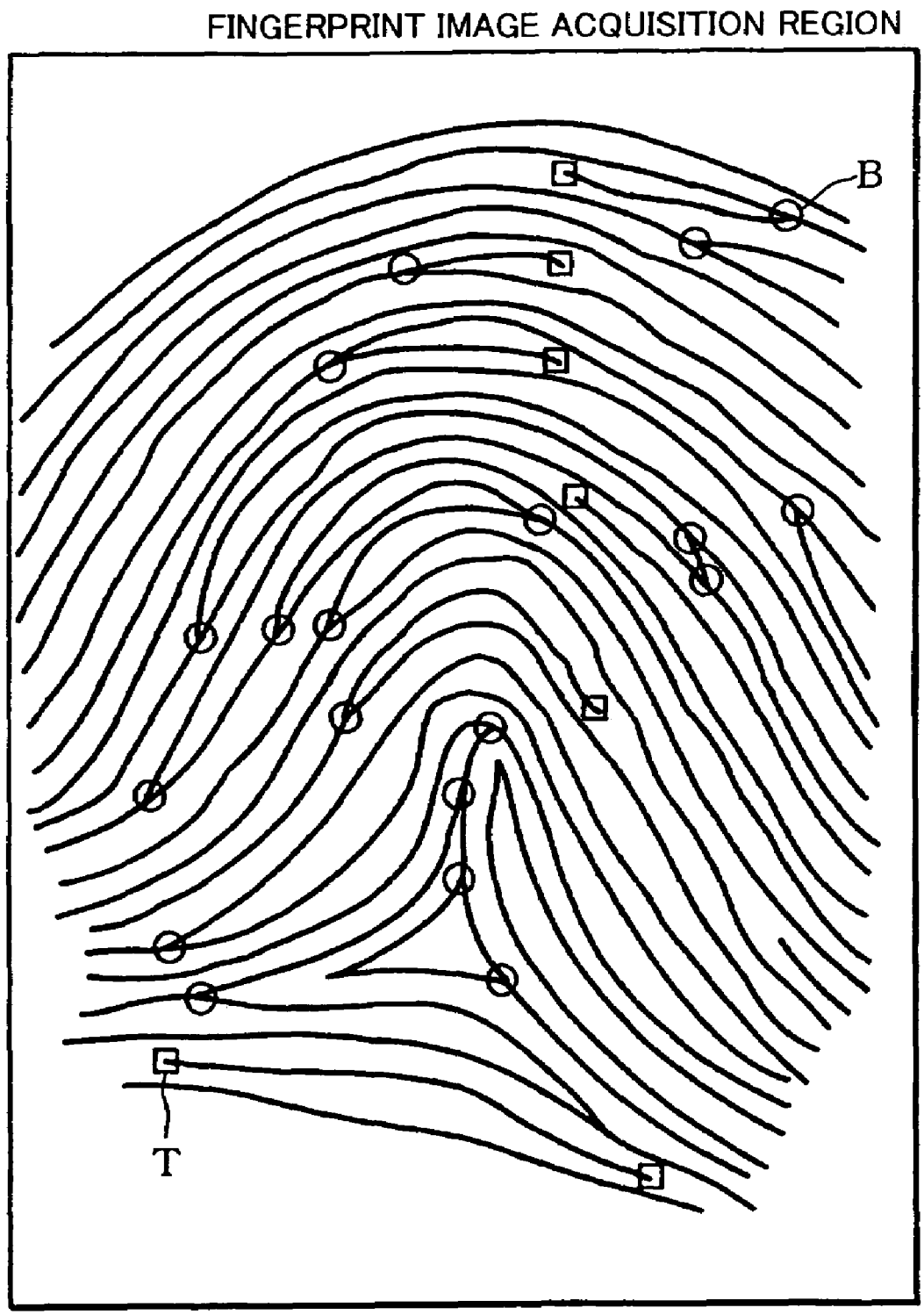
FIG. 2 is a diagram illustrating feature points extracted from a fingerprint image.

FIG. 2 illustrates the feature points extracted from the fingerprint image. In FIG. 2, the fingerprint image shows the pattern of the ridges (projections) of the fingerprint. The fingerprint image has feature points. The feature points consist of branch points B and terminal points T. The branch point B of the fingerprint image is a portion at which the ridge of the fingerprint branches off into at least two ridges. The terminal point T of the fingerprint image is a portion at which the ridge of the fingerprint ends.

Since the patterns of the fingerprints are not identical, the distribution of the branch points or the terminal points differs depending on individuals. Therefore, if the branch points or the terminal points of the fingerprint image can be determined, it suffices to merely compare the distributions of the determined branch points or terminal points. This reduces the amount of information to be compared, whereby the load of comparison processing can be reduced.

The description is given below with reference to FIG. 1. Sample numerical value information is assigned to each of the extracted sample feature points (step S12). The sample numerical value information is obtained from a plurality of line segments (sample connection lines) which connect the sample feature point with $L_D$ sample feature points ($2 \leq L_D \leq N_D-1$, $L_D$ is an integer) close to the sample feature point (close sample feature points). The close sample feature points close to the sample feature point may be referred to as $L_D$ other sample feature points called a first close sample feature point, a second close sample feature point, . . . , and an $L_D$th close sample feature point in the order of closeness to the sample feature point. $L_D$ is ideally three or four. In order to further increase accuracy of verification, $L_D$ may be set at five. $L_D$ may be set at two in order to simplify the processing.

Before performing the verification processing, registration numerical value information is assigned to each of $N_R$ feature points (registration feature points) ($N_R$ is an integer greater than or equal to four) of a fingerprint image of an individual to be authenticated. The sample numerical value information assigned to each of the extracted sample feature points is compared with the registration numerical value information (step S13), and m sample feature points ($3 \leq m \leq N_D$, m is an integer) and m registration feature points between which the numerical value information coincides at a percentage equal to or higher than a given percentage are respectively associated (step S14). The position relationship among the m sample feature points is compared with the position relationship among the m registration feature points (step S15).

If it is judged that the position relationship among the m sample feature points coincides with the position relationship among the m registration feature points associated in the step S14 as a result of comparison (step S16: Y), the fingerprint image acquired in the step S10 is judged to be the fingerprint image of the registered genuine person, whereby authentication processing is performed (step S17). In the authentication processing, indication to the effect that the fingerprint image is the fingerprint image of the registered genuine person is displayed.

If it is judged that the position relationship among the m sample feature points does not coincide with the position relationship among the m registration feature points in the step S16 (step S16: N), the fingerprint image is judged not to be the fingerprint image of the registered genuine person, whereby nonauthentication processing is performed (step S18). In the nonauthentication processing, indication to the effect that the fingerprint image is not the fingerprint image of the registered genuine person is displayed.

In the fingerprint verification processing shown in FIG. 1, the sample numerical value information is compared with the registration numerical value information for each of the $N_D$ sample feature points, and the m sample feature points are associated with the m registration feature points based on the comparison results. Specifically, the number of sample feature points to be compared with the registration feature points is reduced. The position relationship among the sample feature points to be compared is compared with the position relationship among the registration feature points which are associated with the sample feature points and used to authenticate an individual. This makes it unnecessary to compare all the sample feature points with the registration feature points, whereby the feature points can be compared while reducing the processing load. Moreover, occurrence of a contingent incident in which another person is authenticated as the genuine person merely by the comparison of the numerical value information can be eliminated, whereby fingerprint verification in which a high degree of security is maintained can be realized.

In the case where the number "m" of combination of the feature points associated based on the comparison between the sample numerical value information and the registration numerical value information is three or more, the position relationships are compared between at least three sample feature points and at least three registration feature points. Therefore, a mistake in which the comparison results accidentally coincide is eliminated. In the case where m is two, since only coincidence between the line segments can be verified, the possibility of occurrence of accidental coincidence cannot be ignored. However, in the case where m is three, since the comparison is carried out on condition that triangles are congruent, the possibility of occurrence of accidental coincidence is considerably reduced.

It is ideal that m is four. It is preferable that the authentication processing be performed if it is judged that the position relationship among at least four sample feature points coincides with the position relationship among the registration feature points of the same number. This means that four triangles formed by the sample feature points are respectively congruent with four triangles formed by the registration feature points. Therefore, the possibility of occurrence of accidental coincidence can be almost completely eliminated.

The "position relationships coincide" means that $_mC_3$ triangles formed by the m sample feature points are respectively congruent with $_mC_3$ triangles formed by the corresponding m sample feature points.

The verification processing using the feature points of the fingerprint image is described below in more detail.

1.1 First Embodiment

In the first embodiment, the numerical value information including a complex line segment length, which is newly defined, is assigned to each of the extracted feature points (sample feature points or registration feature points). The complex line segment length is expressed by the product of a real number unit value (1) or an imaginary number unit value (i) assigned to each of the end points of the line segment (connection line) and the length of the line segment (connection line). Therefore, numerical value information expressed by a real number (positive number or negative number) or a complex number is assigned to each of the extracted feature points. This enables the numerical value information corresponding to the position relationship between each of the feature points and other feature points to be assigned to each of the feature points, whereby the information characteristic of the feature point can be assigned to each of the feature points. Moreover, the distribution of the extracted feature points is specified by the numerical value information group expressed by a real number or a complex number. Therefore, even if the lengths of the line segments which connect the feature point with different feature points are the same, different pieces of numerical value information can be assigned to the feature point if the types of the feature points on the ends differ. This means that the comparison results for the feature points can be obtained with high accuracy.

Figures 3A, 3B:
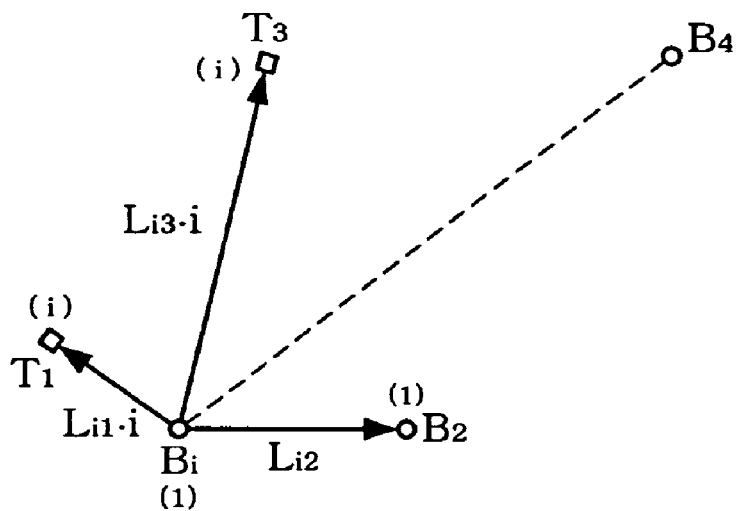
FIGS. 3A and 3B are diagrams illustrating numerical value information assigned to a branch point in a first embodiment.

FIGS. 3A and 3B illustrate the numerical value information assigned to a branch point in the first embodiment. The following description illustrates the sample numerical value information assigned to the sample feature point in the case where the sample feature point is a branch point. However, the same description applies to the registration numerical value information assigned to the registration feature point in the case where the registration feature point is a branch point.

In FIG. 3A, four sample feature points (first to fourth close sample feature points) among a plurality of extracted sample feature points are shown in the order of closeness to one sample feature point. The sample feature point is a branch point $B_i$, the first close sample feature point is a terminal point $T_1$, the second close sample feature point is a branch point $B_2$, the third close sample feature point is a terminal point $T_3$, and the fourth close sample feature point is a branch point $B_4$. In the case where the connection processing is performed between the sample feature point and the first to third close sample feature points, the sample feature point $B_i$ is the starting point (end point) of three line segments (sample connection lines) which respectively connect the sample feature point $B_i$ with the sample feature points $T_1$, $B_2$, and $T_3$.

The real number unit value (1) is assigned to the sample feature points $B_i$ and $B_2$ which are branch points. The imaginary number unit value (i) is assigned to the sample feature points $T_1$ and $T_3$ which are terminal points. The sample numerical value is calculated for each of the three sample connection lines which connect the sample feature point $B_i$ as the starting point with other sample feature points. In FIG. 3A, the sample numerical values are calculated for the sample connection lines which connect the sample feature point $B_i$ as the starting point with the first to third close sample feature points. The sample numerical value is the product of the real number unit value or the imaginary number unit value assigned to the sample feature points located on each end of the sample connection line and the length of the sample connection line. As a result, a sample numerical value group calculated for the three sample connection lines is assigned to the sample feature point $B_i$ as the sample numerical value information ($L_{i1}$·i, $L_{i2}$, $L_{i3}$·i), as shown in FIG. 3B.

The complex line segment length "$L_{i1}$·i" is a value corresponding to the length $L_{i1}$ of the sample connection line which connects the sample feature point $B_i$ to which the real number unit value is assigned with the terminal point $T_1$ to which the imaginary number unit value is assigned. The complex line segment length "$L_{i2}$" is a value corresponding to the length $L_{i2}$ of the sample connection line which connects the sample feature point $B_i$ to which the real number unit value is assigned with the branch point $B_2$ to which the real number unit value is assigned. The complex line segment length "$L_{i3}$·i" is a value corresponding to the length $L_{i3}$ of the sample connection line which connects the sample feature point $B_i$ to which the real number unit value is assigned with the terminal point $T_3$ to which the imaginary number unit value is assigned.

As described above, the numerical value information corresponding to the position relationship between the sample feature point $B_i$ and other sample feature points can be assigned to the sample feature point $B_i$, whereby the information characteristic of the sample feature point can be assigned.

Figures 4A, 4B:
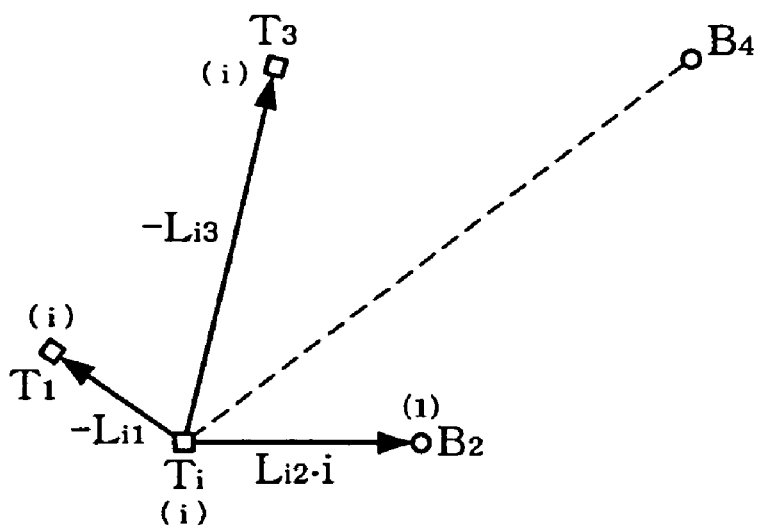
FIGS. 4A and 4B are diagrams illustrating numerical value information assigned to a terminal point in the first embodiment.

FIGS. 4A and 4B illustrate the numerical value information assigned to a terminal point in the first embodiment. The following description illustrates the sample numerical value information assigned to the sample feature point in the case where the sample feature point is a terminal point. However, the same description applies to the registration numerical value information assigned to the registration feature point in the case where the registration feature point is a terminal point. In FIG. 4A, four sample feature points (first to fourth close sample feature points) are shown in the order of closeness to the objective terminal point in the same manner as in FIG. 3A. The sample feature point is a terminal point $T_i$, the first close sample feature point is a terminal point $T_1$, the second close sample feature point is a branch point $B_2$, the third close sample feature point is a terminal point $T_3$, and the fourth close sample feature point is a branch point $B_4$. In the case where the connection processing is performed between the sample feature point $T_i$ and the first to third close sample feature points, the sample feature point $T_i$ is the starting point of three sample connection lines which respectively connect the sample feature point $T_i$ with the sample feature points $T_1$, $B_2$, and $T_3$.

The real number unit value (1) is assigned to the sample feature point $B_2$ which is a branch point. The imaginary number unit value (i) is assigned to the sample feature points $T_i$, $T_1$, and $T_3$ which are terminal points. The sample numerical value is calculated for each of the three sample connection lines which connect the sample feature point $T_i$ as the starting point with other sample feature points. In FIG. 4A, the sample numerical value group is calculated for the sample connection lines which connect the sample feature point $T_i$ as the starting point with the first to third close sample feature points. The sample numerical value is the product of the real number unit value or the imaginary number unit value assigned to the sample feature points located on each end of the sample connection line and the length of the sample connection line. As a result, a sample numerical value group calculated for the three sample connection lines is assigned to the sample feature point $T_i$ as the sample numerical value information ($-L_{i1}$, $L_{i2}$·i, $-L_{i3}$), as shown in FIG. 4B.

The complex line segment length "$-L_{i1}$" is a value corresponding to the length $L_{i1}$ of the sample connection line which connects the sample feature point $T_i$ to which the imaginary number unit value is assigned with the terminal point $T_1$ to which the imaginary number unit value is assigned. The complex line segment length "$L_{i2}$·i" is a value corresponding to the length $L_{i2}$ of the sample connection line which connects the sample feature point $T_i$ to which the imaginary number unit value is assigned with the branch point $B_2$ to which the real number unit value is assigned. The complex line segment length "$-L_{i3}$" is a value corresponding to the length $L_{i3}$ of the sample connection line which connects the sample feature point $T_i$ to which the imaginary number unit value is assigned with the terminal point $T_3$ to which the imaginary number unit value is assigned.

The above description illustrates the case where the numerical value information is assigned using the first to third close sample feature points. However, the same description applies to the case where the numerical value information is assigned using the first and second close sample feature points or the first to fourth or more close sample feature points.

As shown in FIG. 3B and FIG. 4B, the numerical value information assigned to the sample feature point can be allowed to differ depending on the type of the sample feature point, even if the position relationship between the sample feature point and other sample feature points is approximately the same. Therefore, accuracy of verification can be increased by performing the verification processing by using such numerical value information.

The fingerprint verification processing by using the feature point to which such numerical value information is assigned is described below. Before performing the fingerprint verification processing, registration processing of the registration numerical value information for authenticating an individual is performed. The registration numerical value information is assigned to each of the feature points (registration feature points) extracted from a fingerprint image of an individual in the same manner as described above. Position information is also assigned to each of the registration feature points to which the registration numerical value information is assigned. As the position information, an X coordinate and a Y coordinate of a given plane coordinate system may be employed.

Figure 5:
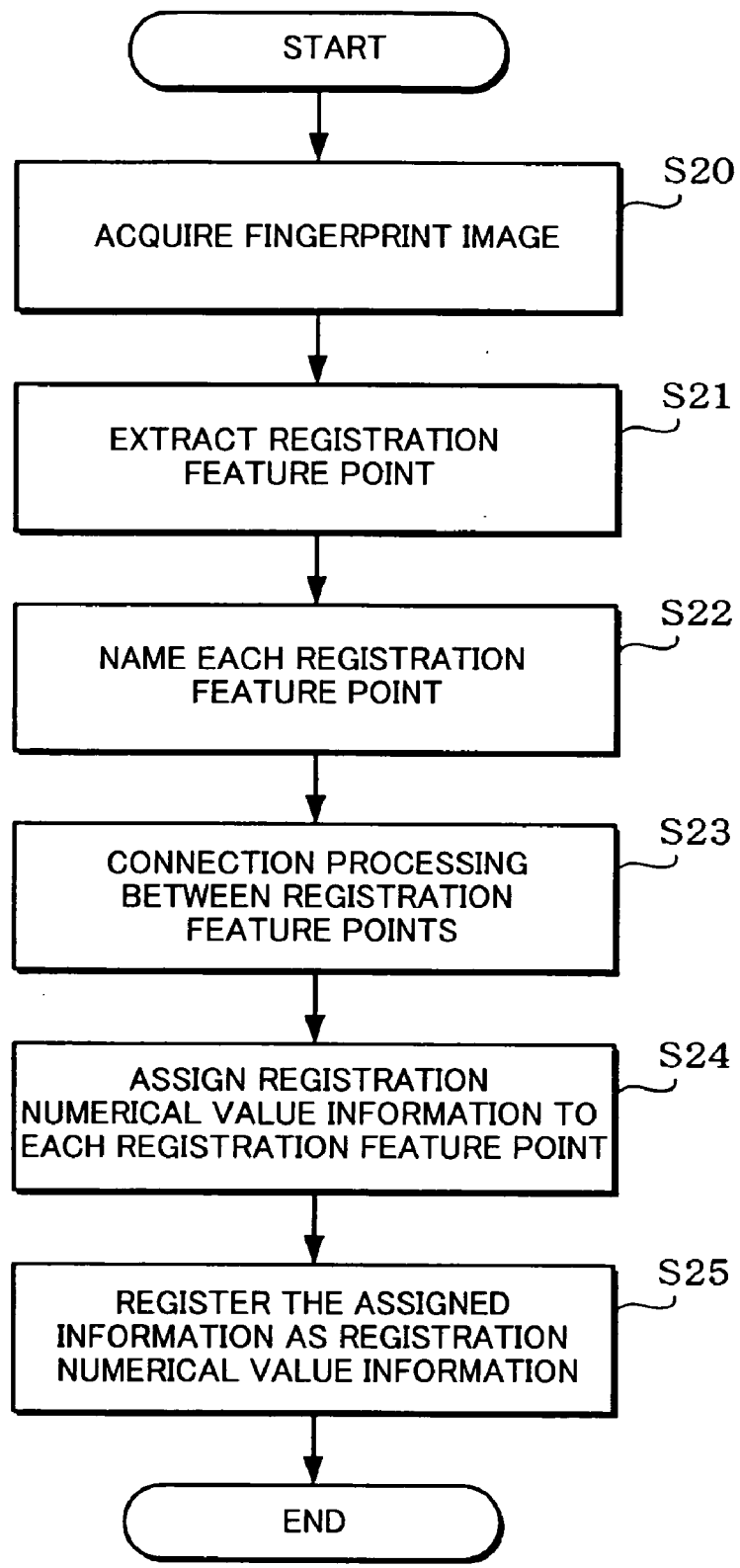
FIG. 5 is a flowchart of registration processing in the first embodiment.
Figure 6:
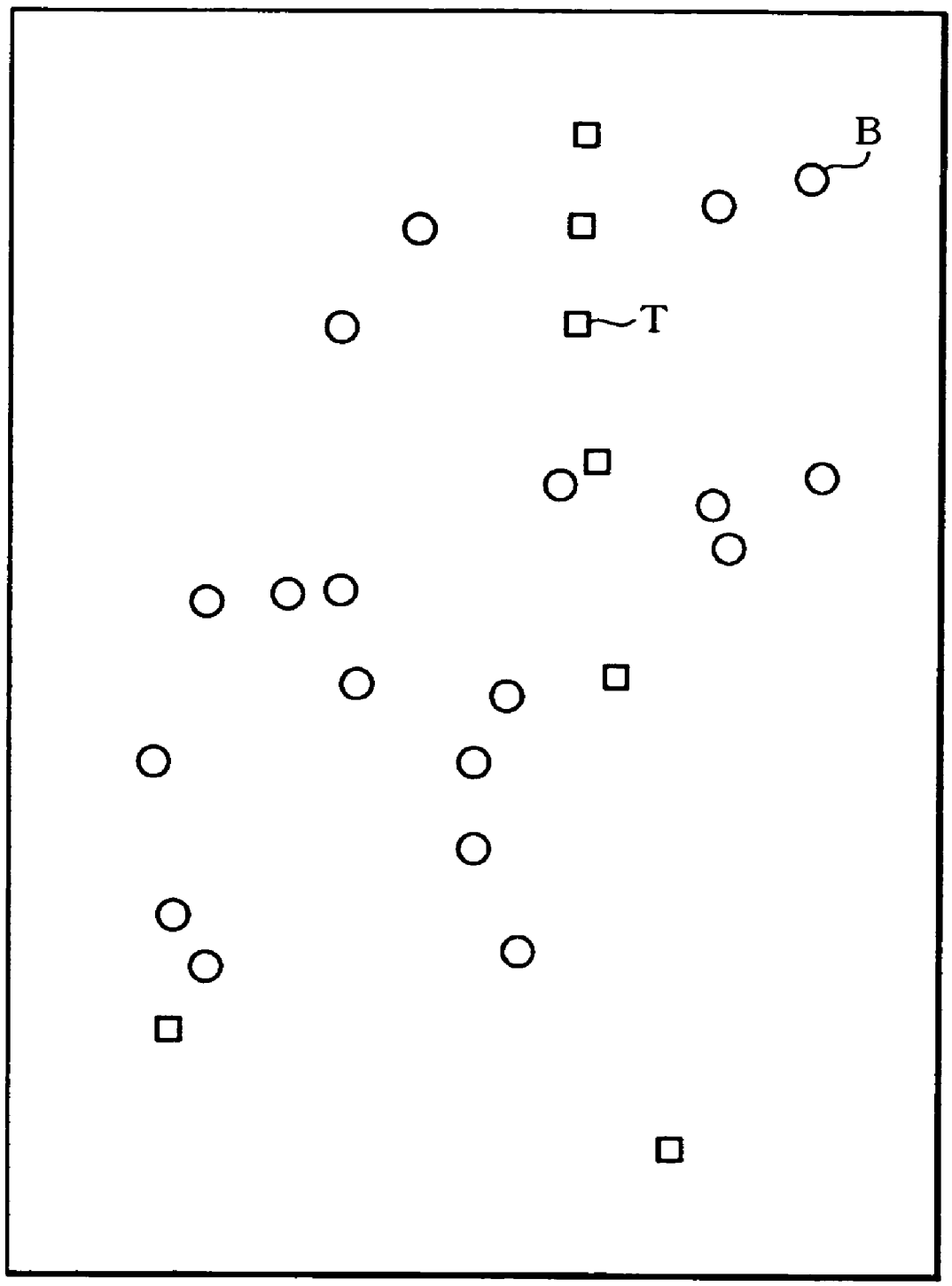
FIG. 6 is a diagram illustrating an example of feature points extracted from a fingerprint image.

FIG. 5 shows an example of the registration processing of the registration numerical value information. A fingerprint image of an individual to be authenticated is acquired in the registration processing (step S20). $N_R$ registration feature points ($N_R$ is an integer greater than or equal to four) are extracted from the acquired fingerprint image (step S21). In the case where the fingerprint image acquired in the step S20 is the fingerprint image shown in FIG. 2, the registration feature points extracted in the step S21 are distributed in a feature point extraction region as shown in FIG. 6. In FIG. 6, terminal points (T) and branch points (B) are separately illustrated. The feature points consisting of the branch points and the terminal points are registered as the registration feature points.

Figure 7:
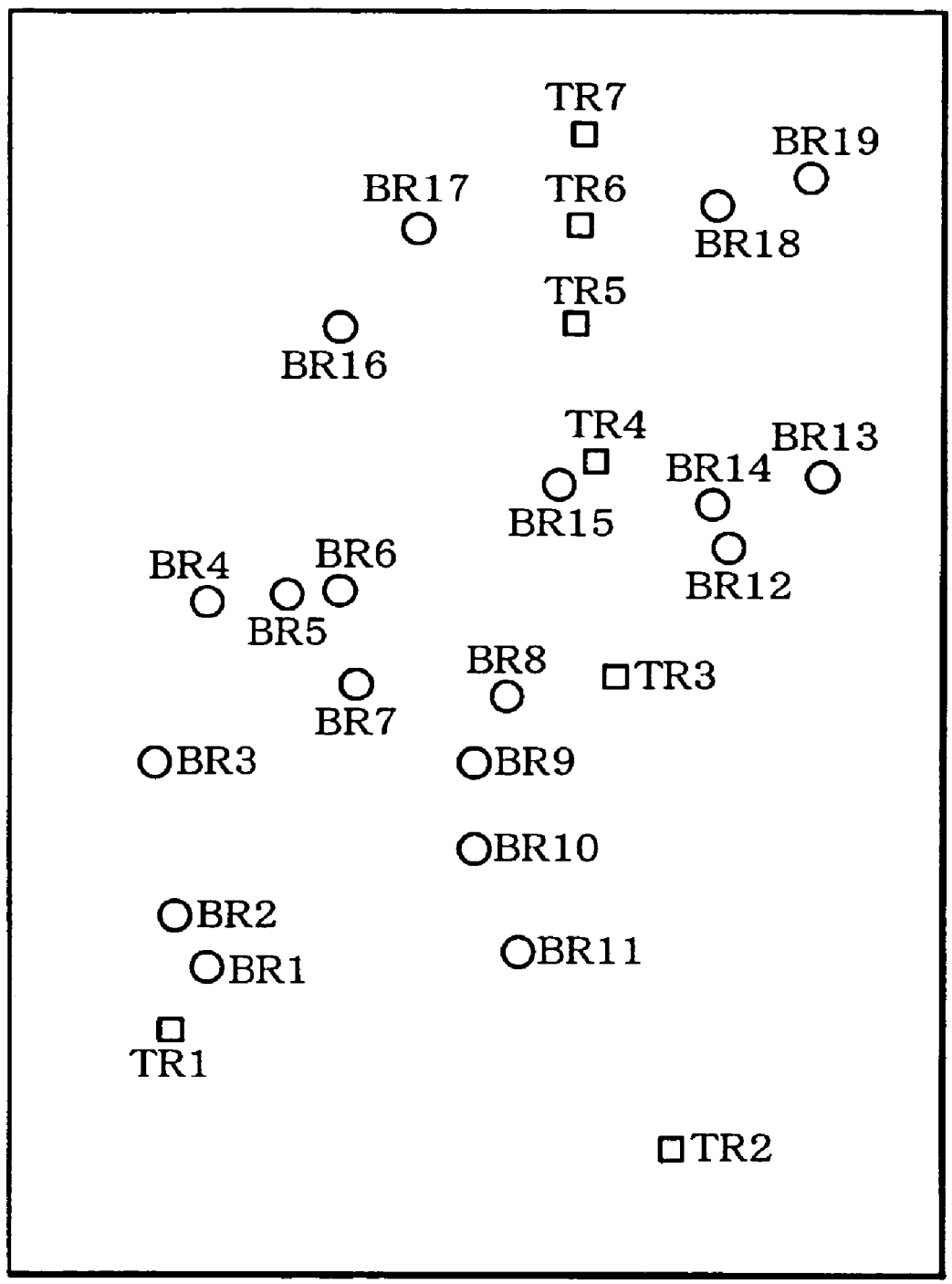
FIG. 7 is a diagram illustrating an example of named feature points.

After the registration feature points are extracted in the step S21, each of the registration feature points is named (step S22). As shown in FIG. 7, each of the branch points is named by using "BR (Branch Registered)" which means the registration branch point and the branch point's own number. As shown in FIG. 7, each of the terminal points is named by using "TR (Terminal Registered)" which means the registration terminal point and the terminal point's own number.

The connection processing between the registration feature points is performed (step S23). In more detail, the registration feature point is connected with $L_R$ registration feature points ($2 \leq L_R \leq N_R - 1$, $L_R$ is an integer) close to the registration feature point (close registration feature points), thereby (virtually) generating a plurality of line segments (registration connection lines). The $L_R$ close registration feature points close to the registration feature point may be referred to as $L_R$ registration feature points called a first close registration feature point, a second close registration feature point, ..., and an $L_R$th close registration feature point in the order of closeness to the registration feature point.

In the case where $N_D$ or $N_R$ is three, since the number of close sample feature points or the number of close registration feature points is two, the amount of information or the registration numerical value group is reduced. Therefore, there may be a case where the fingerprint to be verified is judged to coincide with the fingerprint of the genuine person by mistake, whereby accuracy of verification is decreased. Therefore, it is preferable that each of $N_D$ and $N_R$ be an integer greater than or equal to four.

Figure 8:
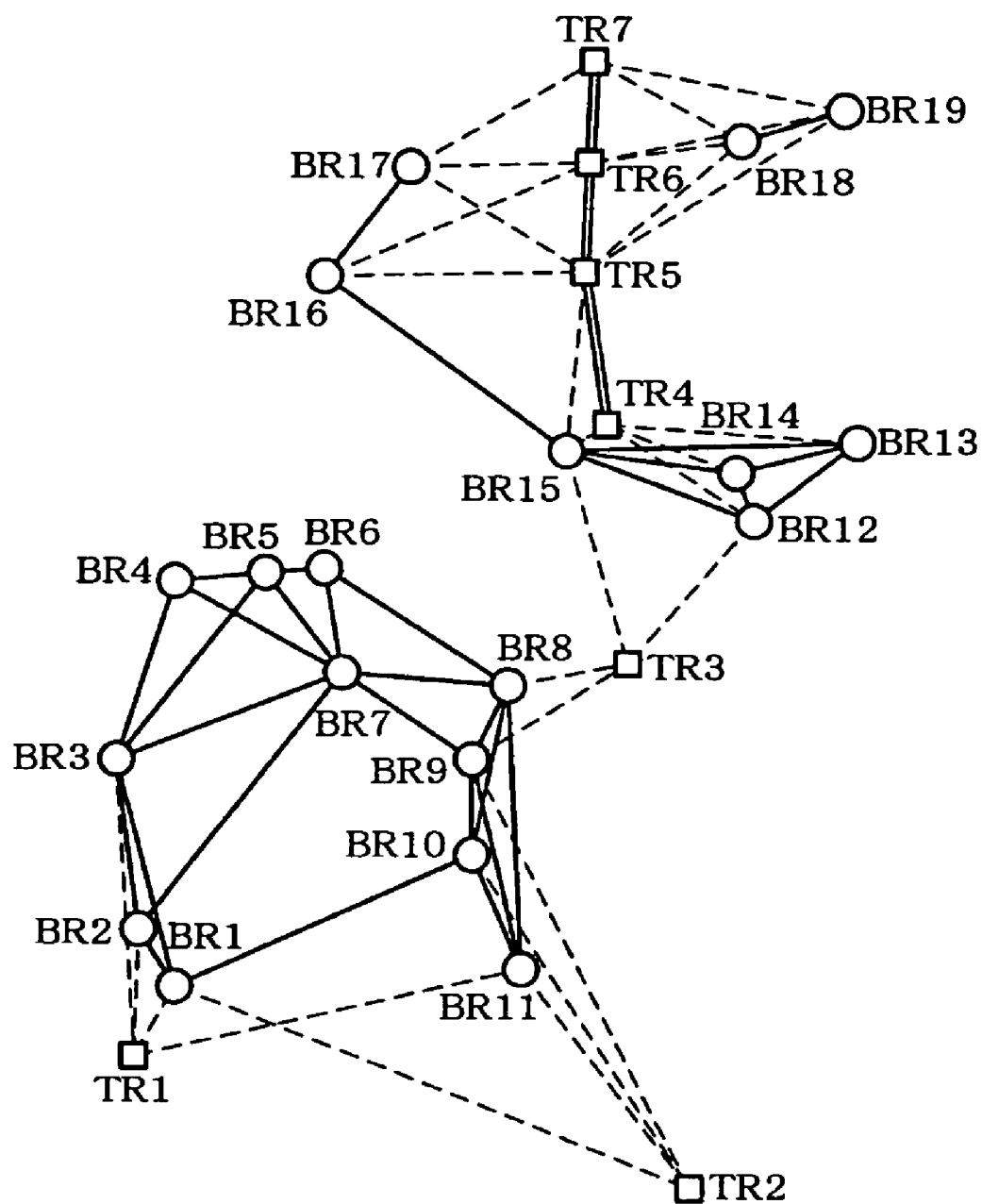
FIG. 8 is a diagram illustrating an example in which connection processing is performed between a sample feature point and first to fourth close feature points.

FIG. 8 illustrates a state in which the connection processing has been performed. FIG. 8 shows a case where the connection processing is performed between each of the feature points and the first to fourth close registration feature points ($L_R=4$). Each of the registration feature points is the starting point of at least four registration connection lines. In the case where the registration feature point is one of the first to fourth close registration feature points of the partner registration feature point, since the registration feature point can be the end point of the registration connection line having the partner registration feature point as the starting point, there may be a case where at least five ($=L_R+1$) registration connection lines are provided depending on the registration feature point.

It is preferable that the amount of registration numerical value information assigned to the registration feature point be equal to at least the amount of numerical value information assigned to the feature point of the fingerprint image acquired in the verification processing. Therefore, in the case where the sample numerical value information is assigned by the connection processing between the sample feature point and the first to $L_D$th close sample feature points in the verification processing, it is preferable that $L_R$ be equal to or greater than $L_D$. In this case, the amount of registration numerical value information assigned by the connection processing between the registration feature point and the first to $L_R$th close registration feature points in the registration processing is greater than the amount of sample numerical value information assigned by the connection processing between the sample feature point and the first to $L_D$th close sample feature points in the verification processing.

Conditions shown by equations (a) to (c) are necessary for each of $L_R$ and $L_D$. If $L_R$ or $L_D$ is great, the load of the verification processing is increased. Ideally, $L_R$ is 4, 5, 6, or 7, and $L_D$ is 2, 3, 4, or 5.

$$2 \leq L_R \leq N_R - 1 \qquad \text{(a)}$$

$$2 \leq L_D \leq N_D - 1 \qquad \text{(b)}$$

$$L_D \leq L_R \qquad \text{(c)}$$

After the connection processing between each of the registration feature points and the first to $L_R$th close registration feature points is performed as shown in FIG. 8, the registration numerical value information is assigned to each of the registration feature points (step S24). The assigned registration numerical value information is registered (step S25).

FIG. 8 shows an example in which the imaginary number unit value is assigned to the terminal point, and the real number unit value is assigned to the branch point. Therefore, the connection line which connects the terminal points is defined by a negative number, the connection line which connects the branch points is defined by a positive number, and the connection line which connects the terminal point with the branch point is defined by an imaginary number. In FIG. 8, the negative number connection line is drawn by using a double line, the positive number connection line is drawn by using a solid line, and the imaginary number connection line is drawn by using a dotted line.

Figure 9:
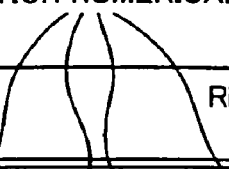
FIG. 9 is a diagram illustrating registration numerical value information in the first embodiment.

FIG. 9 shows an example of the registration numerical value information. The registration numerical value group corresponding to each of the registration feature points (feature points shown in FIG. 8) is assigned to the registration numerical value information. Since the connection processing is performed between the registration feature point and the first to fourth close registration feature points in FIG. 8, the registration numerical values including at least four complex line segment lengths are assigned to the registration numerical value information of each of the registration feature points shown in FIG. 9.

In the registration processing, not only the registration numerical value information assigned to each of the registration feature points, but also the position information of each of the registration feature points is calculated. The position information is stored while being associated with each of the registration feature points.

The fingerprint verification processing using the registration numerical value information in the first embodiment is described below in detail.

Figure 10:
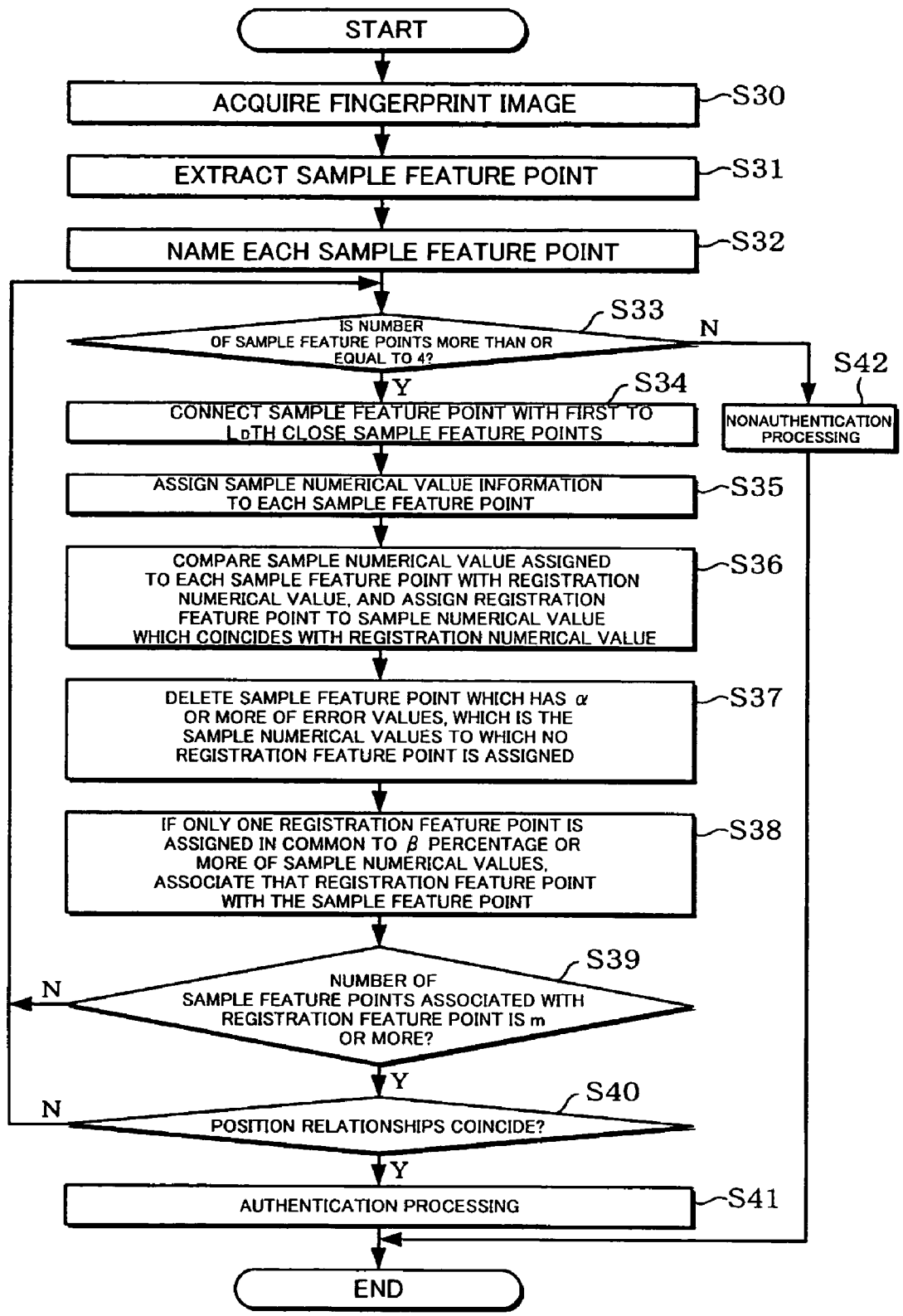
FIG. 10 is a flowchart showing an example of fingerprint verification processing in the first embodiment.

FIG. 10 shows an example of the fingerprint verification processing in the first embodiment. FIG. 10 illustrates the outline described with reference to FIG. 1 in more detail. Steps S32 to S40 shown in FIG. 10 correspond to the steps S12 to S16 shown in FIG. 1. In more detail, an output Y in the step S40 shown in FIG. 10 corresponds to the output Y in the step S16 shown in FIG. 1, and an output N in the step S33 shown in FIG. 10 corresponds to the output N in the step S16 shown in FIG. 1.

A fingerprint image to be verified is acquired in the fingerprint verification processing (step S30). $L_D$ feature points (sample feature points) are extracted from the acquired fingerprint image (step S31). Each of the extracted sample feature points is named (step S32).

Figure 11:
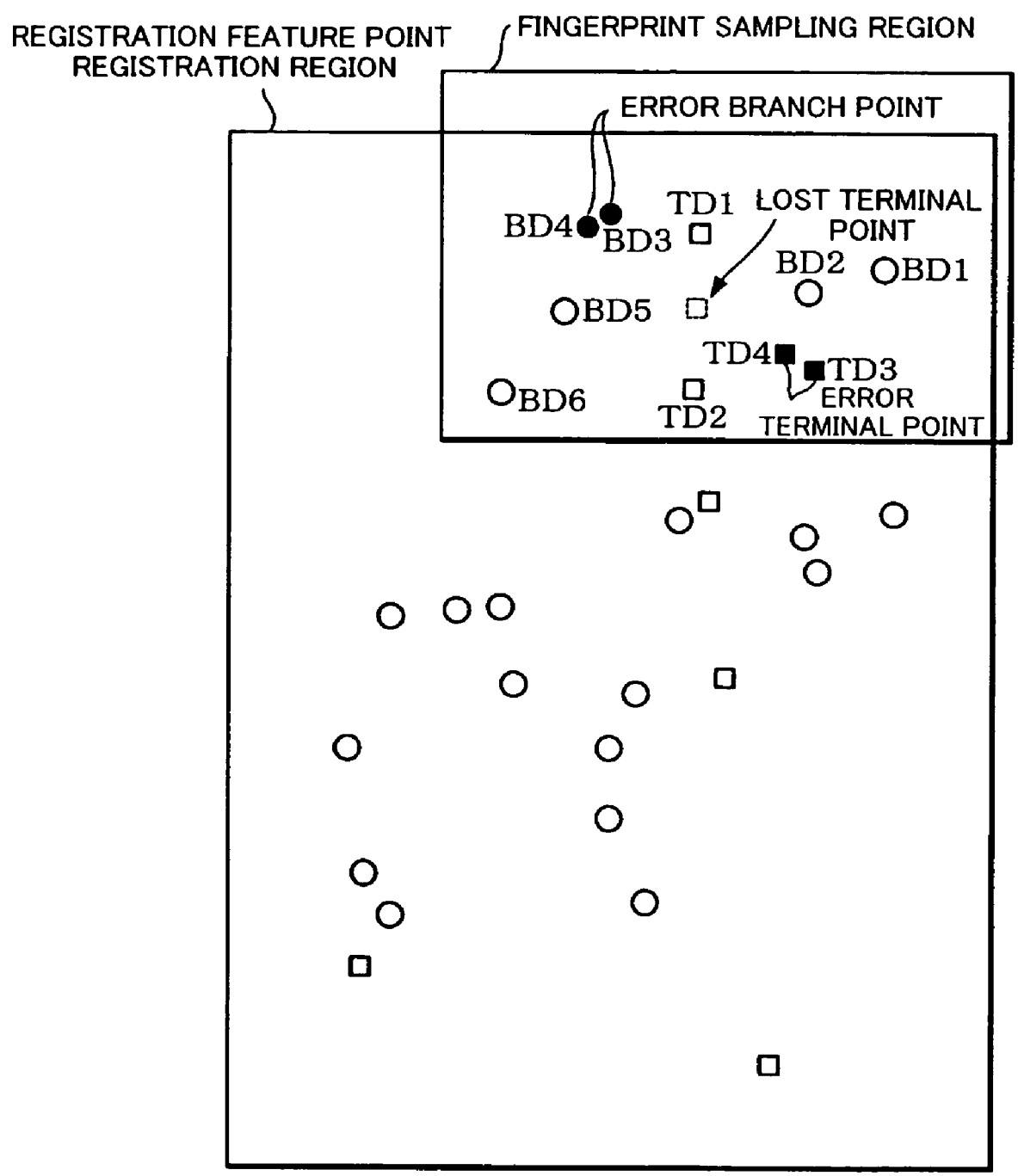
FIG. 11 is a diagram illustrating an example of feature points extracted from a fingerprint image to be compared.

As shown in FIG. 11, each of the branch points is individually named by using "BD (Branch Detected)" which means the detected branch point and the branch point's own number. As shown in FIG. 11, each of the terminal points is individually named by using "TD (Terminal Detected)" which means the detected terminal point and the terminal point's own number.

FIG. 11 shows a fingerprint sampling region in which the fingerprint to be verified is sampled in the region in which the registration feature points are extracted as shown in FIGS. 6 to 8. In the fingerprint sampling region, an error point extracted as the feature point by mistake, and a lost point which should be extracted as the feature point may exist. In FIG. 11, sample feature points BD3 and BD4 among the extracted sample feature points are error branch points, and sample feature points TD3 and TD4 are error terminal points. A lost terminal point also exists in FIG. 11.

Since the sample feature point extracted from the acquired fingerprint image and the error point or the lost point exist in combination, it is necessary to search for the distributed registration feature point to which the sample feature point corresponds in the verification processing. In the first embodiment, reduction of the processing load and maintenance of security are achieved by confirming the positions of the sample feature points and the registration feature points with high accuracy after reducing the number of sample feature points to be compared as described below.

After the sample feature points are named in the step S32 as shown in FIG. 11, whether or not the number of sample feature points to be verified is four or more is judged (step S33). If it is judged that the number of sample feature points is four or more (step S33: Y), the connection processing is performed between the sample feature point and the first to $L_D$th close sample feature points (step S34).

Figure 12:
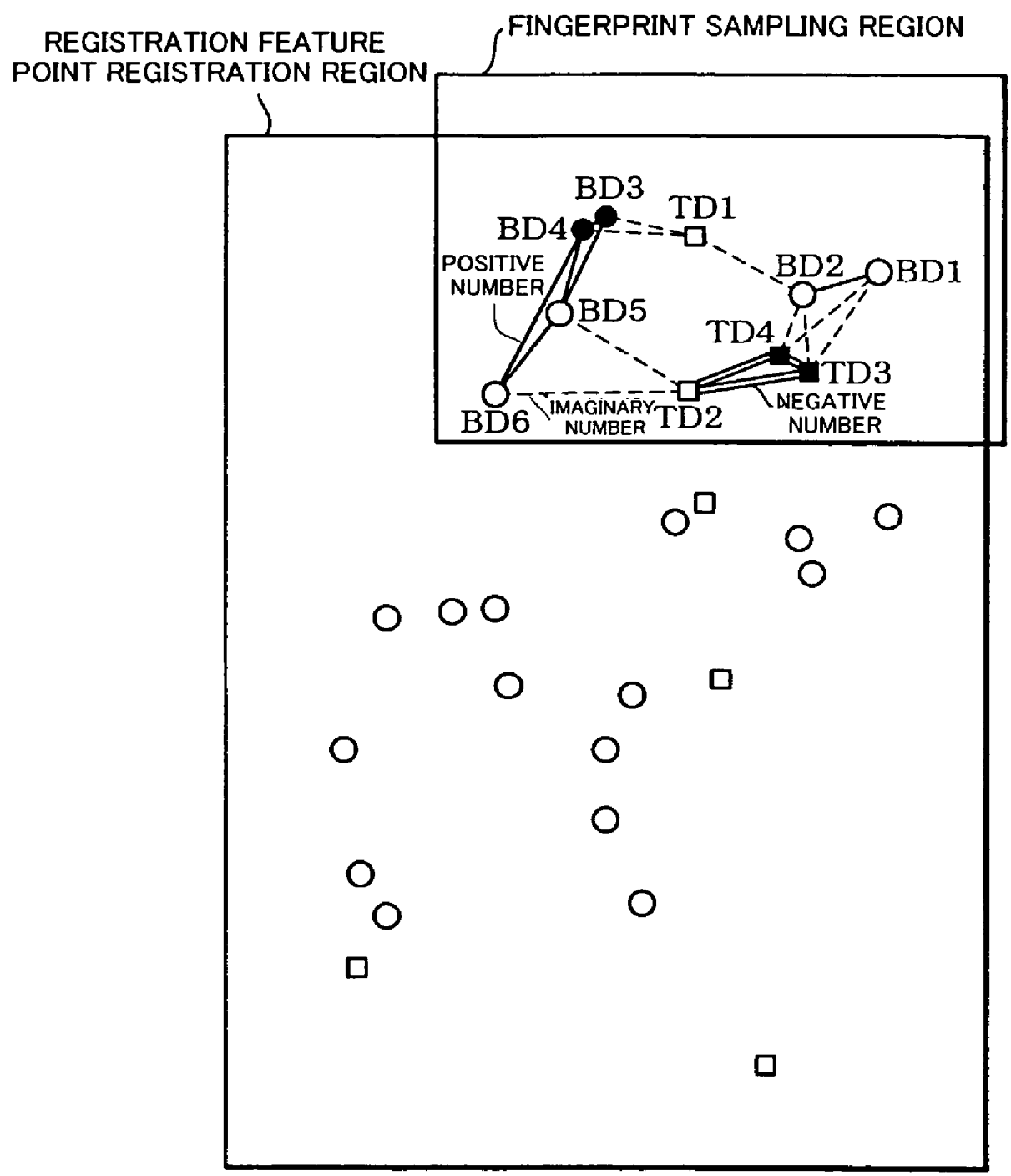
FIG. 12 is a diagram illustrating an example in which connection processing is performed between a sample feature point and first to third close feature points.

FIG. 12 shows a state in which the connection processing has been performed between each of the sample feature points and the first to $L_D$th close sample feature points. FIG. 12 illustrate the case where the connection processing has been performed between each of the sample feature points and the first to third close sample feature points ($L_D$=3). The sample connection line is indicated by a solid line in the case where the complex line segment length of the sample connection line which connects the sample feature points is a positive number. The sample connection line is indicated by a double line in the case where the complex line segment length of the sample connection line which connects the sample feature points is a negative number. The sample connection line is indicated by a dotted line in the case where the complex line segment length of the sample connection line which connects the sample feature points is an imaginary number.

In FIG. 10, after the connection processing is performed in the step S34, the length of the sample connection line which connects the sample feature points is calculated from the positions of each of the sample feature points. The sample numerical value information including the complex line segment length shown in FIGS. 3A, 3B, 4A, and 4B is assigned to each of the sample feature points (step S35). The sample numerical value assigned to each of the sample feature points is compared with the registration numerical value of the registration numerical value information assigned to the registration feature points (first comparison processing). The sample numerical value which coincides with the registration numerical value is assigned the registration feature point to which the registration numerical value is assigned (step S36).

FIG. 13 shows an example of the results for the first comparison processing. In this example, the registration feature point of which the registration numerical value information shown in FIG. 9 coincides with the sample numerical value information is detected for each of the sample feature points shown in FIG. 11. The search range for the registration numerical value information may be limited to the range of registration feature points of the same type. For example, the registration points TR1 and TR3 are detected for the sample numerical value "15i" of the detected terminal point TD1, since the registration points TR1 and TR3 are terminal points of the same type and have the same registration numerical value as the sample numerical value. The registration point BR18 is detected for the sample numerical value "20i" of the detected branch point BD2, since the registration point BR18 is a branch point of the same type and has the same registration numerical value as the sample numerical value. A branch point having the same registration numerical value as the sample numerical value "11i" of the detected branch point BD2 does not exist. Therefore, a blank column is shown in FIG. 13.

After the registration feature points of which the registration numerical value coincides with each of the sample numerical values assigned to each of the sample feature points are detected, a sample feature point among the sample feature points to be compared which has α (first percentage in a broad sense) or more of error values, which is sample numerical values assigned to the sample feature point to which no registration feature point is assigned, is deleted, as shown in FIG. 10 (step S37). α is set at "51" to "65" (51%<α%<65%). α is ideally "60".

Figure 14:
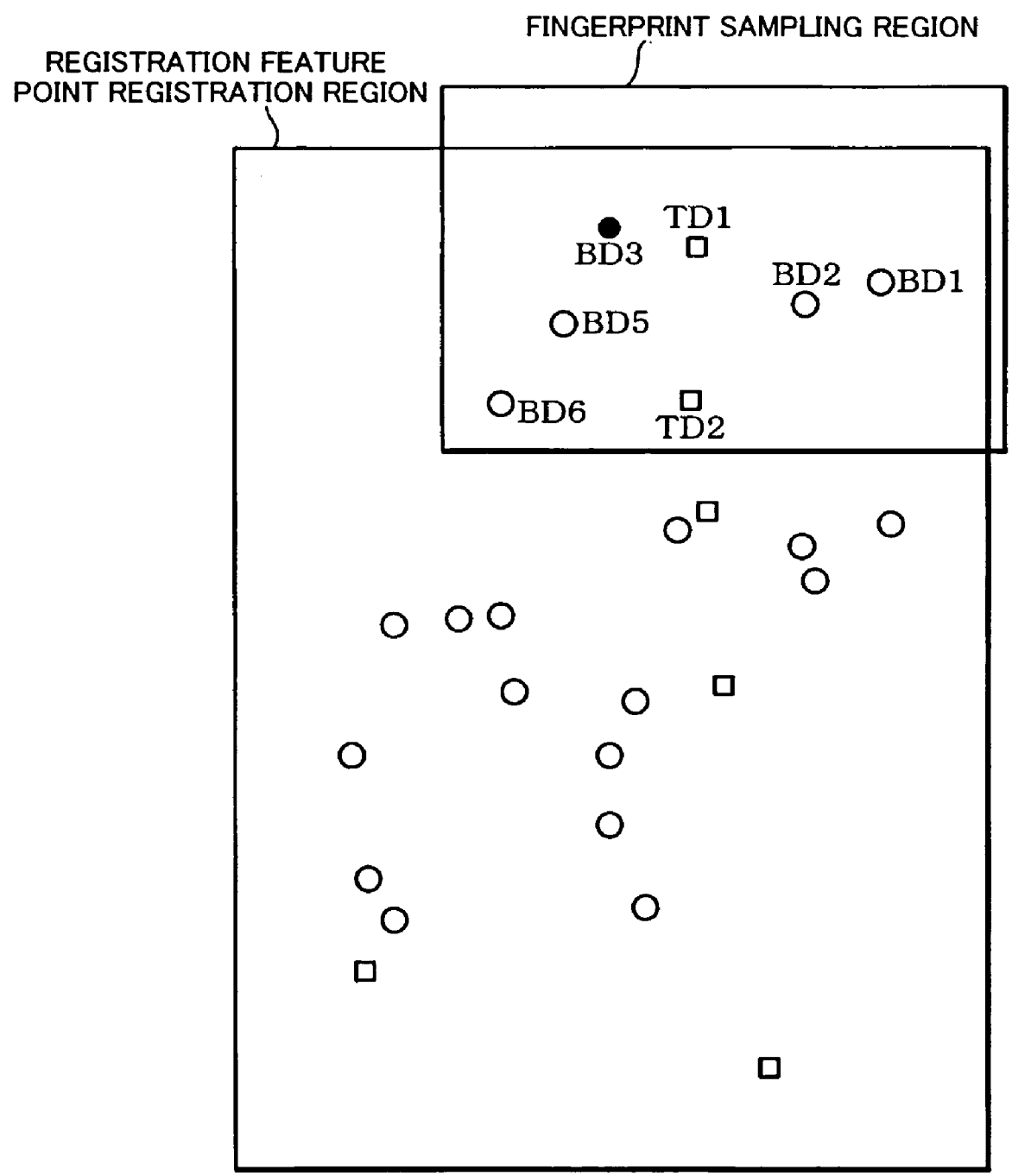
FIG. 14 is a diagram illustrating feature points after deleting sample feature points that do not coincide with the registration feature point.

If α is set at "60" (α%=60%), in the case where the number of sample numerical values assigned to the sample feature point is four, the sample feature point in which the number of sample numerical values to which no registration feature point is assigned is 2.4 (=4×0.6) or more is deleted. In the case where the number of sample numerical values assigned to the sample feature point is three, the sample feature point in which the number of sample numerical values to which no registration feature point is assigned is 1.8 (=3×0.6) or more is deleted. In FIG. 13, since the number of sample numerical values of the detected feature point TD1 is three and the number of sample numerical values to which no feature point is assigned is zero, the detected feature point TD1 is not deleted. Since the number of sample numerical values of the detected branch point BD4 is three and the number of sample numerical values to which no feature point is assigned is two, the detected branch point BD4 is deleted according to the above standard. As a result, the detected terminal point TD3 (error value: 75%), the detected terminal point TD4 (error value: 75%), and the detected branch point BD4 (error value: 67%) are deleted as shown in FIG. 14.

The number of sample feature points to be compared is reduced in this manner. In the fingerprint verification processing shown in FIG. 10, in the case where one registration feature point is assigned in common to a β percent (second percentage in a broad sense) or more of the sample numerical values of one sample feature point, that registration feature point is associated with that sample feature point having the sample numerical value group (step S38). β is set at "51" or more to "100" or less (51%≦β%≦100%). β is ideally "60".

Whether or not the number of sample feature points associated with the registration feature point is m or more is judged (step S39). If it is judged that the number of sample feature points associated with the registration feature point is m or more (step S39: Y), whether or not the position relationship among the m sample feature points coincides with the position relationship among the m registration feature points associated with the m sample feature points is judged (step S40).

If it is judged that the number of sample feature points associated with the registration feature point is less than m (step S39: N), the connection processing is performed between the sample feature point and the first to $L_D$th close sample feature points in the step S33 in a state in which the feature point which does not coincide with the registration feature point is deleted.

According to the results for the first comparison processing shown in FIG. 13, the registration terminal point TR5 is assigned in common to three sample numerical values among the four sample numerical values of the detected terminal point TD2. Since the registration terminal point TR5 is assigned in common to three sample numerical values among four sample numerical values, the common percentage is 75%. If β% (second percentage) is set at 60%, the registration feature point TR5 is associated with the sample feature point TD2. The registration feature point BR18 is associated with the sample feature point BD2, and the registration feature point BR16 is associated with the sample feature point BD6. The registration feature points BR9 and BR18 are assigned in common to the sample feature point BD1 at a percentage of 67% (=2/3). However, since two types of registration feature points are assigned, neither of the registration feature points BR9 and BR18 is associated with the sample feature point BD1.

As a result of the first comparison processing shown in FIG. 13, three sample feature points TD2, BD2, and BD6 are respectively associated with the registration feature points TR5, BR18, and BR 16. In this case, if the number "m" of sample feature points associated with the registration feature points is three, three sample feature points associated with the registration feature points exist, whereby the judgment in the step S39 is "Y". Therefore, whether or not the position relationship among the sample feature points TD2, BD2, and BD6 coincides with the position relationship among the registration feature point TR5, BR18, and BR16 is judged (step S40). In more detail, whether or not the triangle formed by the sample feature points TD2, BD2, and BD6 (sample triangle) is congruent with the triangle formed by the registration feature points TR5, BR18, and BR16 (registration triangle) is judged. In the case where the number of fingerprint ridges which intersect each of the connection lines is used as the registration numerical value and the sample numerical value, the position relationships may be judged in the step S40 based on whether or not the sample triangle is similar to the registration triangle. This enables an individual to be authenticated even if the size of the finger changes due to growth or a change in the shape of the body.

As shown in FIG. 10, in the case where the number "m" of sample feature points associated with the registration feature points is four or more (step S39), the processing proceeds to judgment of the position relationship (step S40). Since only three points are associated in the first comparison processing shown in FIG. 13, the processing is returned to judgment in which the number of sample feature points is counted after deleting the sample feature points TD3, TD4, and BD4 of which the error values are great.

Figure 15:
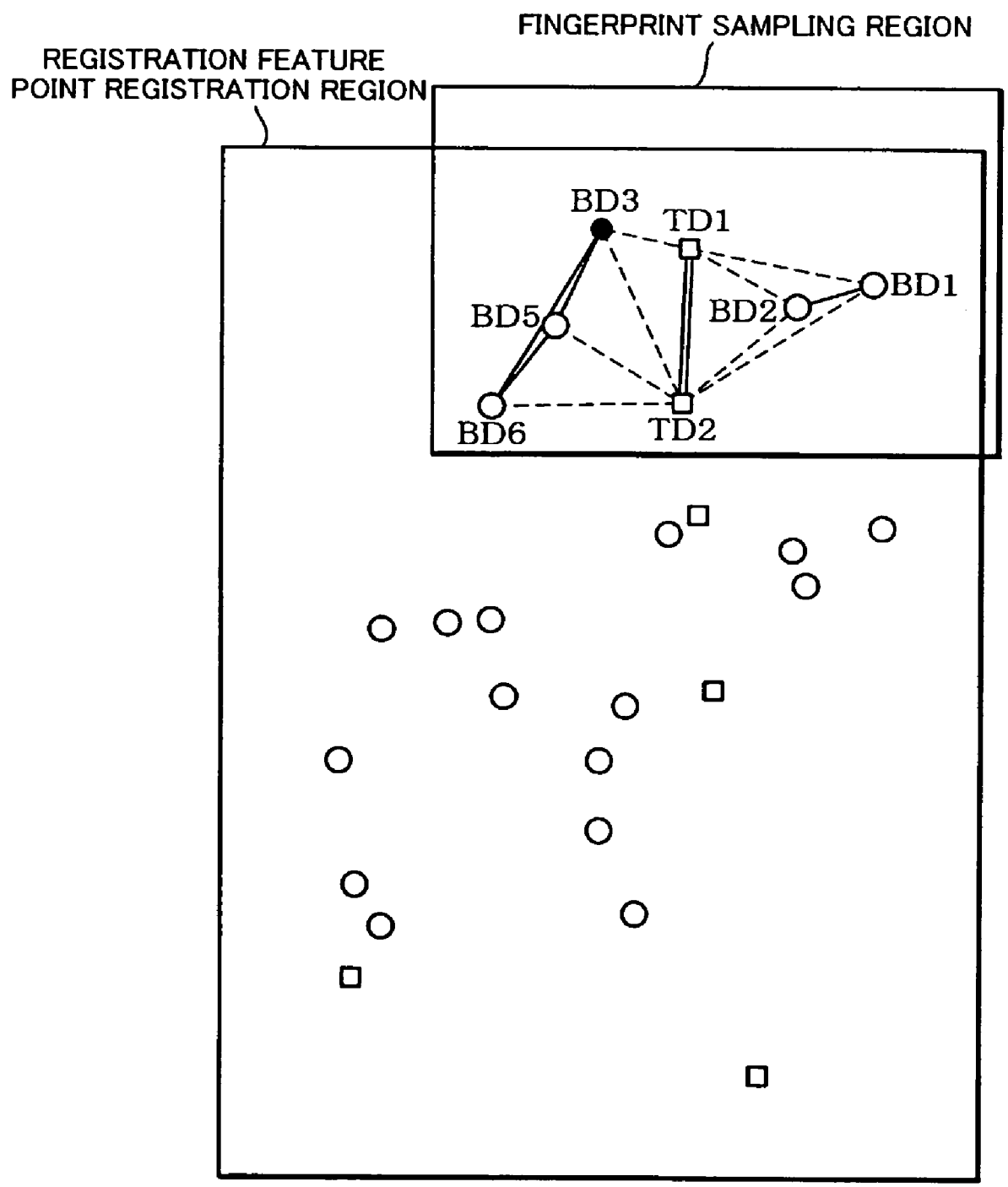
FIG. 15 is a diagram illustrating an example in which connection processing is performed between a sample feature point and first to third close feature points after deletion of sample feature points.

As shown in FIG. 15, since the number of the remaining sample feature points excluding the feature points deleted in the step S37 shown in FIG. 10 is seven, which is greater than four (step S33: Y), the connection processing is performed between the sample feature point and the first to third close sample feature points ($L_D$32 3) (step S34). Then, second comparison processing in which the sample numerical values assigned to each of the sample feature points after the connection processing (step S35) are compared with the registration numerical values assigned to the registration feature point shown in FIG. 9 is performed (step S36).

FIG. 16 shows an example of the results for the second comparison processing. As a result of the second comparison processing, the feature points common to each of the sample numerical values of six sample feature points excluding the detected branch point BD3 are recognized at a percentage of 60%, whereby the registration feature points are associated with the sample feature points. In more detail, the registration feature point TR7 is associated with the sample feature point TD1, the registration feature point TR5 is associated with the sample feature point TD2, the registration feature point BR19 is associated with the sample feature point BD1, the registration feature point BR18 is associated with the sample feature point BD2, the registration feature point BR17 is associated with the sample feature point BD5, and the registration feature point BR16 is associated with the sample feature point BD16. Since the number of associated sample feature points is six (m=four or more), the judgment in the step S39 is "Y". In the step S40 shown in FIG. 10, the confirmation processing of the position relationship among the sample feature points excluding the detected branch point BD3 and the position relationship among the registration feature points associated with each of the sample feature points is performed by using the results for the second comparison processing. In the position relationship confirmation processing, the position relationship among the sample feature points and the position relationship among the registration feature points specified absolutely or relatively are compared, and whether or not the position relationships coincide within a given error range is judged. In this example, whether or not $_6C_3$ (=20) sample triangles formed by the sample feature points TD1, TD2, BD1, BD2, BD5, and BD6 are congruent with 20 registration triangles formed by the registration feature points TR7, TR5, BR19, BR18, BR17, and BR16 is checked.

In the comparison between the position relationship among the sample feature points and the position relationship among the registration feature points in the step S40 shown in FIG. 10, the same processing as used in usual fingerprint verification processing using the feature points of the fingerprint image may be used. However, in the first embodiment, since the registration points having high possibility of coincidence are calculated by using the numerical value information assigned to each of the feature points, the processing load can be considerably reduced in comparison with the case of comparing the feature points with all the registration feature points. Moreover, occurrence of a problem in which the feature points are accidentally judged to coincide with the registration feature points merely by coincidence of the numerical value information and a person in question is authenticated as the genuine person can be prevented.

If it is judged that the position relationship among the detected terminal points and the detected branch points coincides with the position relationship among the corresponding registration feature points (step S40: Y), the fingerprint image is judged to coincide with the fingerprint image of the registered genuine person, whereby the authentication processing is performed (step S41). In the authentication processing, indication to the effect that the person in question is authenticated as the registered genuine person is displayed.

If it is judged that the position relationship among the detected terminal points and the detected branch points does not coincide with the position relationship among the corresponding registration feature points (step S40: N), the processing is returned to the step S33.

If it is judged that the number of sample feature points is less than four in the step S33 (step S33: N), it is judged that accuracy of fingerprint verification cannot be secured, whereby the nonauthentication processing is performed (step S42). In the nonauthentication processing, indication to the effect that the person in question is not authenticated as the registered genuine person is displayed.

As described above, in the first embodiment, the sample feature point, in which the percentage of the sample numerical values to which no registration feature point is assigned is equal to or greater than the first percentage ($\alpha$ percent), is deleted, and the position relationships are compared by associating the registration feature point which is assigned in common to the sample numerical values assigned to the sample feature point excluding the deleted sample feature point at a percentage equal to or greater than the second percentage with the sample feature point.

1.2 Second Embodiment

In the second embodiment, the sample numerical value (numerical value information) including the length of the sample connection line is assigned to each of the extracted sample feature points. The line segment length is the length of the sample connection line. Therefore, the sample numerical value expressed by a positive number is assigned to each of the extracted sample feature points. This enables the numerical value information corresponding to the position relationship between one sample feature point and other sample feature points to be assigned to each of the sample feature points, whereby the information characteristic of the sample feature point can be assigned. Moreover, the distribution of the extracted sample feature points is specified by the sample numerical value group expressed by positive numbers.

Therefore, the distributions of the sample feature points and the registration feature points can be expressed by using an extremely simple processing, and the processing load of the fingerprint comparison results can be reduced by using the sample feature points having such a sample numerical value group and the registration feature points to which the registration numerical value group obtained in the same manner is assigned.

Figures 17A, 17B:
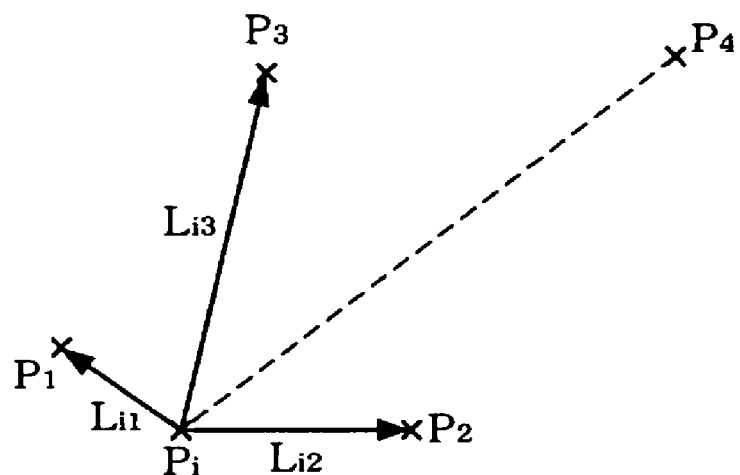
FIGS. 17A and 17B are diagrams illustrating numerical value information in a second embodiment.

FIGS. 17A and 17B illustrate the numerical value information including the length of the sample connection line in the second embodiment. The following description illustrates the sample numerical value information assigned to the sample feature point. However, the same description applies to the registration numerical value information assigned to the registration feature point.

In FIG. 17A, four sample feature points $P_1$ to $P_4$ close to one sample feature point $P_i$ (first to fourth close sample feature points) among a plurality of extracted sample feature points are illustrated. The connection processing is performed between the sample feature point and the first to third close sample feature points, for example. Specifically, the sample feature point $P_i$ is the starting point of three sample connection lines which connect the sample feature point $P_i$ with the sample feature points $P_1$ to $P_3$. As shown in FIG. 17B, the lengths $L_{i1}$ to $L_{i3}$ of the sample connection lines are assigned to the sample feature point $P_i$. This enables the numerical value information corresponding to the position relationship between the sample feature point $P_i$ and other sample feature points to be assigned to the sample feature point $P_i$, whereby the information characteristic of the sample feature point can be assigned.

The above description illustrates the case where the numerical value information relating to the sample connection lines connected to the first to third close sample feature points is assigned. However, the same description applies to the case where the numerical value information relating to the sample connection lines connected to the first and second close sample feature points or to the sample connection lines connected to the first to fourth or more close sample feature points is assigned.

The registration processing of the registration numerical value in the second embodiment is the same as that in the first embodiment. Therefore, description of the registration processing is omitted. The fingerprint verification processing in the second embodiment is the same as that in the first embodiment. Therefore, description of the fingerprint verification processing is omitted. However, in the fingerprint verification processing, judgment is made merely by using the lengths of the connection lines irrespective of the types of the feature points on each end of the sample connection lines and the registration connection lines differing from the first embodiment. Therefore, the comparison range of the registration numerical value information in the step S36 is increased, and accuracy of verification is decreased in comparison with the first embodiment. However, according to the second embodiment, the amount of information of the registration numerical values and the sample numerical values can be reduced and the processing can be simplified in comparison with the first embodiment.

1.3 Third Embodiment

In the third embodiment, the sample numerical value (numerical value information) including the angles formed by the sample connection lines is assigned to each of the extracted sample feature points. In the third embodiment, the sample feature points having the sample numerical value group including such sample numerical values and the registration feature points to which the registration numerical value group obtained in the same manner is assigned are used.

Figures 18A, 18B:
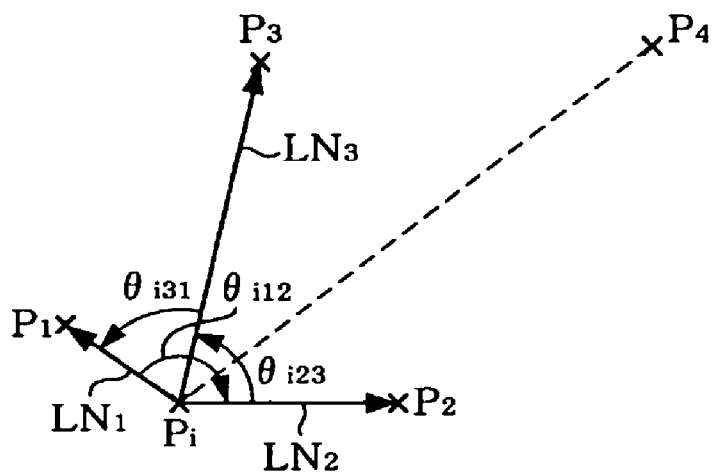
FIGS. 18A and 18B are diagrams illustrating numerical value information in a third embodiment.

FIGS. 18A and 18B illustrate the numerical value information including the angles formed by the sample connection lines in the third embodiment. The following description illustrates the sample numerical value information assigned to the sample feature point. However, the same description applies to the registration numerical value information assigned to the registration feature point.

In FIG. 18A, four sample feature points $P_1$ to $P_4$ close to one sample feature point $P_i$ (first to fourth close sample feature points) among a plurality of extracted sample feature points are illustrated. The connection processing is performed between the sample feature point and the first to third close sample feature points, for example. Specifically, the sample feature point $P_i$ is the starting point of three sample connection lines $LN_1$ to $LN_3$ which connect the sample feature point $P_i$ with the sample feature points $P_1$ to $P_3$. The angles formed by the three sample connection lines are three types of angles (angle $\theta_{i12}$ formed by sample connection lines $LN_1$ and $LN_2$, angle $\theta_{i23}$ formed by sample connection lines $LN_2$ and $LN_3$, and angle $\theta_{i31}$ formed by sample connection lines $LN_3$ and $LN_1$).

As shown in FIG. 18B, the angles $\theta_{i12}$ to $\theta_{i31}$ formed by the sample connection lines are assigned to the sample feature point $P_i$. It is preferable that the angle be defined in the positive direction (forward direction). Therefore, the value of the angle is 0 to 360 degrees. This enables the numerical value information corresponding to the position relationship between the sample feature point $P_i$ and other sample feature points to be assigned to the sample feature point $P_i$, whereby the information characteristic of the sample feature point can be assigned.

The above description illustrates the case where the numerical value information relating to the sample connection lines connected to the first to third close sample feature points is assigned. However, the same description applies to the case where the numerical value information relating to the sample connection lines connected to the first and second close sample feature points or to the sample connection lines connected to the first to fourth or more close sample feature points is assigned.

The registration processing of the registration numerical value in the third embodiment is the same as that in the first embodiment. Therefore, description of the registration processing is omitted. The fingerprint verification processing in the third embodiment is the same as that in the first embodiment. Therefore, description of the fingerprint verification processing is omitted. However, in the fingerprint verification processing, judgment is made merely by using the angles formed by the connection lines irrespective of the types of the feature points on each end of the sample connection lines and the registration connection lines differing from the first embodiment. Therefore, the comparison range of the registration numerical value information in the step S36 is increased, and accuracy of verification is decreased in comparison with the first embodiment. However, according to the third embodiment, the amount of information of the registration numerical values and the sample numerical values can be reduced, and the processing can be simplified. Moreover, since the angle does not change considerably even if the size of the finger is increased accompanying growth or the like, the registration numerical values can be utilized for a long period of time.

1.4 Fourth Embodiment

In the fourth embodiment, the sample numerical value including the lengths of the sample connection lines and the angles formed by the connection lines is assigned to each of the extracted sample feature points. In the fourth embodiment, the sample feature points having the sample numerical value group including such sample numerical values, and the registration feature points to which the registration numerical value group obtained in the same manner is assigned are used.

Figures 19A, 19B:
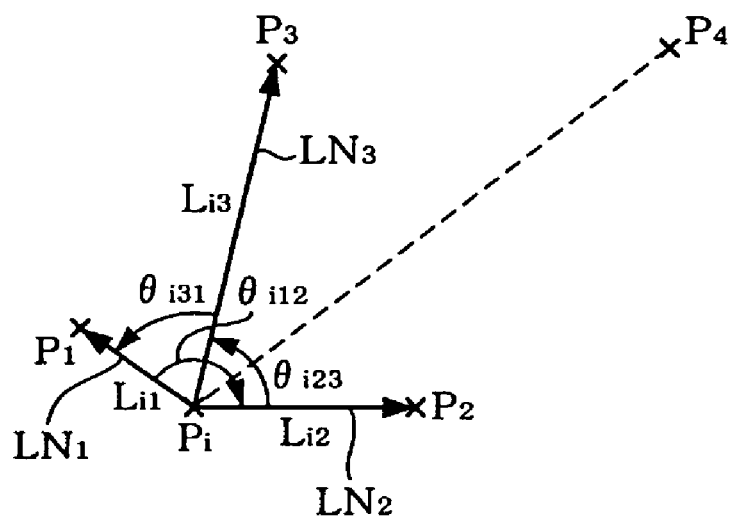
FIGS. 19A and 19B are diagrams illustrating numerical value information in a fourth embodiment.

FIGS. 19A and 19B illustrate the numerical value information including the lengths of the sample connection lines and the angles formed by the connection lines in the fourth embodiment. The following description illustrates the sample numerical value information assigned to the sample feature point. However, the same description applies to the registration numerical value information assigned to the registration feature point.

In FIG. 19A, four sample feature points $P_1$ to $P_4$ close to one sample feature point $P_i$ (first to fourth close sample feature points) among a plurality of extracted sample feature points are illustrated. The connection processing is performed between the sample feature point and the first to third close sample feature points, for example. Specifically, the sample feature point $P_i$ is the starting point of three sample connection lines $LN_1$ to $LN_3$ which connect the sample feature point $P_i$ with the sample feature points $P_1$ to $P_3$. The lengths of the sample connection lines $LN_1$ to $LN_3$ are respectively $L_{i1}$ to $L_{i3}$. The angles formed by the three sample connection lines are three types of angles (angle $\theta_{i12}$ formed by sample connection lines $LN_1$ and $LN_2$, angle $\theta_{i23}$ formed by sample connection lines $LN_2$ and $LN_3$, and angle $\theta_{i31}$ formed by sample connection lines $LN_3$ and $LN_1$).

As shown in FIG. 19B, the lengths $L_{i1}$ to $L_{i3}$ of the sample connection lines and the angles $\theta_{i12}$ to $\theta_{i31}$ formed by the sample connection lines are assigned to the sample feature point $P_i$. It is preferable that the angle be defined in the positive direction (forward direction). For example, the counterclockwise direction is defined as the positive direction, and the value of 0 to 360 degrees is assigned. This enables the numerical value information corresponding to the position relationship between the sample feature point $P_i$ and other sample feature points to be assigned to the sample feature point $P_i$, whereby the information characteristic of the sample feature point can be assigned.

The above description illustrates the case where the numerical value information relating to the sample connection lines connected to the first to third close sample feature points is assigned. However, the same description applies to the case where the numerical value information relating to the sample connection lines connected to the first and second close sample feature points or to the sample connection lines connected to the first to fourth or more close sample feature points is assigned.

The registration processing of the registration numerical value in the fourth embodiment is the same as that in the first embodiment. Therefore, description of the registration processing is omitted. The fingerprint verification processing in the fourth embodiment is the same as that in the first embodiment. Therefore, description of the fingerprint verification processing is omitted. However, in the fingerprint verification processing, judgment is made merely by using the lengths of the connection lines and the angles formed by the connection lines irrespective of the types of the feature points on each end of the sample connection lines and the registration connection lines differing from the first embodiment. Therefore, the comparison range of the registration numerical value information in the step S36 is increased, and accuracy of verification is decreased in comparison with the first embodiment. However, according to the fourth embodi-

1.5 Fifth Embodiment

In the fifth embodiment, in the case where the sample connection line which connects the sample feature point with the close sample feature point is a sample vector, the inner product formed by the sample vectors is assigned to each of the sample feature points as the sample numerical value information. In the fifth embodiment, the sample feature points having the sample numerical value group including such sample numerical values, and the registration feature points to which the registration numerical value group including the inner product of the registration vectors as the registration connection lines is assigned are used.

Figures 20A, 20B:
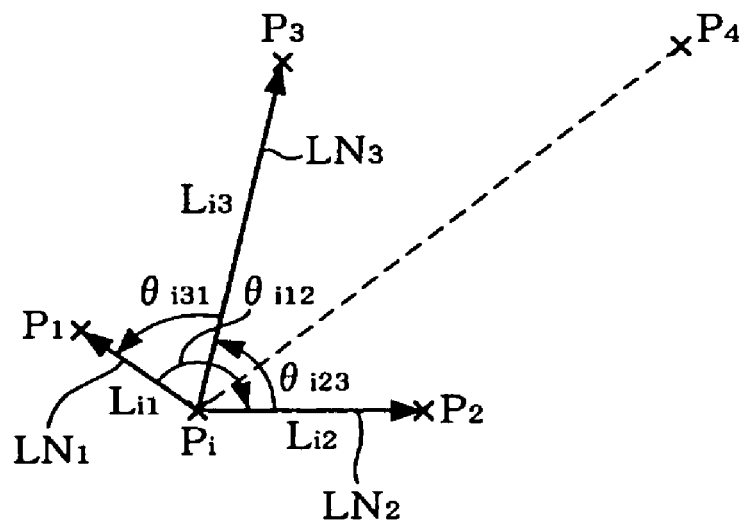
FIGS. 20A and 20B are diagrams illustrating numerical value information in a fifth embodiment.

FIGS. 20A and 20B illustrate the numerical value information in the fifth embodiment. The following description illustrates the sample numerical value information assigned to the sample feature point. However, the same description applies to the registration numerical value information assigned to the registration feature point.

In FIG. 20A, four sample feature points $P_1$ to $P_4$ close to one sample feature point $P_i$ (first to fourth close sample feature points) among a plurality of extracted sample feature points are illustrated. The connection processing is performed between the sample feature point and the first to third close sample feature points, for example. Specifically, the sample feature point $P_i$ is the starting point of three sample connection lines $LN_1$ to $LN_3$ which connect the sample feature point $P_i$ with the sample feature points $P_1$ to $P_3$, and three sample vectors having the sample feature point $P_i$ as the starting point are generated. The lengths of the sample connection lines $LN_1$ to $LN_3$ are respectively $L_{i1}$ to $L_{i3}$. Therefore, the vector lengths of the sample vectors are respectively $L_{i1}$ to $L_{i3}$. The angles formed by the three sample connection lines are three types of angles (angle $\theta_{i12}$ formed by sample connection lines $LN_1$ and $LN_2$, angle $\theta_{i23}$ formed by sample connection lines $LN_2$ and $LN_3$, and angle 74 $_{i31}$ formed by sample connection lines $LN_3$ and $LN_1$).

As shown in FIG. 20B, the inner product formed by the sample vectors is calculated from the vector lengths of two sample vectors and the angle formed by the two sample vectors. The calculated inner products $IP_{i12}$, $IP_{i23}$, and $IP_{i31}$ are assigned to the sample feature point $P_i$.

The inner product $IP_{i12}$ is the inner product calculated from the sample connection lines $LN_1$ and $LN_2$. The inner product $IP_{i23}$ is the inner product calculated from the sample connection lines $LN_2$ and $LN_3$. The inner product $IP_{i31}$ is the inner product calculated from the sample connection lines $LN_3$ and $LN_1$. This enables the numerical value information corresponding to the position relationship between the sample feature point $P_i$ and other sample feature points to be assigned to the sample feature point $P_i$, whereby the information characteristic of the sample feature point can be assigned.

The above description illustrates the case where the numerical value information relating to the sample connection lines connected to the first to third close sample feature points is assigned. However, the same description applies to the case where the numerical value information relating to the sample connection lines connected to the first and second close sample feature points or to the sample connection lines connected to the first to fourth or more close sample feature points is assigned.

The registration processing of the registration numerical value in the fifth embodiment is the same as that in the first embodiment. Therefore, description of the registration processing is omitted. The fingerprint verification processing in the fifth embodiment is the same as that in the first embodiment. Therefore, description of the fingerprint verification processing is omitted. However, in the fingerprint verification processing, judgment is made merely by using the inner products calculated from two of the connection lines irrespective of the types of the feature points on each end of the sample connection lines and the registration connection lines differing from the first embodiment. Therefore, the comparison range of the registration numerical value information in the step S36 is increased, and accuracy of verification is decreased in comparison with the first embodiment. However, according to the fifth embodiment, the amount of information can be reduced in comparison with the fourth embodiment.

1.6 Sixth Embodiment

In the sixth embodiment, the sample numerical values including the numbers of fingerprint ridges which intersect the sample connection lines are assigned to each of the extracted sample feature points. In the sixth embodiment, the sample feature points having the sample numerical value group including such sample numerical values, and the registration feature points to which the registration numerical value group obtained in the same manner is assigned are used.

Figures 21A, 21B:
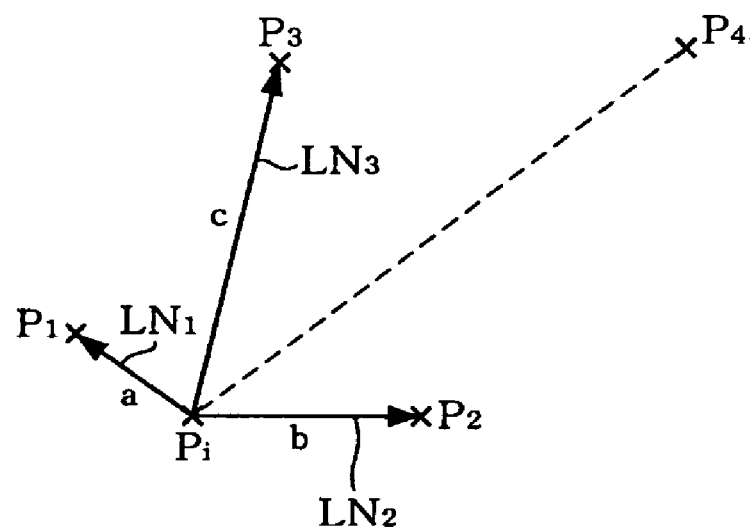
FIGS. 21A and 21B are diagrams illustrating numerical value information in a sixth embodiment.

FIGS. 21A and 21B illustrate the numerical value information including the number of fingerprint ridges in the sixth embodiment. The following description illustrates the sample numerical value information assigned to the sample feature point. However, the same description applies to the registration numerical value information assigned to the registration feature point.

In FIG. 21A, four sample feature points $P_1$ to $P_4$ (first to fourth close sample feature points) among a plurality of extracted sample feature points are illustrated in the order of closeness to one sample feature point $P_i$. The connection processing is performed between the sample feature point and the first to third close sample feature points, for example. Specifically, the sample feature point $P_i$ is the starting point of three sample connection lines $LN_1$ to $LN_3$ which connect the sample feature point $P_i$ with the sample feature points $P_1$ to $P_3$. The numbers of fingerprint ridges (not shown) which intersect each of the sample connection lines $LN_1$ to $LN_3$ are respectively referred to as a, b, and c (a, b, and c are natural numbers).

As shown in FIG. 21B, the numbers of fingerprint ridges which intersect each of the sample connection lines $LN_1$ to $LN_3$ having the sample feature point $P_i$ as the starting point are assigned to the sample feature point $P_i$. This enables the numerical value information corresponding to the position relationship between the sample feature point $P_i$ and other sample feature points to be assigned to the sample feature point $P_i$, whereby the information characteristic of the feature point can be assigned.

The above description illustrates the case where the numerical value information relating to the sample connection lines connected to the first to third close sample feature points is assigned. However, the same description applies to the case where the numerical value information relating to the sample connection lines connected to the first and second close sample feature points or to the sample connection lines connected to the first to fourth or more close sample feature points is assigned.

The registration processing of the registration numerical value in the sixth embodiment is the same as that in the first embodiment. Therefore, description of the registration processing is omitted. The fingerprint verification processing in the sixth embodiment is the same as that in the first embodiment. Therefore, description of the fingerprint verification processing is omitted.

According to the sixth embodiment, since the numbers of fingerprint ridges which intersect the sample connection lines are assigned to each of the sample feature points, accuracy of verification can be improved in comparison with the first embodiment.

1.7 Seventh Embodiment

In the seventh embodiment, the sample numerical value including the numbers of fingerprint ridges which intersect the sample connection lines and the angles formed by the sample connection lines is assigned to each of the extracted sample feature points. In the seventh embodiment, the sample feature points having the sample numerical value group including such sample numerical values, and the registration feature points to which the registration numerical value group obtained in the same manner is assigned are used.

Figures 22A, 22B:
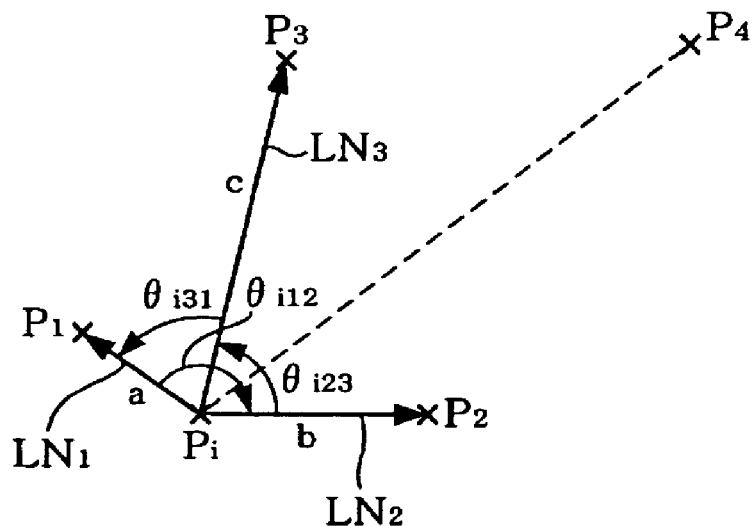
FIGS. 22A and 22B are diagrams illustrating numerical value information in a seventh embodiment.

FIGS. 22A and 22B illustrate the numerical value information including the numbers of fingerprint ridges and the angles formed by the sample connection lines in the seventh embodiment. The following description illustrates the sample numerical value information assigned to the sample feature point. However, the same description applies to the registration numerical value information assigned to the registration feature point.

In FIG. 22A, four sample feature points $P_1$ to $P_4$ (first to fourth close sample feature points) among a plurality of extracted sample feature points are illustrated in the order of closeness to one sample feature point $P_i$. The connection processing is performed between the sample feature point and the first to third close sample feature points, for example. Specifically, the sample feature point $P_i$ is the starting point of three sample connection lines $LN_1$ to $LN_3$ which connect the sample feature point $P_i$ with the sample feature points $P_1$ to $P_3$. The numbers of fingerprint ridges (not shown) which intersect each of the sample connection lines $LN_1$ to $LN_3$ are respectively referred to as a, b, and c.

As shown in FIG. 22B, the numbers of fingerprint ridges which intersect each of the sample connection lines $LN_1$ to $LN_3$ having the sample feature point $P_i$ as the starting point and the angles $\theta_{i12}$ to $\theta_{i13}$ formed by the sample connection lines are assigned to the sample feature point $P_i$. This enables the numerical value information corresponding to the position relationship between the sample feature point $P_i$ and other sample feature points to be assigned to the sample feature point $P_i$, whereby the information characteristic of the feature point can be assigned.

The above description illustrates the case where the numerical value information relating to the sample connection lines connected to the first to third close sample feature points is assigned. However, the same description applies to the case where the numerical value information relating to the sample connection lines connected to the first and second close sample feature points or to the sample connection lines connected to the first to fourth or more close sample feature points is assigned.

The registration processing of the registration numerical value in the seventh embodiment is the same as that in the first embodiment. Therefore, description of the registration processing is omitted. The fingerprint verification processing in the seventh embodiment is the same as that in the first embodiment. Therefore, description of the fingerprint verification processing is omitted.

According to the seventh embodiment, since the numbers of fingerprint ridges which intersect the sample connection lines and the angles formed by the sample connection lines are assigned to each of the sample feature points, accuracy of verification can be improved in comparison with the sixth embodiment.

1.8 Eighth Embodiment

In the eighth embodiment, in the case where the sample connection line which connects the sample feature point with the close sample feature point is a sample ridge vector, and the number of fingerprint ridges which intersect the sample connection line is the vector length, the inner product formed by the sample ridge vectors is assigned to each of the sample feature points as the sample numerical value information. In the eighth embodiment, the sample feature points having the sample numerical value group including such sample numerical values, and the registration feature points to which the registration numerical value group having the number of fingerprint ridges which intersect the registration connection lines as the vector length and including the inner product formed by the registration ridge vectors as the registered connection lines is assigned are used.

Figures 23A, 23B:
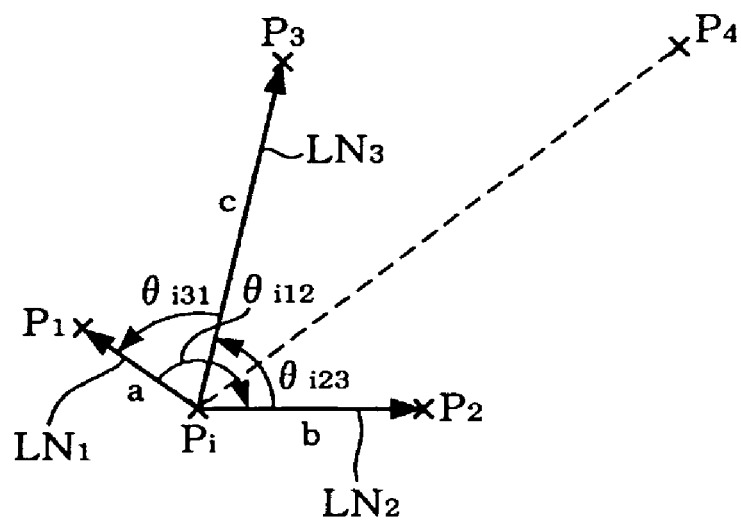
FIGS. 23A and 23B are diagrams illustrating numerical value information in an eighth embodiment.

FIGS. 23A and 23B illustrate the numerical value information including the inner product formed by the sample ridge vectors in the eighth embodiment. The following description illustrates the sample numerical value information assigned to the sample feature point. However, the same description applies to the registration numerical value information assigned to the registration feature point.

In FIG. 23A, four sample feature points $P_1$ to $P_4$ (first to fourth close sample feature points) among a plurality of extracted sample feature points are illustrated in the order of closeness to one sample feature point $P_i$. The connection processing is performed between the sample feature point and the first to third close sample feature points, for example. Specifically, the sample feature point $P_i$ is the starting point of three sample connection lines $LN_1$ to $LN_3$ which connect the sample feature point $P_i$ with the sample feature points $P_1$ to $P_3$, and three sample ridge vectors having the sample feature point $P_i$ as the starting point are generated. In the case where the numbers of the fingerprint ridges which intersect the sample connection lines $LN_1$ to $LN_3$ are respectively a, b, and c, the vector lengths of the three sample ridge vectors are respectively a, b, and c. The angles formed by the three sample connection lines are three types of angles (angle $\theta_{i12}$ formed by sample connection lines $LN_1$ and $LN_2$, angle $\theta_{i23}$ formed by sample connection lines $LN_2$ and $LN_3$, and angle $\theta_{i31}$ formed by sample connection lines $LN_3$ and $LN_1$).

As shown in FIG. 23B, the inner product formed by the sample ridge vectors is calculated from the vector lengths of two sample ridge vectors and the angle formed by the two sample ridge vectors. The inner products $IP_{i12}$, $IP_{i23}$, and $IP_{i31}$ calculated are assigned to the sample feature point $P_i$.

The inner product $IP_{i12}$ is the inner product calculated from the sample connection lines $LN_1$ and $LN_2$. The inner product $IP_{i23}$ is the inner product calculated from the sample connection lines $LN_2$ and $LN_3$. The inner product $IP_{i31}$ is the inner product calculated from the sample connection lines $LN_3$ and $LN_1$. This enables the numerical value information corresponding to the position relationship between the sample feature point $P_i$ and other sample feature points to be assigned to the sample feature point $P_i$, whereby the information characteristic of the sample feature point can be assigned.

The above description illustrates the case where the numerical value information relating to the sample connection lines connected to the first to third close sample feature points is assigned. However, the same description applies to the case where the numerical value information relating to the sample connection lines connected to the first and second close sample feature points or to the sample connection lines connected to the first to fourth or more close sample feature points is assigned.

The registration processing of the registration numerical value in the eighth embodiment is the same as that in the first embodiment. Therefore, description of the registration processing is omitted. The fingerprint verification processing in the eighth embodiment is the same as that in the first embodiment. Therefore, description of the fingerprint verification processing is omitted. According to the eighth embodiment, the amount of information can be reduced in comparison with the seventh embodiment.

1.9 Ninth Embodiment

In the ninth embodiment, the sample numerical value information including the product of the angle formed by two sample connection lines and the real number unit value or the imaginary number unit value assigned to the sample feature points located on each end of the sample connection lines is assigned to each of the sample feature points. In the ninth embodiment, the sample feature points having the sample numerical value group including such sample numerical values, and the registration feature points to which the registration numerical value group obtained in the same manner is assigned are used.

Figures 24A, 24B:
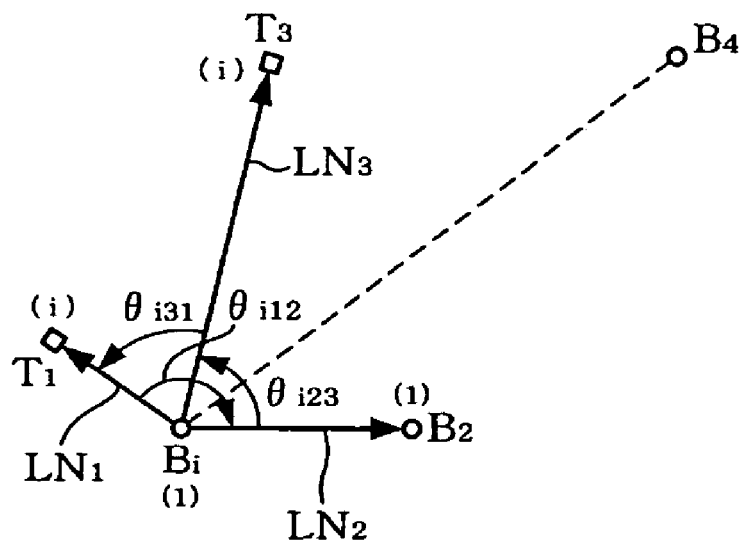
FIGS. 24A and 24B are diagrams illustrating numerical value information assigned to a branch point in a ninth embodiment.

FIGS. 24A and 24B illustrate the numerical value information assigned to a branch point in the ninth embodiment. The following description illustrates the sample numerical value information assigned to the sample feature point in the case where the sample feature point is a branch point. However, the same description applies to the registration numerical value information assigned to the registration feature point in the case where the registration feature point is a branch point.

In FIG. 24A, the sample feature point is a branch point $B_i$, the first close sample feature point is a terminal point $T_1$, the second close sample feature point is a branch point $B_2$, the third close sample feature point is a terminal point $T_3$, and the fourth close sample feature point is a branch point $B_4$. In the case where the connection processing is performed between the sample feature point $B_i$ and the first to third close sample feature points, the sample feature point $B_i$ is the starting point of three sample connection lines which connect the sample feature point $B_i$ with the sample feature points $T_1$, $B_2$, and $T_3$.

The real number unit value (1) is assigned to the sample feature points $B_i$ and $B_2$ which are branch points. The imaginary number unit value (i) is assigned to the sample feature points $T_1$ and $T_3$ which are terminal points.

The sample numerical value group including the product of the angle formed by two of the sample connection lines and the real number unit value or the imaginary number unit value assigned to the sample feature points located on each end of the two sample connection lines is assigned to the sample feature point $B_i$. As a result, the above sample numerical value group is assigned to the sample feature point $B_i$ as the sample numerical value information $(\theta_{i12} \cdot i, \theta_{i23} \cdot i, -\theta_{i31})$, as shown in FIG. 24B.

The sample numerical value "$\theta_{i12} \cdot i$" is a value corresponding to the sample connection lines $LN_1$ and $LN_2$ which connect the sample feature point $B_i$ with the terminal point $T_1$ and the branch point $B_2$. The sample numerical value "$\theta_{i23} \cdot i$" is a value corresponding to the sample connection lines $LN_2$ and $LN_3$ which connect the sample feature point $B_i$ with the branch point $B_2$ and the terminal point $T_3$. The sample numerical value "$-\theta_{i31}$" is a value corresponding to the sample connection lines $LN_3$ and $LN_1$ which connect the sample feature point $B_i$ with the terminal points $T_3$ and $T_1$.

This enables the sample numerical value corresponding to the position relationship between the sample feature point $B_i$ and other sample feature points to be assigned to the sample feature point $B_i$, whereby the information characteristic of the feature point can be assigned.

The above description illustrates the case where the sample feature point is a branch point. However, the sample numerical value can be assigned in the same manner in the case where the sample feature point is a terminal point.

The above description illustrates the case where the numerical value information relating to the sample connection lines connected to the first to third close sample feature points is assigned. However, the same description applies to the case where the numerical value information relating to the sample connection lines connected to the first and second close sample feature points or to the sample connection lines connected to the first to fourth or more close sample feature points is assigned.

The registration processing of the registration numerical value in the ninth embodiment is the same as that in the first embodiment. Therefore, description of the registration processing is omitted. The fingerprint verification processing in the ninth embodiment is the same as that in the first embodiment. Therefore, description of the fingerprint verification processing is omitted.

According to the ninth embodiment, accuracy of verification can be improved in comparison with the first embodiment.

1.10 Tenth Embodiment

In the tenth embodiment, the sample numerical value information including the complex line segment length in the first embodiment and the product of the angle formed by two registration connection lines and the real number unit value or the imaginary number unit value assigned to the registration feature points located on each end of the registration connection lines is assigned to each of the sample feature points. In the tenth embodiment, the sample feature points having the sample numerical value group including such sample numerical values, and the registration feature points to which the registration numerical value group obtained in the same manner is assigned are used.

Figures 25A, 25B:
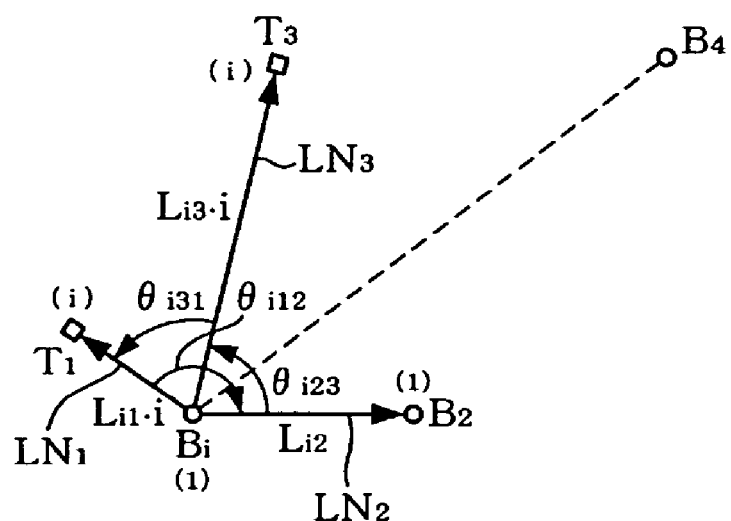
FIGS. 25A and 25B are diagrams illustrating numerical value information assigned to a branch point in a tenth embodiment.

FIGS. 25A and 25B illustrate the numerical value information assigned to a branch point in the tenth embodiment. The following description illustrates the sample numerical value information assigned to the sample feature point in the case where the sample feature point is a branch point. However, the same description applies to the registration numerical value information assigned to the registration feature point in the case where the registration feature point is a branch point.

In FIG. 25A, the sample feature point is a branch point $B_i$, the first close sample feature point is a terminal point $T_1$, the second close sample feature point is a branch point $B_2$, the third close sample feature point is a terminal point $T_3$, and the fourth close sample feature point is a branch point $B_4$. In the case where the connection processing is performed between the sample feature point $B_i$ and the first to third close sample feature points, the sample feature point $B_i$ is the starting point of three sample connection lines $LN_1$ to $LN_3$ which connect the sample feature point $B_i$ with the sample feature points $T_1$, $B_2$, and $T_3$.

The real number unit value (1) is assigned to the sample feature points $B_i$ and $B_2$ which are branch points. The imaginary number unit value (i) is assigned to the sample feature points $T_1$ and $T_3$ which are terminal points.

The sample numerical value group including the complex line segment lengths of each of the sample connection lines in the first embodiment shown in FIG. 3B, and the product of the angle formed by two of the sample connection lines and the real number unit value or the imaginary number unit value assigned to the sample feature points located on each end of the two sample connection lines in the ninth embodiment shown in FIG. 24B is assigned to the sample feature point $B_i$. As a result, the above sample numerical value group is assigned to the sample feature point $B_i$ as the sample numerical value information ($L_{i1} \cdot i$, $L_{i2}$, $L_{i3} \cdot i$, $\theta_{i12} \cdot i$, $\theta_{i23} \cdot i$, $-\theta_{i31}$), as shown in FIG. 25B.

This enables the sample numerical value corresponding to the position relationship between the sample feature point $B_i$ and other sample feature points to be assigned to the sample feature point $B_i$, whereby the information characteristic of the feature point can be assigned.

The above description illustrates the case where the sample feature point is a branch point. However, the sample numerical value can be assigned in the same manner in the case where the sample feature point is a terminal point.

The above description illustrates the case where the numerical value information relating to the sample connection lines connected to the first to third close sample feature points is assigned. However, the same description applies to the case where the numerical value information relating to the sample connection lines connected to the first and second close sample feature points or to the sample connection lines connected to the first to fourth or more close sample feature points is assigned.

The registration processing of the registration numerical value in the tenth embodiment is the same as that in the first embodiment. Therefore, description of the registration processing is omitted. The fingerprint verification processing in the tenth embodiment is the same as that in the first embodiment. Therefore, description of the fingerprint verification processing is omitted.

According to the tenth embodiment, accuracy of verification can be improved in comparison with the ninth embodiment.

1.11 Eleventh Embodiment

In the eleventh embodiment, the product of the inner product formed by the sample vectors in the fifth embodiment and the real number unit value or the imaginary number unit value assigned to the sample feature points located at the starting point and the end point of the sample vector is assigned to each of the sample feature points as the sample numerical value information. In the eleventh embodiment, the sample feature points having the sample numerical value group including such sample numerical values, and the registration feature points to which the registration numerical value information including the product of the inner product formed by the registration vectors (registration connection lines) and the real number unit value or the imaginary number unit value assigned to the registration feature points located at the starting point and the end point of the registration vector is assigned are used.

Figures 26A, 26B:
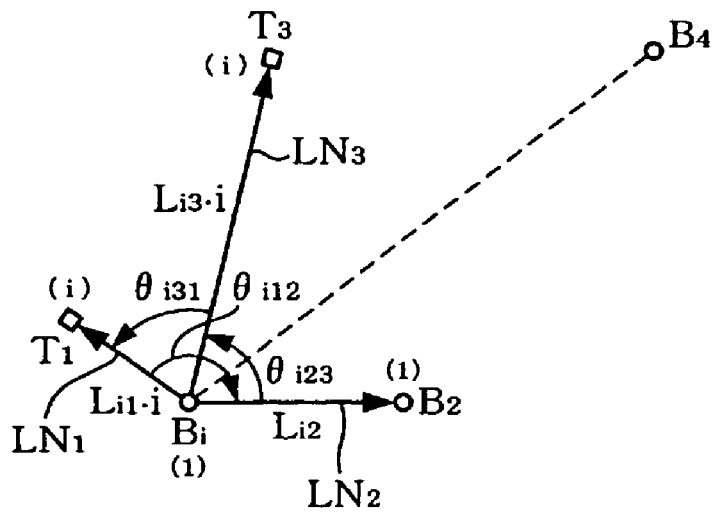
FIGS. 26A and 26B are diagrams illustrating numerical value information assigned to a branch point in an eleventh embodiment.

FIGS. 26A and 26B illustrate the numerical value information assigned to a branch point in the eleventh embodiment. In FIG. 26A, four sample feature points (first to fourth close sample feature points) among a plurality of extracted sample feature points are illustrated in the order of closeness to one sample feature point. The sample feature point is a branch point $B_i$, the first close sample feature point is a terminal point $T_1$, the second close sample feature point is a branch point $B_2$, the third close sample feature point is a terminal point $T_3$, and the fourth close sample feature point is a branch point $B_4$. In the case where the connection processing is performed between the sample feature point $B_i$ and the first to third close sample feature points, the sample feature point $B_i$ is the starting point of the three sample connection lines $LN_1$ to $LN_3$ which connect the sample feature point $T_i$ with the sample feature points $T_1$, $B_2$, and $T_3$.

As shown in FIG. 26B, the products $IIP_{i12}$, $IIP_{i23}$, and $IIP_{i31}$ of the inner product formed by the sample vectors in the fifth embodiment and the real number unit value or the imaginary number unit value assigned to the sample feature points located at the starting point and the end point of the sample vector are assigned to the sample feature point $B_i$. This enables the numerical value information corresponding to the position relationship between the sample feature point $B_i$ and other sample feature points to be assigned to the sample feature point $B_i$, whereby the information characteristic of the feature point can be assigned.

The above description illustrates the case where the sample feature point is a branch point. However, the numerical value information can be assigned in the same manner in the case where the sample feature point is a terminal point.

The above description illustrates the case where the numerical value information relating to the sample connection lines connected to the first to third close sample feature points is assigned. However, the same description applies to the case where the numerical value information relating to the sample connection lines connected to the first and second close sample feature points or to the sample connection lines connected to the first to fourth or more close sample feature points is assigned.

The registration processing of the numerical value information in the eleventh embodiment is the same as that in the first embodiment. Therefore, description of the registration processing is omitted. The fingerprint verification processing in the eleventh embodiment is the same as that in the first embodiment. Therefore, description of the fingerprint verification processing is omitted.

According to the eleventh embodiment, accuracy of verification can be improved in comparison with the fifth embodiment.

1.12 Twelfth Embodiment

In the twelfth embodiment, the sample numerical value information including a complex number of ridges, which is newly defined, is assigned to each of the extracted sample feature points. The complex number of ridges is the product of the real number unit value (1) or the imaginary number unit value (i) assigned to each of the feature points located on each end of the connection line and the number of fingerprint ridges which intersect the connection line. Therefore, the sample numerical value expressed by a real number (positive number or negative number) or a complex number is assigned to each of the extracted sample feature points. Therefore, even in the case where the lengths of the sample connection lines which connect one sample feature point with other feature points are the same, different numerical value information can be assigned to the sample feature point if the types or positions of the sample feature points on the ends are different. In the twelfth embodiment, the sample feature points having the sample numerical value group including such sample numerical values, and the registration feature points to which the registration numerical value group obtained in the same manner is assigned are used.

Figures 27A, 27B:
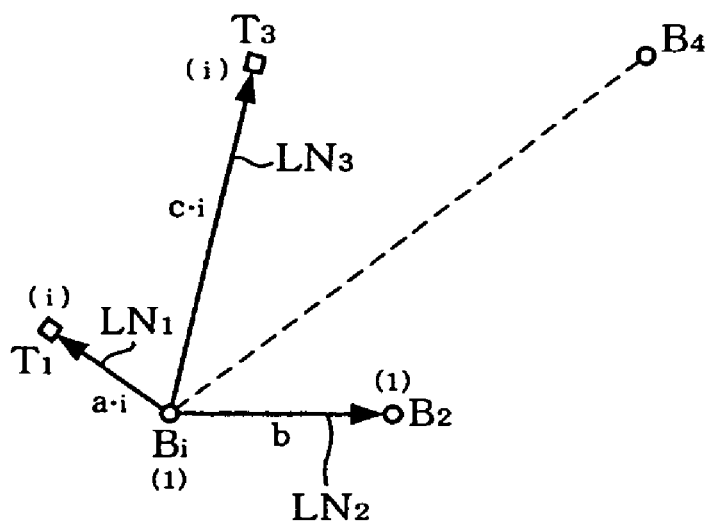
FIGS. 27A and 27B are diagrams illustrating numerical value information assigned to a branch point in a twelfth embodiment.

FIGS. 27A and 27B illustrate the numerical value information assigned to a branch point in the twelfth embodiment. The following description illustrates the sample numerical value information assigned to the sample feature point in the case where the sample feature point is a branch point. However, the same description applies to the registration numerical value information assigned to the registration feature point in the case where the registration feature point is a branch point.

In FIG. 27A, four sample feature points (first to fourth close sample feature points) among a plurality of extracted sample feature points are illustrated in the order of closeness to one sample feature point. The sample feature point is a branch point $B_i$, the first close sample feature point is a terminal point $T_1$, the second close sample feature point is a branch point $B_2$, the third close sample feature point is a terminal point $T_3$, and the fourth close sample feature point is a branch point $B_4$. In the case where the connection processing is performed between the sample feature point $B_i$ and the first to third close sample feature points, the sample feature point $B_i$ is the starting point of three sample connection lines $LN_1$ to $LN_3$ which connect the sample feature point $T_i$ with the sample feature points $T_1$, $B_2$, and $T_3$.

The real number unit value (1) is assigned to the sample feature points $B_i$ and $B_2$ which are branch points. The imaginary number unit value (i) is assigned to the sample feature points $T_1$ and $T_3$ which are terminal points. The product of the real number unit value or the imaginary number unit value assigned to the sample feature points located on each end of the connection line having the sample feature point $B_i$ as the starting point and the number of fingerprint ridges (not shown) which intersect the connection line is calculated.

In FIG. 27A, in the case where the numbers of fingerprint ridges which intersect each of the sample connection lines $LN_1$ to $LN_3$ are respectively referred to as a, b, and c (a, b, and c are natural numbers), the sample numerical value information (a·i, b, c·i) is assigned to the sample feature point $B_i$.

The complex number of ridges "a·i" is a value corresponding to the sample connection line $LN_1$ which connects the sample feature point $B_i$ to which the real number unit value is assigned with the terminal point $T_1$ to which the imaginary number unit value is assigned. The complex number of ridges "b" is a value corresponding to the sample connection line $LN_2$ which connects the sample feature point $B_i$ to which the real number unit value is assigned with the branch point $B_2$. The complex number of ridges "c·i" is a value corresponding to the sample connection line $LN_3$ which connects the sample feature point $B_i$ to which the real number unit value is assigned with the terminal point $T_3$ to which the imaginary number unit value is assigned.

This enables the numerical value information corresponding to the position relationship between the sample feature point $B_i$ and other feature points to be assigned to the sample feature point $B_i$, whereby the information characteristic of the sample feature point can be assigned.

Figures 28A, 28B:
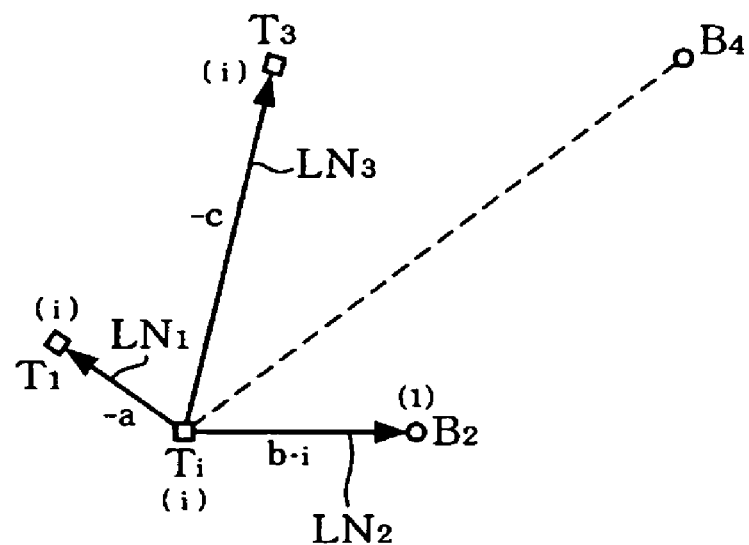
FIGS. 28A and 28B are diagrams illustrating numerical value information assigned to a terminal point in the twelfth embodiment.

FIGS. 28A and 28B illustrate the numerical value information assigned to a terminal point in the twelfth embodiment. The following description illustrates the sample numerical value information assigned to the sample feature point in the case where the sample feature point is a terminal point. However, the same description applies to the registration numerical value information assigned to the registration feature point in the case where the registration feature point is a terminal point.

In FIG. 28A, four sample feature points (first to fourth close sample feature points) are illustrated in the order of closeness to the objective terminal point in the same manner as in FIG. 27A. The sample feature point is a terminal point $T_i$, the first close sample feature point is a terminal point $T_1$, the second close sample feature point is a branch point $B_2$, the third close sample feature point is a terminal point $T_3$, and the fourth close sample feature point is a branch point $B_4$. In the case where the connection processing is performed between the sample feature point $T_i$ and the first to third close sample feature points, the sample feature point $T_i$ is the starting point of three sample connection lines $LN_1$ to $LN_3$ which connect the sample feature point $T_i$ with the sample feature points $T_1$, $B_2$, and $T_3$.

The real number unit value (1) is assigned to the sample feature point $B_2$ which is a branch point. The imaginary number unit value (i) is assigned to the sample feature points $T_i$, $T_1$, and $T_3$ which are terminal points. The product of the real number unit value or the imaginary number unit value assigned to the sample feature points located on each end of the connection line having the sample feature point $T_i$ as the starting point and the number of fingerprint ridges (not shown) which intersect the connection line is calculated. In FIG. 28A, in the case where the numbers of the fingerprint ridges which intersect each of the sample connection lines $LN_1$ to $LN_3$ are respectively referred to as a, b, and c (a, b, and c are natural numbers), the sample numerical value information (−a, b·i, −c) is assigned to the sample feature point $T_i$.

The complex number of ridges "−a" is a value corresponding to the sample connection line $LN_1$ which connects the sample feature point $T_i$ to which the imaginary number unit value is assigned with the terminal point $T_1$ to which the imaginary number unit value is assigned. The complex number of ridges "b·i" is a value corresponding to the sample connection line $LN_2$ which connects the sample feature point $T_i$ to which the imaginary number unit value is assigned with the branch point $B_2$. The complex number of ridges "−c" is a value corresponding to the sample connection line $LN_3$ which connects the feature point $T_i$ to which the imaginary number unit value is assigned with the terminal point $T_3$ to which the imaginary number unit value is assigned.

This enables the numerical value information corresponding to the position relationship between the sample feature point $T_i$ and other feature points to be assigned to the sample feature point $T_i$, whereby the information characteristic of the sample feature point can be assigned.

The above description illustrates the case where the numerical value information relating to the sample connection lines connected to the first to third close sample feature points is assigned. However, the same description applies to the case where the numerical value information relating to the sample connection lines connected to the first and second close sample feature points or to the sample connection lines connected to the first to fourth or more close sample feature points is assigned.

The registration processing of the registration numerical value in the twelfth embodiment is the same as that in the first embodiment. Therefore, description of the registration processing is omitted. The fingerprint verification processing in the twelfth embodiment is the same as that in the first embodiment. Therefore, description of the fingerprint verification processing is omitted.

According to the twelfth embodiment, the processing depends on the position of each feature point, and the amount of information can be reduced in comparison with the above embodiments.

1.13 Thirteenth Embodiment

In the thirteenth embodiment, the product of the inner product formed by the sample ridge vectors in the eighth embodiment and the real number unit value or the imaginary number unit value assigned to the sample feature points located at the starting point and the end point of the sample ridge vectors is assigned to each of the sample feature points as the sample numerical value information. In the thirteenth embodiment, the sample feature points having the sample numerical value group including such sample numerical values, and the registration feature points to which the registration numerical value information including the product of the inner product formed by the registration ridge vectors in the eighth embodiment and the real number unit value or the imaginary number unit value assigned to the registration feature points located at the starting point and the end point of the registration ridge vectors is assigned are used.

Figures 29A, 29B:
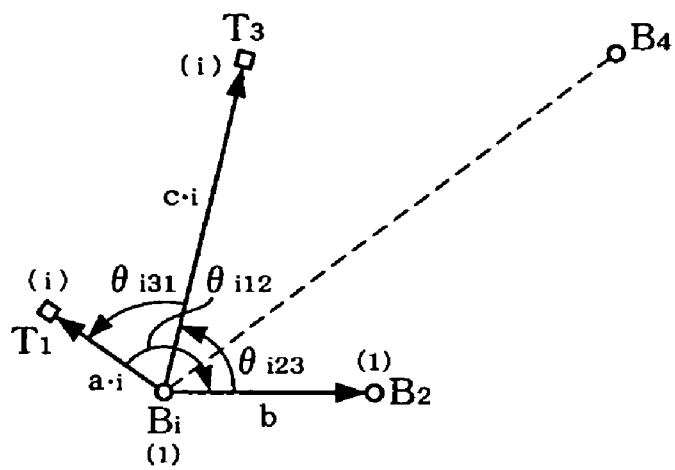
FIGS. 29A and 29B are diagrams illustrating numerical value information assigned to a branch point in a thirteenth embodiment.

FIGS. 29A and 29B illustrate the numerical value information in the thirteenth embodiment. The following description illustrates the sample numerical value information assigned to the sample feature point. However, the same description applies to the registration numerical value information assigned to the registration feature point.

In FIG. 29A, the sample feature point is a branch point $B_i$, the first close sample feature point is a terminal point $T_1$, the second close sample feature point is a branch point $B_2$, the third close sample feature point is a terminal point $T_3$, and the fourth close sample feature point is a branch point $B_4$. In the case where the connection processing is performed between the sample feature point $B_i$ and the first to third close sample feature points, the sample feature point $B_i$ is the starting point of the three sample connection lines $LN_1$ to $LN_3$ which connect the sample feature point $B_i$ with the sample feature points $T_1$, $B_2$, and $T_3$. The numbers of the fingerprint ridges (not shown) which intersect each of the sample connection lines $LN_1$ to $LN_3$ are respectively referred to as a, b, and c (a, b, and c are natural numbers).

The real number unit value (1) is assigned to the sample feature points $B_i$ and $B_2$ which are branch points. The imaginary number unit value (i) is assigned to the sample feature points $T_1$ and $T_3$ which are terminal points.

As shown in FIG. 29B, the products $IIP_{i12}$, $IIP_{i23}$, and $IIP_{i31}$ of the inner product formed by the sample ridge vectors as in the eighth embodiment and the real number unit value or the imaginary number unit value assigned to the sample feature points located at the starting point and the end point of the sample ridge vectors is assigned to each of the sample feature points.

In the thirteenth embodiment, the inner product $IIP_{i12}$ is calculated from the product of the complex number of ridges "a" of the sample connection line $LN_1$, the complex number of ridges "b" of the sample connection line $LN_2$, and the real number unit value or the imaginary number unit value assigned to the sample feature points located on each end of each of the sample connection lines $LN_1$ and $LN_2$. The inner product $IIP_{i23}$ is calculated from the product of the complex number of ridges "b" of the sample connection line $LN_2$, the complex number of ridges "c" of the sample connection line $LN_3$, and the real number unit value or the imaginary number unit value assigned to the sample feature points located on each end of each of the sample connection lines $LN_2$ and $LN_3$. The inner product $IIP_{i31}$ is calculated from the product of the complex number of ridges "c" of the sample connection line $LN_3$, the complex number of ridges "a" of the sample connection line $LN_1$, and the real number unit value or the imaginary number unit value assigned to the sample feature points located on each end of each of the sample connection lines $LN_3$ and $LN_1$.

This enables the numerical value information corresponding to the position relationship between the sample feature point $B_i$ and other sample feature points to be assigned to the sample feature point $B_i$, whereby the information characteristic of the feature point can be assigned.

The above description illustrates the case where the sample feature point is a branch point. However, the numerical value information can be assigned in the same manner in the case where the sample feature point is a terminal point.

The above description illustrates the case where the numerical value information relating to the sample connection lines connected to the first to third close sample feature points is assigned. However, the same description applies to the case where the numerical value information relating to the sample connection lines connected to the first and second close sample feature points or to the sample connection lines connected to the first to fourth or more close sample feature points is assigned.

The registration processing of the registration numerical value in the thirteenth embodiment is the same as that in the first embodiment. Therefore, description of the registration processing is omitted. The fingerprint verification processing in the thirteenth embodiment is the same as that in the first embodiment. Therefore, description of the fingerprint verification processing is omitted.

According to the thirteenth embodiment, accuracy of verification can be improved in comparison with the eighth embodiment.

The first to thirteenth embodiments illustrate the sample numerical value information assigned to the sample feature point extracted from the acquired fingerprint image. The position information of each feature point used to confirm the position of the sample feature point and the position of the registration feature point is calculated in the same manner in each of the embodiments.

As described above, in the first to thirteenth embodiments, the numerical value information calculated from the position relationship between one sample feature point and other sample feature points is assigned to each of the sample feature points extracted from the acquired fingerprint image. The registration numerical value information calculated in the same manner before performing the fingerprint verification processing is compared with the sample numerical value information assigned to the sample feature point of the fingerprint image acquired for verification, and the feature points to be compared are selected. The positions of the selected feature points are compared with the positions of the registration points corresponding to the selected feature points. This enables the load of the comparison processing between the registration points registered in advance and the feature points to be significantly reduced. Therefore, mounting of a fingerprint verification device on a portable information instrument can be facilitated.

2. Fingerprint Verification Device

A fingerprint verification device which realizes the above-described fingerprint verification method is described below.

Figure 30:
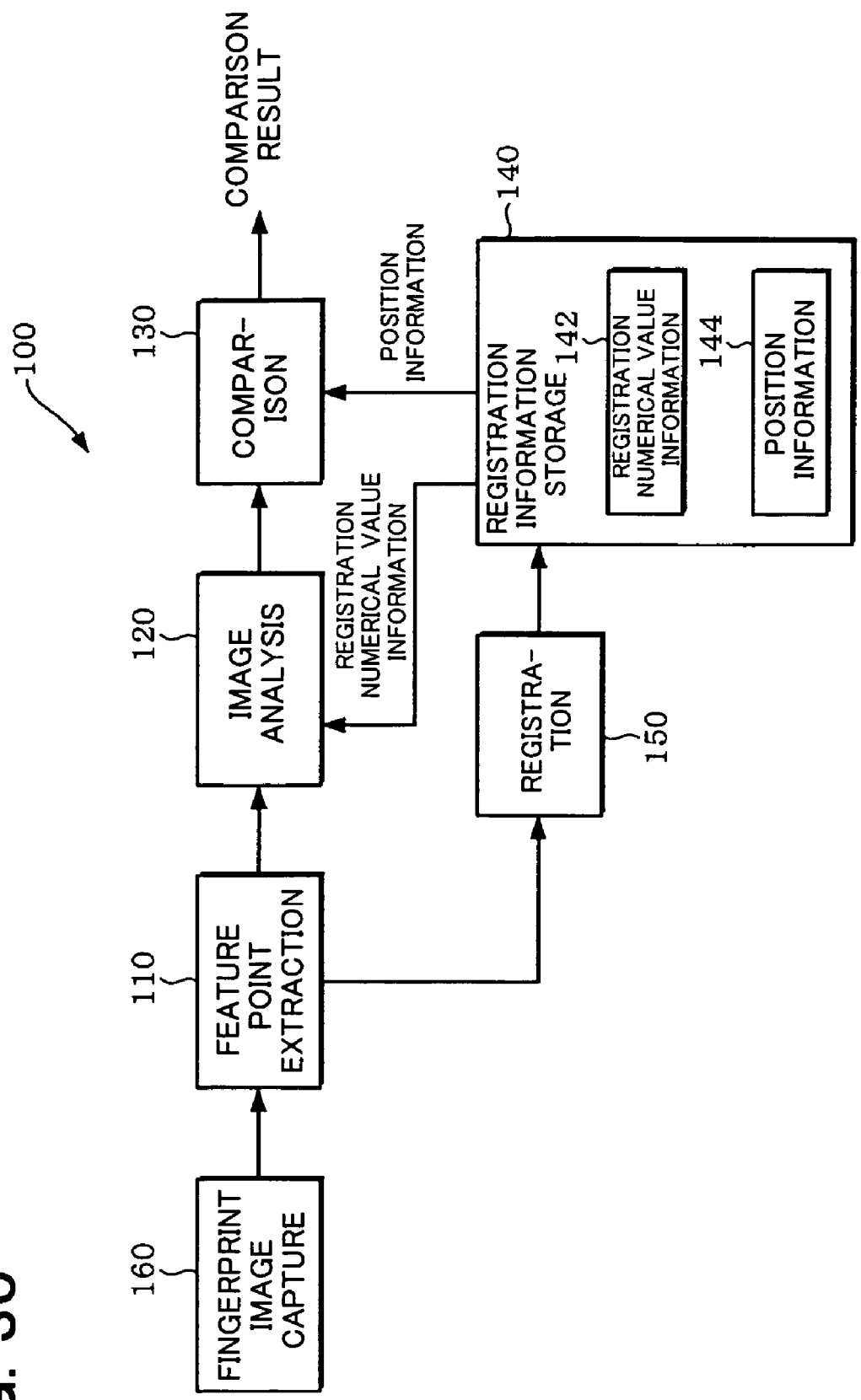
FIG. 30 is a block diagram schematically showing a configuration of a fingerprint verification device.

FIG. 30 shows a block diagram of an outline of a configuration of a fingerprint verification device. A fingerprint verification device 100 includes a feature point extraction section 110, an image analysis section 120, a comparison section 130, a registration information storage section 140, and a registration section 150.

The feature point extraction section 110 extracts the sample feature points shown in FIG. 2 from a fingerprint image acquired. In more detail, the feature point extraction section 110 extracts branch points and terminal points from the fingerprint image while distinguishing the branch points from the terminal points. A fingerprint image supplied to the feature point extraction section 110 may be input from the outside of the fingerprint verification device 100. The fingerprint verification device 100 may include a fingerprint image capture section 160 which captures a fingerprint image. In this case, a fingerprint image captured by the fingerprint image capture section 160 is supplied to the feature point extraction section 110.

The image analysis section 120 assigns the above-described numerical value information to each of the feature points of the fingerprint image extracted by the feature point extraction section 110, and selects the feature points to be compared by comparing the numerical value information with the registration numerical value information stored in the registration information storage section 140.

The comparison section 130 compares the position relationship among the sample feature points to be compared with the position relationship among the registration feature points associated with the sample feature points to be verified, and outputs the comparison results. The positions of the feature points to be compared are determined by the feature point extraction section 110 or the image analysis section 120.

The registration information storage section 140 stores registration numerical value information 142 and position information 144 of the registration feature points. Therefore, the position relationship among the registration feature points associated with the sample feature points to be compared is calculated based on the information stored in the registration information storage section 140.

The registration section 150 performs the registration processing. In more detail, the registration section 150 calculates the registration numerical value information and the position information of the registration feature points extracted for registration by the feature point extraction section 110. The registration section 150 performs processing for storing the registration numerical value information and the position information in the registration information storage section 140 while associating the registration numerical value information and the position information with each of the registration feature points.

A configuration example of the fingerprint verification device 100 is described below in detail. The fingerprint verification device 100 may be applied to a portable information device (information instrument) such as an IC card, for which a high degree of security protection is required. In this case, the fingerprint verification device 100 preferably has a function of the fingerprint image capture section 160.

Figure 31:
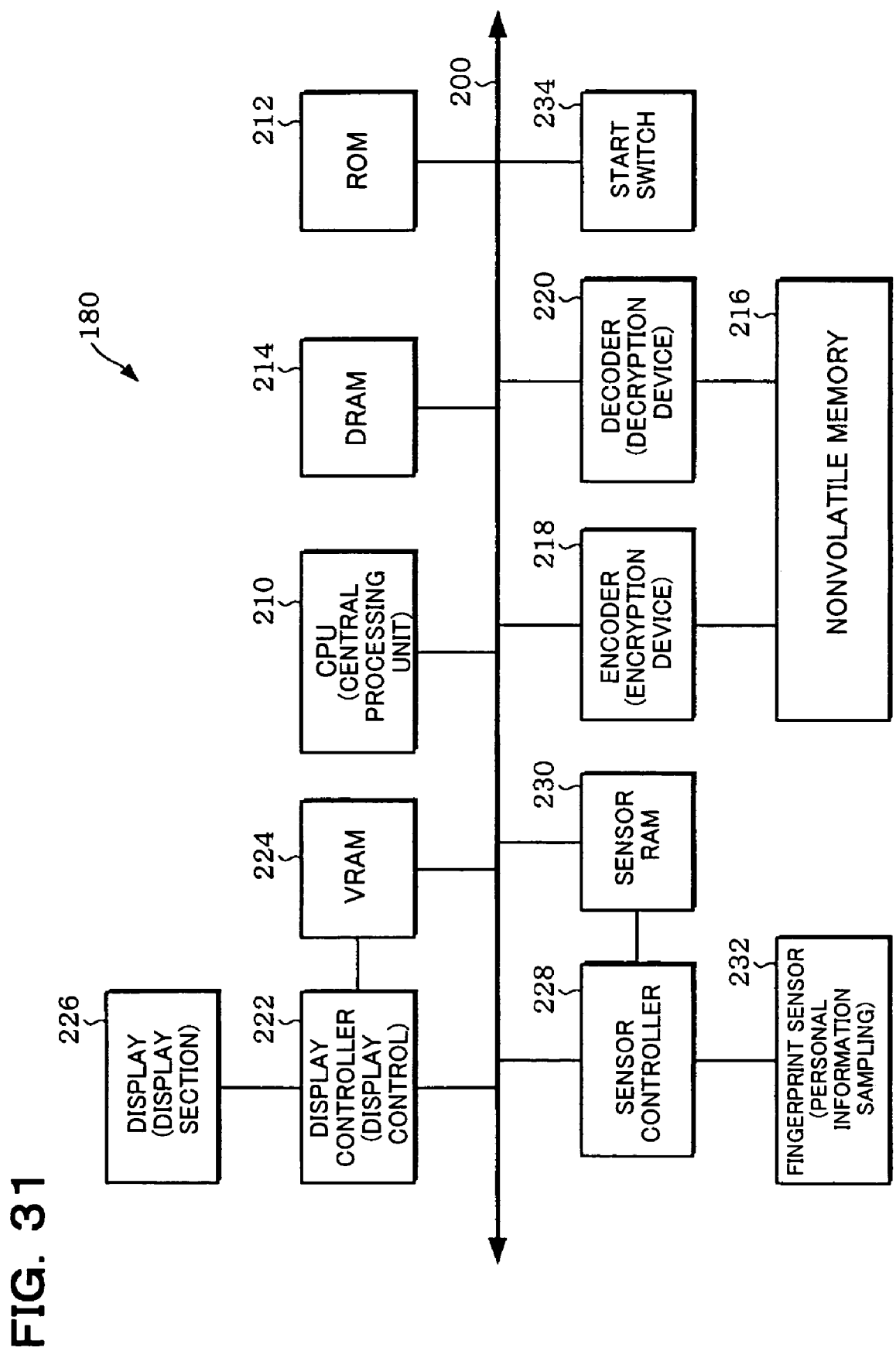
FIG. 31 is a block diagram showing a hardware configuration example of a fingerprint verification device.

FIG. 31 shows a block diagram of an example of a detailed configuration of an IC card to which the fingerprint verification device 100 is applied. Each section of an IC card 180 is controlled by a central processing unit (hereinafter abbreviated as "CPU") 210 connected with a bus 200 according to a program stored in a read only memory (hereinafter abbreviated as "ROM") connected with the bus 200. The CPU 210 performs various types of processing by using a dynamic random access memory (DRAM) 214 as a temporary storage device for a work area. As the temporary storage device, a static random access memory (SRAM) may also be used.

The CPU 210 reads or writes card information stored in a nonvolatile memory 216 as a long-term storage device. The card information is personal information (bank balance, for example) for which a high degree of security protection is required. Therefore, in the case of writing the card information in the nonvolatile memory 216, the card information is encoded (encrypted) by using an encoder (encryption device) 218. In the case of reading the card information from the nonvolatile memory 216, the card information is decoded (decrypted) by using a decoder (decryption device) 220. As the nonvolatile memory 216, a flash memory or SRAM may be used.

A display controller (display control section) 222 and a VRAM 224 are connected with the bus 200. The display controller 222 displays an image in a display (display section) 226 based on image data stored in the VRAM 224.

A sensor controller (personal information sampling section control section) 228 and a sensor RAM 230 are connected with the bus 200. The sensor controller 228 detects the ridges and furrows of the fingerprint by using a fingerprint sensor (personal information sampling section or fingerprint image capture section) 232, and stores the image corresponding to the ridges and furrows of the fingerprint in the sensor RAM as a fingerprint image.

The function of the fingerprint image capture section 160 is realized by the fingerprint sensor 232. The functions of the feature point extraction section 110, the image analysis section 120, the comparison section 130, and the registration section 150 are realized by the CPU 210 which executes a program stored in the ROM 212. The function of the registration information storage section 140 is realized by the ROM 212 or the nonvolatile memory 216.

For example, a program for executing the processing shown in FIGS. 1, 5, and 10 is stored in the ROM 212 or the nonvolatile memory 216, and the CPU 210 appropriately reads the program and executes it. The registration numerical value information shown in FIG. 9 is stored in the nonvolatile memory 216. The first and second comparison results are generated on the DRAM 214, for example.

In the IC card 180 having such a configuration, whether or not the fingerprint image captured by using the fingerprint sensor 232 is the fingerprint image of the genuine person registered in advance is verified. If the fingerprint image is confirmed to be the fingerprint image of the registered genuine person as a result of comparison, personal information stored in the nonvolatile memory 216 is read or displayed, for example.

Each element of the IC card 180 is not necessarily realized by the devices shown in FIG. 31. For example, the feature point of the fingerprint image is not necessarily extracted by using software. The feature point of the fingerprint image may be extracted by using hardware such as a generalpurpose chip or a dedicated chip. A configuration in which the nonvolatile memory 216 can be accessed without using the encoder 218 and the decoder 220 may be employed. In this case, the CPU 210 may access the nonvolatile memory 216 while encoding or decoding the card information.

A fingerprint sensor described below may be used for the IC card 180, for example. This enables reduction of power consumption and reduction of size and weight necessary for a portable information instrument to be achieved.

2.1 Fingerprint Sensor

As a fingerprint detection method for the fingerprint sensor 232 used as the fingerprint image capture section, various fingerprint detection methods can be given. The fingerprint detection method is not limited insofar as the fingerprint image can be read. However, reduction of space can be realized by using conventional manufacturing technology, and the ridges and furrows of the fingerprint can be detected with high accuracy by using a capacitance detection type fingerprint sensor described below as the fingerprint sensor 232.

Figure 32:
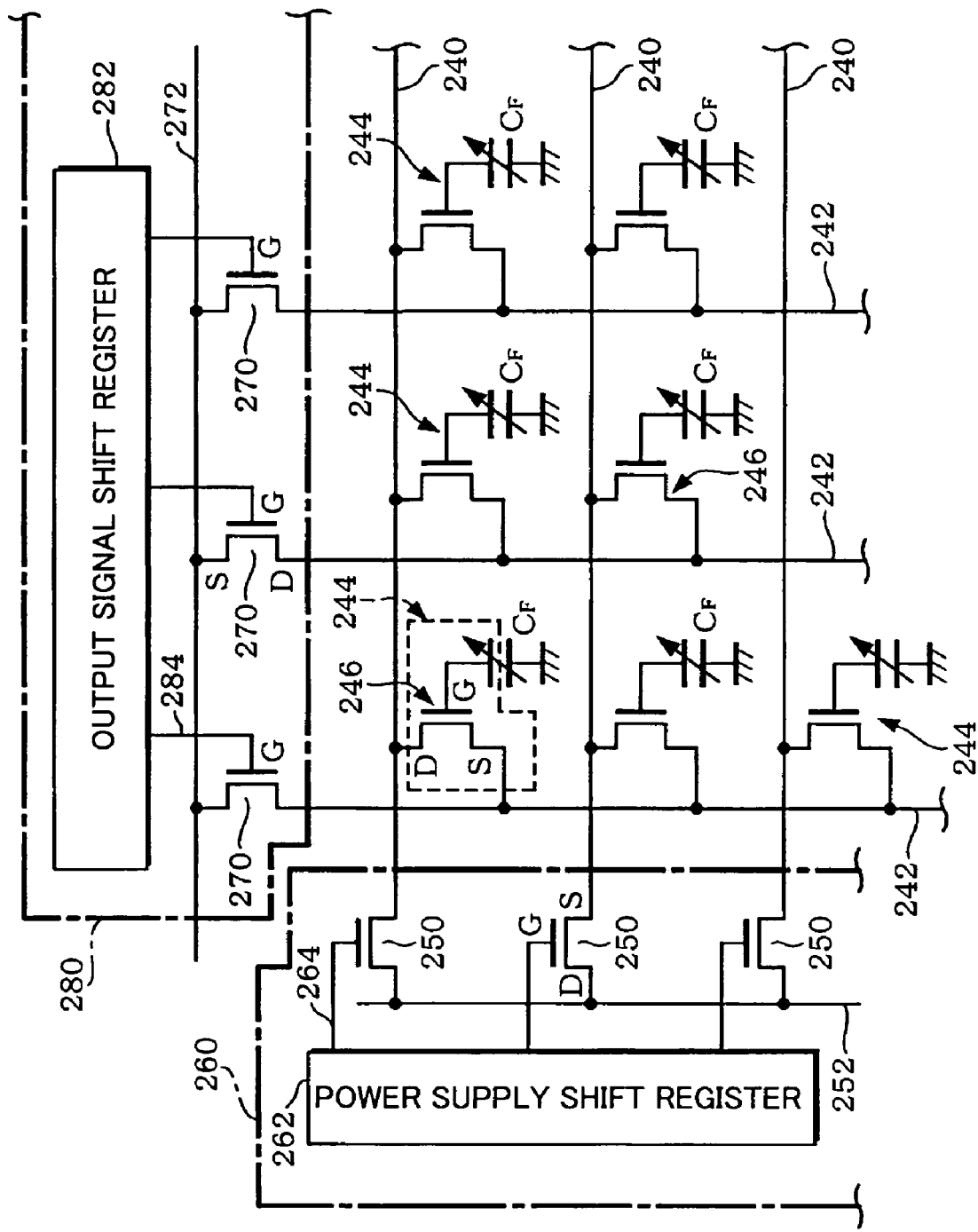
FIG. 32 is a configuration diagram showing an example of a configuration of a fingerprint sensor.

FIG. 32 shows an example of a configuration of the fingerprint sensor 232. The fingerprint sensor 232 includes j power supply lines 240 (j is an integer greater than or equal to two), and k output lines 242 (k is an integer greater than or equal to two). A capacitance detection element 244 is provided at each intersecting point of the j power supply lines 240 and the k output lines 242.

The capacitance detection element 244 is illustrated as a closed circuit when a finger is in contact with the capacitance detection element 244. The capacitance detection element 244 includes a variable capacitor $C_F$ of which the capacitance is changed depending on the ridge and furrow pattern of the fingerprint, and a signal amplification element such as a signal amplification MIS thin film semiconductor device 246 (hereinafter abbreviated as "signal amplification TFT"). If a finger is not in contact with the capacitance detection element 244, a grounding terminal of the variable capacitor $C_F$ is in an open state. The variable capacitor $C_F$ is described later.

The j power supply lines 240 are connected with drains D of the k signal amplification TFTs 246 arranged along the corresponding row. Each of the j power supply lines 240 is connected with a common power supply line 252 through each of j power supply pass gates 250. Specifically, the power supply pass gate 250 is formed by a MIS thin film semiconductor device. A source S of the power supply pass gate 250 is connected with the power supply line 240, and a drain D of the power supply pass gate 250 is connected with the common power supply line 252. A power supply shift register 262 is provided inside a power supply select circuit 260 in addition to the j power supply pass gates 250 and the common power supply line 252. A gate G of each of the j power supply pass gates 250 is connected with a power supply select output line 264 of the power supply shift register 262.

The k output lines 242 are connected with sources S of the j signal amplification TFTs 246 arranged along the corresponding column. The k output lines 242 are connected with a common output line 272 through k output signal pass gates 270. Specifically, the output signal pass gate 270 is formed by a MIS thin film semiconductor device. A drain D of the output signal pass gate 270 is connected with the output line 242, and a source S of the output signal pass gate 270 is connected with the common output line 272. An output signal shift register 282 is provided inside an output signal select circuit 280 in addition to the k output signal pass gates 270 and the common output line 272. A gate G of the output signal pass gate 270 is connected with an output select output line 284 of the output signal shift register 282.

Figure 33:
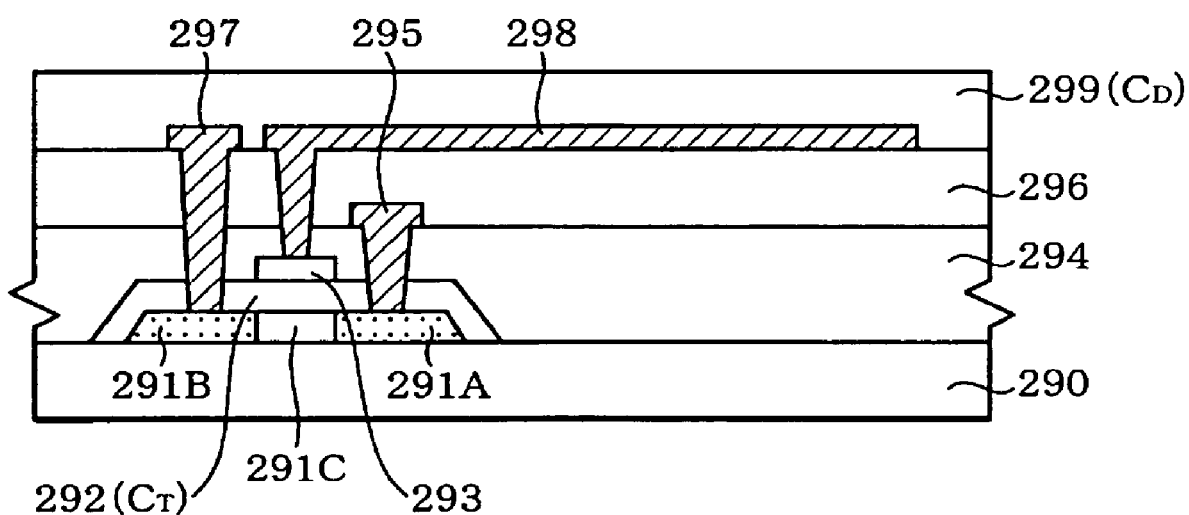
FIG. 33 is a cross-sectional view showing an electrostatic capacitance detection element of a fingerprint sensor.

FIG. 33 shows a cross-sectional view of the capacitance detection element 244 shown in FIG. 32. FIG. 33 shows a state in which a finger is not in contact with the capacitance detection element 244. The capacitance detection element 244 includes a signal detection element 248 in addition to the signal amplification TFT 246 which is the signal amplification element.

In FIG. 33, a semiconductor film 291 including a source region 291A, a drain region 291B, and a channel region 291C which is formed between the source region 291A and the drain region 291B is formed on an insulating layer 290. A gate insulating film 292 is formed on the semiconductor film 291. A gate electrode 293 is formed in a region which faces the channel region 291C with the gate insulating film 292 interposed therebetween. The semiconductor film 291, the gate insulating film 292, and the gate electrode 293 make up the signal amplification TFT 246. The power supply pass gate 250 and the output signal pass gate 270 are formed in the same manner as the signal amplification TFT 246.

The signal amplification TFT 246 is covered with a first interlayer dielectric 294. A first interconnect layer 295 corresponding to the output line 242 shown in FIG. 33 is formed on the first interlayer dielectric 294. The first interconnect layer 295 is connected with the source region 291A of the signal amplification TFT 246.

The first interconnect layer 295 is covered with a second interlayer dielectric 296. A second interconnect layer 297 corresponding to the power supply line 240 shown in FIG. 33 is formed on the second interlayer dielectric 296. The second interconnect layer 297 is connected with the drain region 291B of the signal amplification TFT 246. As a structure differing from the structure shown in FIG. 33, the second interconnect layer 297 may be formed on the first interlayer dielectric 294, and the first interconnect layer 295 may be formed on the second interlayer dielectric 296.

A capacitance detection electrode 298 is formed on the second interlayer dielectric 296. A capacitance detection dielectric film 299 is formed to cover the capacitance detection electrode 298. The capacitance detection dielectric film 299 is located on the outermost surface of the fingerprint sensor 232, and functions as a protective film. A finger comes in contact with the capacitance detection dielectric film 299. The signal detection element 248 is made up of the capacitance detection electrode 298 and the capacitance detection dielectric film 299.

A fingerprint is detected by the fingerprint sensor 232 by allowing a finger to come in contact with the capacitance detection dielectric film 299 shown in FIG. 33. In FIG. 32, a signal is sequentially extracted from the j×k capacitance detection elements 244 by providing a power supply voltage to one of the j power supply lines 240 and detecting a signal from one of the k output lines 242.

The fingerprint detection operation is roughly divided into (1) a case where a ridge (projecting section) of the fingerprint comes in contact with the capacitance detection dielectric film 299, and (2) a case where a furrow (recess section) of the fingerprint faces the capacitance detection dielectric film 299.

(1) Case Where Ridge (Projecting Section) of Fingerprint Pattern Comes in Contact with Capacitance Detection Dielectric Film 299

Figure 34:
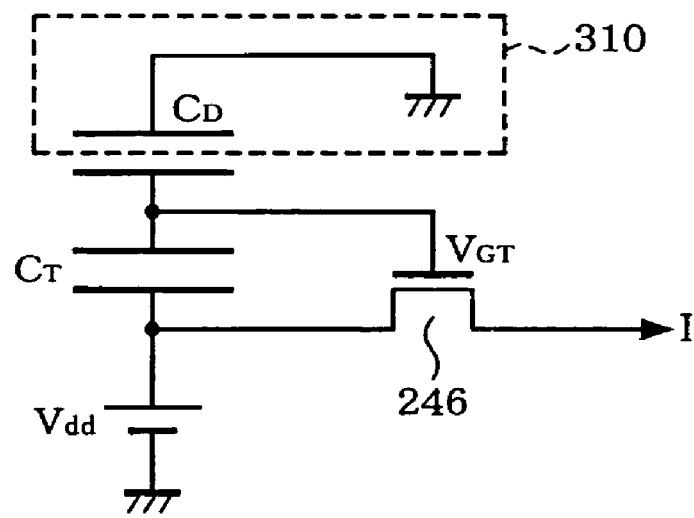
FIG. 34 is an equivalent circuit diagram of an electrostatic capacitance detection element when a ridge of a fingerprint is allowed to come in contact with a dielectric film of a fingerprint sensor.

FIG. 34 shows an equivalent circuit of the capacitance detection element 244 in this case.

A symbol 310 corresponds to a ridge of a human fingerprint. A grounding electrode 310 which faces the capacitance detection electrode 298 shown in FIG. 33 with the dielectric film 299 interposed therebetween is formed in a region indicated by the symbol 310. A power supply voltage Vdd is supplied from the common power supply line 252. A symbol $C_T$ indicates a transistor capacitor of the signal amplification TFT 246. A symbol $C_D$ indicates a capacitor between the detection electrode 300 and the grounding electrode (finger) 310.

The length of the gate electrode of the signal amplification TFT 246 is referred to as L (μm), the width of the gate electrode is referred to as W (μm), the thickness of the gate insulating film is referred to as tox (μm), the relative dielectric constant of the gate insulating film is referred to as $\in$ox, and the dielectric constant under vacuum is referred to as $\in$o. The capacitance of the transistor capacitor $C_T$ is expressed as follows.

$$C_T = \in o \cdot \in ox \cdot L \cdot W/tox$$

The area of the capacitance detection electrode 298 is referred to as S (μm²), the thickness of the capacitance detection dielectric film 299 is referred to as td (μm), and the relative dielectric constant of the capacitance detection dielectric film 299 is referred to as $\in$d. The capacitance of the capacitor $C_D$ is expressed as follows.

$$C_D = \in o \cdot \in d \cdot S/td$$

In the equivalent circuit shown in FIG. 34, a voltage $V_{GV}$ applied to the gate of the signal amplification TFT 246 is expressed by the following equation (1).

$$V_{GT} = Vdd/(1 + C_D/C_T) \quad (1)$$

If the capacitance of the capacitor $C_D$ is set sufficiently greater than the capacitance of the transistor capacitor $C_T$ ($C_D > 10 \times C_T$, for example), the denominator in the equation (1) becomes very large, whereby $V_{GT}$ is approximated as shown by the following equation (2).

$$V_{GT} \approx 0 \quad (2)$$

As a result, the signal amplification TFT 246 is in an OFF state since almost no voltage is applied to the gate of the signal amplification TFT 246. Therefore, a current I which flows between the source and the drain of the signal amplification TFT 246 becomes extremely small. The measurement point can be judged to be the ridge (projecting section) of the fingerprint pattern by measuring the current I.

(2) Case Where Furrow (Recess Section) of Fingerprint Faces Capacitance Detection Dielectric Film 299

Figure 35:
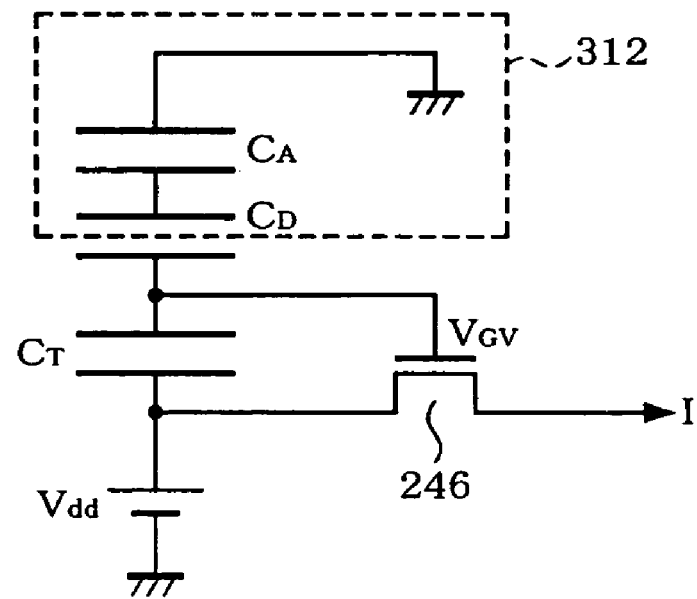
FIG. 35 is an equivalent circuit diagram of an electrostatic capacitance detection element when a furrow of a fingerprint faces a dielectric film of a fingerprint sensor.

FIG. 35 shows an equivalent circuit of the capacitance detection element 244 in this case.

A symbol 312 corresponds to a furrow of a human fingerprint. In this case, a capacitor $C_A$ having air as a dielectric is formed between the dielectric film 299 and the furrow of the fingerprint in addition to the capacitor $C_D$ shown in FIG. 34.

In the equivalent circuit shown in FIG. 35, a voltage $V_{GV}$ applied to the gate of the signal amplification TFT 246 is expressed by the following equation (3).

$$V_{GV} = Vdd/\{[1 + (1/C_T)] \times 1/[(1/C_D) + (1/C_A)]\} \quad (3)$$

If the capacitance of the capacitor $C_D$ is set sufficiently greater than the capacitance of the transistor capacitor $C_T$ ($C_D > 10 \times C_T$, for example), the equation (3) is approximated as shown by the following equation (4).

$$V_{GV} \approx Vdd/[1 + (C_A/C_T)] \quad (4)$$

If the capacitance of the transistor capacitor $C_T$ is set sufficiently greater than the capacitance of the capacitor $C_A$ formed by the furrow of the fingerprint ($C_T > 10 \times C_A$, for example), the equation (4) is approximated as shown by the following equation (5).

$$V_{GV} \approx Vdd \quad (5)$$

As a result, the signal amplification TFT 246 is in an ON state since the power supply voltage Vdd is applied to the gate of the signal amplification TFT 246. Therefore, the current I which flows between the source and the drain of the signal amplification TFT 246 is extremely increased. Therefore, the measurement point can be judged to be the furrow (recess section) of the fingerprint pattern by measuring the current I.

The variable capacitor $C_F$ shown in FIG. 32 has a capacitance equal to the capacitance of the capacitor $C_D$ when the ridge of the fingerprint is in contact with the capacitance detection dielectric film 299, and has a capacitance equal to the sum of the capacitance of the capacitor $C_D$ and the capacitance of the capacitor $C_A$ when the furrow of the fingerprint faces the capacitance detection dielectric film 299. Therefore, the capacitance of the variable capacitor $C_F$ varies corresponding to the ridge and furrow of the fingerprint. The ridge or furrow of the fingerprint can be detected by detecting the current based on the change in capacitance corresponding to the ridge or furrow of the fingerprint.

Figures 36A, 36B:
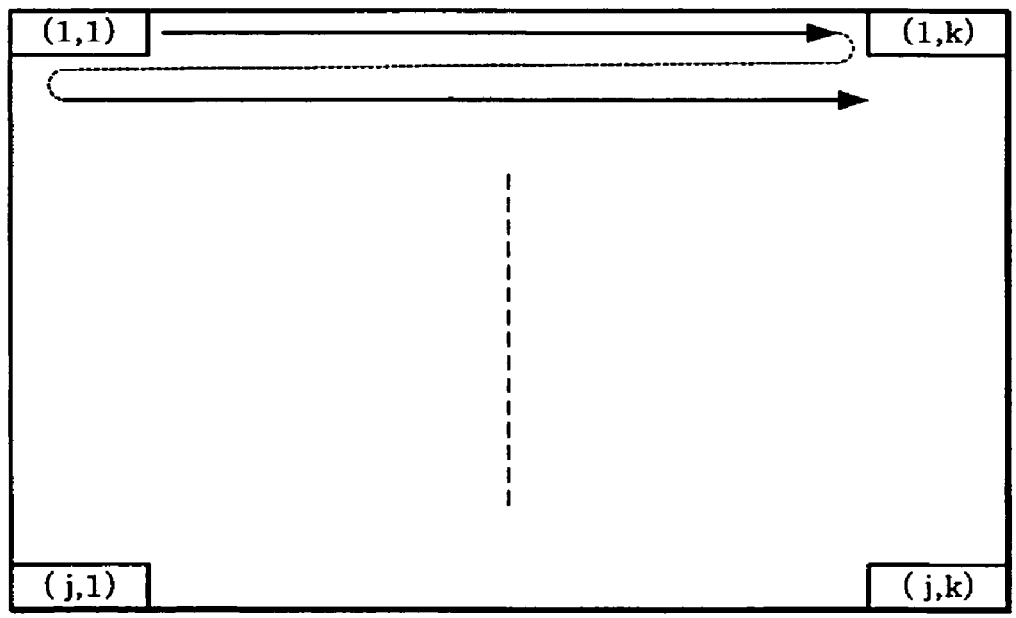
FIG. 36A is a diagram illustrating capacitance detection elements arranged in a fingerprint sensor.
FIG. 36B is a diagram illustrating a procedure for generating a fingerprint image from ridges and furrows of a fingerprint detected by the capacitance detection elements.

The fingerprint pattern can be detected by performing the above-described operation in the j×k ((1,1) to (j,k)) capacitance detection elements 244 arranged as shown in FIG. 36A by time division. In more detail, as shown in FIG. 36B, the ridge or furrow of the fingerprint in the first row is detected in the order from the capacitance detection element located at (1,1) to the capacitance detection element located at (1,k), and the ridge or furrow of the fingerprint in the second row is detected in the order from the capacitance detection element located at (2,1) to the capacitance detection element located at (2,k). The ridge or furrow of the fingerprint is sequentially detected in pixel units until the ridge or furrow is detected from the capacitance detection element located at (j,k). This enables a fingerprint image as shown in FIG. 2 to be obtained, for example.

In the case where a positive power supply is used as the power supply voltage Vdd, the signal amplification TFT 246 is formed by using an enhancement n-type transistor in which a drain current does not flow at a gate voltage of about zero. Provided that the gate voltage at which the drain current is minimum (minimum gate voltage) in the transfer characteristics of the signal amplification TFT 246 is Vmin, $C_D > 10 \times C_T$ is satisfied by satisfying $0 < Vmin < 0.1 \times Vdd$.

In the case where a negative power supply is used as the power supply voltage Vdd, the signal amplification TFT 246 is formed by using an enhancement p-type transistor in which a drain current does not flow at a gate voltage of about zero. Provided that the gate voltage at which the drain current is minimum (minimum gate voltage) in the transfer characteristics of the signal amplification TFT 246 is Vmin, $C_D > 10 \times C_T$ is satisfied by satisfying $0.1 \times Vdd < Vmin < 0$.

Figure 37:
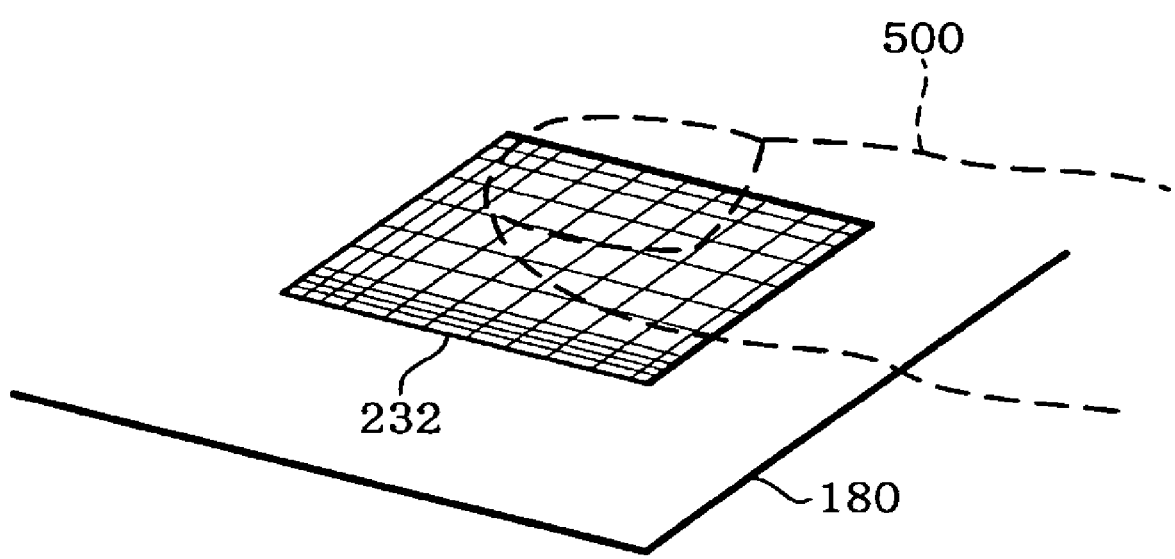
FIG. 37 is a schematic view showing a finger of an operator who performs fingerprint verification by using a fingerprint sensor which is applied to an IC card.

The fingerprint sensor 232 which is mounted on the IC card 180 can be reduced in size and weight as shown in FIG. 37. A high accuracy fingerprint image is acquired with low power consumption by pressing a finger 500 of an operator against the detection surface on which the capacitance detection dielectric film 299 shown in FIG. 33 is formed.

The present invention is not limited to the above-described embodiment. Various modifications and variations are possible within the spirit and scope of the present invention.

Part of requirements of any claim of the present invention could be omitted from a dependent claim which depends on that claim. Moreover, part of requirements of any independent claim of the present invention could be made to depend on any other independent claim.

The above-described embodiments disclose the features listed below.

One embodiment of the present invention provides a fingerprint verification method using a fingerprint image, the method including:

extracting $N_D$ sample feature points ($N_D$ is an integer greater than or equal to four) from a fingerprint image that has been sampled;

assigning a sample numerical values to each of the sample feature points as sample numerical value information, the sample numerical values being obtained from a plurality of sample connection lines, which connect each of the sample feature points with $L_D$ close sample feature points ($2 \leq L_D \leq N_D - 1$, $L_D$ is an integer) which are close to each of the sample feature points;

based on results of comparison between the sample numerical value information and registration numerical value information which is registration numerical values assigned to each of $N_R$ registration feature points ($N_R$ is an integer greater than or equal to four), associating m sample feature points ($3 \leq m \leq N_D$ and $3 \leq m \leq N_R$, m is an integer) among the $N_D$ sample feature points with m registration feature points among the $N_R$ registration feature points; and comparing a position relationship among the m sample feature points with a position relationship among the m registration feature points.

The $L_D$ close sample feature points close to each of the sample feature points are $L_D$ sample feature points close to the sample feature point other than the sample feature point.

In this embodiment, the sample numerical values generated based on the position relationship between the extracted sample feature point and the $L_D$ close sample feature points are assigned to each of the extracted sample feature points. The sample numerical values are compared with the registration numerical values in the registration numerical value information for each of the extracted sample feature points, and the m sample feature points are associated with the m registration feature points, respectively. The position relationship among the m sample feature points is compared with the position relationship among the m registration feature points, whereby an individual is authenticated.

This makes it unnecessary to compare all the sample feature points with the registration feature points, whereby the verification can be performed with a reduced processing load. Moreover, occurrence of a contingent incident in which a person is authenticated as a registered different person merely by the comparison of the numerical value information is eliminated, whereby fingerprint verification in which a high degree of security is maintained can be realized.

Another embodiment of the present invention provides a fingerprint verification method using a fingerprint image, the method including:

extracting $N_D$ sample feature points ($N_D$ is an integer greater than or equal to four) from a fingerprint image that has been sampled;

assigning a sample numerical values to each of the sample feature points as sample numerical value information, the sample numerical values being obtained from a plurality of sample connection lines, which connect each of the sample feature points with $L_D$ close sample feature points ($2 \leq L_D \leq N_D - 1$, $L_D$ is an integer) which are close to each of the sample feature points;

comparing each of sample numerical values assigned to each of the sample feature points with each of registration numerical values assigned to each of $N_R$ registration feature points ($N_R$ is an integer greater than or equal to four), and assigning one registration feature point among the $N_R$ registration feature points to one sample numerical value among the sample numerical values which coincides with one registration numerical value among the registration numerical values, the one registration numerical value being assigned to the one registration feature point;

associating the m sample feature points ($3 \leq m \leq N_D$ and $3 \leq m \leq N_R$, m is an integer) with the m registration feature points, respectively, using the registration feature points assigned to the sample numerical values; and comparing a position relationship among the m sample feature points with a position relationship among the m registration feature points.

In this embodiment, the sample numerical values generated based on the position relationship between an extracted sample feature point and each of the $L_D$ close sample feature points are assigned to each of the extracted sample feature points. Each of the sample numerical values assigned to each of the sample feature points is compared with each of the registration numerical values assigned to each of the registration feature points, and a registration feature point is assigned to a sample numerical value which coincides with a registration numerical value that is assigned to the registration feature point assigned to the sample numerical value. The sample feature points of m numbers are associated with the registration feature points of m numbers using the registration feature point assigned to each of the sample feature points. The position relationship among the m sample feature points is then compared with the position relationship among the m registration feature points, whereby an individual is authenticated.

Therefore, the load of complicated processing for searching for the area and the direction in the distribution of the registered feature points to which the extracted sample feature point corresponds can be significantly reduced by the comparison processing of the numerical value information assigned to the registration feature point and the sample feature point. Moreover, occurrence of a contingent incident in which a person is authenticated as a registered different person merely by the comparison of the numerical value information is eliminated by comparing the position relationships among the feature points after the sample feature points are associated with the registration feature points, whereby fingerprint verification in which a high degree of security is maintained can be realized.

This fingerprint verification method may include:

deleting a sample feature point among the $N_D$ sample feature points which has the sample numerical values that have not been assigned with the registration feature points at a percentage equal to or greater than a first percentage;

associating the m sample feature points with the m registration feature points, respectively, using the registration feature points assigned to the sample numerical values of the sample feature points excluding the deleted sample feature point; and comparing the position relationship among the m sample feature points with the position relationship among the m registration feature points.

In this embodiment, the sample feature point that has sample numerical values to which no registration feature point is assigned at a percentage equal to or greater than the first percentage, is deleted, and the position relationship among the sample feature points and the position relationship among the registration feature points associated with the sample feature points are compared. This enables accuracy of the verification processing of the feature points to be significantly improved by reutilizing the numerical value information based on the position relationship between the deleted sample feature point and each of the close sample feature points, for example.

This fingerprint verification method may include:

associating a registration feature points among the $N_R$ registration feature points with a sample feature point among the $N_D$ sample feature points, the registration feature point being assigned in common to a second percentage or more of the sample numerical values assigned to the sample feature points; and when the number of sample feature points associated with the registration feature points is m or more, comparing the position relationship among the m or more sample feature points with the position relationship among the registration feature points associated with the m or more sample feature points.

In this embodiment, in the case where the registration feature point assigned to the sample numerical values merely by the comparison processing of the numerical value information is commonly assigned to the second percentage or more of the sample numerical values assigned to one sample feature point, that sample feature point is associated with that registration feature point. This enables accuracy of verification to be further improved, whereby occurrence of a contingent incident in which a person is authenticated as a registered different person merely by the comparison of the numerical value information can be eliminated.

This fingerprint verification method may include:

deleting a sample feature point among the $N_D$ sample feature points which has the sample numerical values that have not been assigned with the registration feature points at a percentage equal to or greater than a first percentage;

associating a registration feature points among the $N_R$ registration feature points with a sample feature point among the $N_D$ sample feature points, the registration feature point being assigned in common to a second percentage or more of the sample numerical values assigned to the sample feature points excluding the deleted sample feature point; and when the number of sample feature points associated with the registration feature points is m or more, comparing the position relationship among the m or more sample feature points with the position relationship among the registration feature points associated with the m or more sample feature points.

According to this embodiment, the load of complicated processing for searching for the area and the direction in the distribution of the registered feature points to which the extracted sample feature point corresponds can be significantly reduced by the comparison processing of the numerical value information assigned to the registration feature point and the sample feature point. Moreover, occurrence of a contingent incident in which a person is authenticated as a registered different person merely by the comparison of the numerical value information is eliminated by comparing the position relationships among the feature points after the sample feature points are associated with the registration feature points, whereby fingerprint verification in which a high degree of security is maintained can be realized.

Furthermore, since a sample feature point is associated with a registration feature point in the case where that registration feature point is commonly assigned to the second percentage or more of the sample numerical values assigned to that sample feature point, accuracy of comparison can be further improved while reducing the processing load.

This fingerprint verification method may include:

assigning the registration numerical values to each of the registration feature points, the registration numerical values being obtained from a plurality of registration connection lines, which connect each of the $N_R$ registration feature points extracted from a fingerprint image to be registered with $L_R$ close registration feature points ($2 \leq L_R \leq N_R - 1$, $L_R$ is an integer) which are close to each of the registration feature points.

According to this embodiment, implementation of the fingerprint verification processing in which accuracy of comparison is increased and the processing load is reduced by a device can be facilitated by assigning the registration numerical value information created by the same method as the sample numerical values assigned to the sample feature point to each of the registration feature points before extracting the sample feature points.

In the fingerprint verification method according to this embodiment, $L_R$ is preferably equal to or greater than $L_D$. This enables accuracy of the registration numerical value information to be improved, whereby comparison between the registration numerical value information and the sample numerical value information can be facilitated, and accuracy of comparison can be improved.

With this fingerprint verification method, registration numerical values may include lengths of the registration connection lines, and the sample numerical values may include lengths of the sample connection lines.

With this fingerprint verification method, the registration numerical values may include angles formed by the registration connection lines, and the sample numerical values may include angles formed by the sample connection lines.

With this fingerprint verification method, the registration numerical values may include lengths of the registration connection lines and angles formed by the registration connection lines, and the sample numerical values may include lengths of the sample connection lines and angles formed by the sample connection lines.

According to one of these embodiments, the numerical value information corresponding to the position relationship between each of the feature points and other feature points can be assigned to each of the sample feature points and each of the registration feature points, whereby the information characteristic of the feature point can be assigned. Moreover, since the sample numerical value information assigned to a sample feature point and the registration numerical value information assigned to a registration feature point can be calculated by using simple processing, the load of the fingerprint verification processing can be significantly reduced.

With this fingerprint verification method, in a case where the registration connection lines connected at each of the registration feature points as a starting point are registration vectors starting from each of the registration feature points, the registration numerical values may include inner products formed by the registration vectors, and in a case where the sample connection lines connected at each of the sample feature points as a starting point are sample vectors starting from each of the sample feature points, the sample numerical values may include inner products formed by the sample vectors.

According to this embodiment, since the numerical value information is compared by using the registration numerical values including the inner products formed by the registration vectors and the sample numerical values including the inner products formed by the sample vectors, accuracy of fingerprint comparison can be increased, and the amount of numerical value information can be reduced.

With this fingerprint verification method, the registration numerical values may include numbers of fingerprint ridges which intersect the registration connection lines, and the sample numerical values may include numbers of fingerprint ridges which intersect the sample connection lines.

According to this embodiment, the pattern of the fingerprint ridges which differs between individuals is expressed by the distribution of the registration feature points and the distribution of the sample feature points as the numerical value information by using the numbers of fingerprint ridges which intersect the registration connection lines and the sample connection lines. Therefore, the amount of numerical value information can be reduced, and accuracy of comparison can be increased.

With this fingerprint verification method, the registration numerical values may include numbers of fingerprint ridges which intersect the registration connection lines and angles formed by the registration connection lines, and the sample numerical values may include numbers of fingerprint ridges which intersect the sample connection lines and angles formed by the sample connection lines.

According to this embodiment, since the angles formed by the registration connection lines and the angles formed by the sample connection lines are included in the numerical value information in addition to the numbers of fingerprint ridges, accuracy of fingerprint comparison can be further improved.

With the fingerprint verification method, in a case where registration ridge vectors starting from each of the registration feature points are defined by using numbers of fingerprint ridges which intersect the registration connection lines as vector lengths, the registration numerical values may include inner products formed by the registration ridge vectors, and in a case where sample ridge vectors starting from each of the sample feature points are defined by using numbers of fingerprint ridges which intersect the sample connection lines as vector lengths, the sample numerical values may include inner products formed by the sample ridge vectors.

According to this embodiment, since the comparison is performed by using the numerical value information including the inner products formed by the vectors having the number of fingerprint ridges as the vector length, the amount of numerical value information necessary for the comparison processing can be reduced.

With this fingerprint verification method, a real number unit value may be assigned to one of the registration feature points in a case where the one registration feature point is a first feature point, and an imaginary number unit value may be assigned to the one registration feature point in a case where the one registration feature point is a second feature point, the registration numerical values may include a product of the real number unit value or the imaginary number unit value assigned to each of the registration feature points located on both ends of each of the registration connection lines and a length of each of the registration connection lines, a real number unit value may be assigned to one of the sample feature points in a case where the one sample feature point is the first feature point, and an imaginary number unit value may be assigned to the one sample feature point in a case where the one sample feature point is the second feature point, and the sample numerical values may include a product of the real number unit value or the imaginary number unit value assigned to each of the sample feature points located on both ends of each of the sample connection lines and a length of each of the sample connection lines.

With this fingerprint verification method, a real number unit value may be assigned to one of the registration feature points in a case where the one registration feature point is a first feature point, and an imaginary number unit value may be assigned to the one registration feature point in a case where the one registration feature point is a second feature point, the registration numerical values may include a product of an angle formed by two of the registration connection lines and the real number unit value or the imaginary number unit value assigned to each of the registration feature points located on both ends of the two registration connection lines, a real number unit value may be assigned to one of the sample feature points in a case where the one sample feature point is the first feature point, and an imaginary number unit value may be assigned to the one sample feature point in a case where the one sample feature point is the second feature point, and the sample numerical values may include a product of an angle formed by two of the sample connection lines and the real number unit value or the imaginary number unit value assigned to each of the sample feature points located on both ends of the two sample connection lines.

With this fingerprint verification method, a real number unit value may be assigned to one of the registration feature points in a case where the one registration feature point is a first feature point, and an imaginary number unit value may be assigned to the one registration feature point in a case where the one registration feature point is a second feature point, the registration numerical values may include a product of the real number unit value or the imaginary number unit value assigned to each of the registration feature points located on both ends of each of the registration connection lines and a length of each of the registration connection lines and a product of an angle formed by two of the registration connection lines and the real number unit value or the imaginary number unit value assigned to each of the registration feature points located on both ends of the two registration connection lines, a real number unit value may be assigned to one of the sample feature points in a case where the one sample feature point is the first feature point, and an imaginary number unit value may be assigned to the one sample feature point in a case where the one sample feature point is the second feature point, and the sample numerical values may include a product of the real number unit value or the imaginary number unit value assigned to each of the sample feature points located on both ends of each of the sample connection lines and a length of each of the sample connection lines and a product of an angle formed by two of the sample connection lines and the real number unit value or the imaginary number unit value assigned to each of the sample feature points located on both ends of the two sample connection lines.

With this fingerprint verification method, a real number unit value may be assigned to one of the registration feature points in a case where the one registration feature point is a first feature point, and an imaginary number unit value may be assigned to the one registration feature point in a case where the one registration feature point is a second feature point, in a case where the registration connection lines connected at each of the registration feature points as a starting point are registration vectors starting from each of the registration feature points, the registration numerical values may include a product of inner products formed by the registration vectors and the real number unit value or the imaginary number unit value assigned to each of the registration feature points located at a starting point and an end point of the registration vectors, a real number unit value may be assigned to one of the sample feature points in a case where the one sample feature point is the first feature point, and an imaginary number unit value may be assigned to the one sample feature point in a case where the one sample feature point is the second feature point, and in a case where the sample connection lines connected at each of the sample feature points as a starting point are sample vectors starting from each of the sample feature points, the sample numerical values may include a product of inner products formed by the sample vectors and the real number unit value or the imaginary number unit value assigned to each of the sample feature points located at a starting point and an end point of the sample vectors.

With this fingerprint verification method, a real number unit value may be assigned to one of the registration feature points in a case where the one registration feature point is a first feature point, and an imaginary number unit value may be assigned to the one registration feature point in a case where the one registration feature point is a second feature point, the registration numerical values may include a product of the real number unit value or the imaginary number unit value assigned to each of the registration feature points located on both ends of each of the registration connection lines and number of fingerprint ridges which intersect the registration connection lines, a real number unit value may be assigned to one of the sample feature points in a case where the one sample feature point is the first feature point, and an imaginary number unit value may be assigned to the one sample feature point in a case where the one sample feature point is the second feature point, and the sample numerical values may include a product of the real number unit value or the imaginary number unit value assigned to each of the sample feature points located on both ends of each of the sample connection lines and number of fingerprint ridges which intersect the sample connection lines.

With this fingerprint verification method, a real number unit value may be assigned to one of the registration feature points in a case where the one registration feature point is a first feature point, and an imaginary number unit value may be assigned to the one registration feature point in a case where the one registration feature point is a second feature point, in a case where registration ridge vectors starting from each of the registration feature points are defined by using numbers of fingerprint ridges which intersect the registration connection lines as vector lengths, the registration numerical values may include a product of inner products formed by the registration ridge vectors and the real number unit value or the imaginary number unit value assigned to each of the registration feature points located at a starting point and an end point of each of the registration vectors, a real number unit value may be assigned to one of the sample feature points in a case where the one sample feature point is the first feature point, and an imaginary number unit value may be assigned to the one sample feature point in a case where the one sample feature point is the second feature point, and in a case where sample ridge vectors starting from each of the sample feature points are defined by using numbers of fingerprint ridges which intersect the sample connection lines as vector lengths, the sample numerical values may include a product of inner products formed by the sample ridge vectors and the real number unit value or the imaginary number unit value assigned to each of the sample feature points located at a starting point and an end point of each of the sample vectors.

In one of these embodiments, the numerical value information corresponding to the position relationship between each of the feature points and other sample feature points and other registration feature points can be assigned to each of the sample feature points and each of the registration feature points. Therefore, the information characteristic of the feature point can be assigned. Moreover, the distribution of the extracted feature points is specified by the numerical value information group expressed by a real number or a complex number. Therefore, even if the lengths of the line segments which connect a feature point with other feature points are the same, different pieces of numerical value information can be assigned to the feature point if the types of the feature points located on the ends are different. This means that the results for comparison between the sample feature points and the registration feature points can be obtained with high accuracy.

With this fingerprint verification method, the first feature point may be a terminal point of a fingerprint ridge, and the second feature point may be a branch point of a fingerprint ridge.

With this fingerprint verification method, the first feature point may be a branch point of a fingerprint ridge, and the second feature point may be a terminal point of a fingerprint ridge.

According to one of these embodiments, since the branch point and the terminal point, which are common as the pattern of the fingerprint ridges, are classified as the types of each of the feature points and reflected in the numerical value information assigned to each of the feature points, processing for calculating the branch point and the terminal point can be applied, and a fingerprint verification method having high verification accuracy can be provided.

A further embodiment of the present invention provides a fingerprint verification device comprising:

a feature point extraction section which extracts $N_D$ sample feature points ($N_D$ is an integer greater than or equal to four) from a fingerprint image;

an image analysis section which assigns a sample numerical values to each of the sample feature points as sample numerical value information, the sample numerical values being obtained from a plurality of sample connection lines, which connect each of the sample feature points with $L_D$ close sample feature points ($2 \leq L_D \leq N_D-1$, $L_D$ is an integer) which are close to each of the sample feature points, and based on results of comparison between the sample numerical value information and registration numerical value information which is registration numerical values assigned to each of $N_R$ registration feature points ($N_R$ is an integer greater than or equal to four), associates m sample feature points ($3 \leq m \leq N_D$ and $3 \leq m \leq N_R$, m is an integer) among the $N_D$ sample feature points with m registration feature points among the $N_R$ registration feature points; and a comparison section which compares a position relationship among the m sample feature points with a position relationship among the m registration feature points.

This fingerprint verification device may further include a fingerprint image capture section which captures the fingerprint image.

This fingerprint verification device may further include:

a registration section which generates the registration numerical value information, and the registration section may generate the registration numerical value information which is numerical values obtained from a plurality of registration connection lines, which connect each of the $N_R$ registration feature points extracted from a fingerprint image to be registered with $L_R$ close registration feature points ($2 \leq L_R \leq N_R-1$, $L_R$ is an integer) which are close to each of the registration feature points, and is assigned to each of the registration feature points.

With this fingerprint verification device, $L_R$ may be equal to or greater than $L_D$.

What is claimed is:

1. A fingerprint verification method using a fingerprint image, the method comprising:

extracting $N_D$ sample feature points ($N_D$ is an integer greater than or equal to four) from a fingerprint image that has been sampled;

assigning sample numerical values to each of the sample feature points as sample numerical value information, the sample numerical values being obtained from a plurality of sample connection lines, which connect each of the sample feature points with $L_D$ close sample feature points ($2 \leq L_D \leq N_D-1$, $L_D$ is an integer) which are close to each of the sample feature points;

comparing each of the sample numerical values assigned to each of the sample feature points with each of registration numerical values assigned to each of $N_R$ registration feature points ($N_R$ is an integer greater than or equal to four), and assigning a registration feature point among the $N_R$ registration feature points which corresponds to a registration numerical value that coincides with a sample numerical value among the sample numerical values to the coincided sample numerical value;

deleting a sample feature point among the $N_D$ sample feature points which has sample numerical values that have not been assigned with the registration feature points at a percentage equal to or greater than a first percentage;

associating one registration feature point among the assigned registration feature points with only a sample feature point among the remaining sample feature points excluding the deleted sample feature point, the sample feature point including sample numerical values that have been assigned in common at a second percentage or more to the one register feature point; and when the number of sample feature points associated with the registration feature points is m or more (m is an integer defined as $3 \leq m \leq N_D$ and $3 \leq m \leq N_R$), comparing a position relationship among the m or more sample feature points with the position relationship among the registration feature points associated with the m or more sample feature points.

2. The fingerprint verification method as defined in claim 1, comprising:

assigning the registration numerical values to each of the registration feature points, the registration numerical values being obtained from a plurality of registration connection lines, which connect each of the $N_R$ registration feature points extracted from a fingerprint image to be registered with $L_R$ close registration feature points ($2 \leq L_R \leq N_R-1$, $L_R$ is an integer) which are close to each of the registration feature points.

3. The fingerprint verification method as defined in claim 2, wherein $L_R$ is equal to or greater than $L_D$.

4. The fingerprint verification method as defined in claim 2, wherein registration numerical values include lengths of the registration connection lines, and wherein the sample numerical values include lengths of the sample connection lines.

5. The fingerprint verification method as defined in claim 2, wherein the registration numerical values include angles formed by the registration connection lines, and wherein the sample numerical values include angles formed by the sample connection lines.

6. The fingerprint verification method as defined in claim 2, wherein the registration numerical values include lengths of the registration connection lines and angles formed by the registration connection lines, and wherein the sample numerical values include lengths of the sample connection lines and angles formed by the sample connection lines.

7. The fingerprint verification method as defined in claim 2, wherein, in a case where the registration connection lines connected at each of the registration feature points as a starting point are registration vectors starting from each of the registration feature points, the registration numerical values include inner products formed by the registration vectors, and wherein, in a case where the sample connection lines connected at each of the sample feature points as a starting point are sample vectors starting from each of the sample feature points, the sample numerical values include inner products formed by the sample vectors.

8. The fingerprint verification method as defined in claim 2, wherein the registration numerical values include numbers of fingerprint ridges which intersect the registration connection lines, and wherein the sample numerical values include numbers of fingerprint ridges which intersect the sample connection lines.

9. The fingerprint verification method as defined in claim 2,
wherein the registration numerical values include numbers of fingerprint ridges which intersect the registration connection lines and angles formed by the registration connection lines, and
wherein the sample numerical values include numbers of fingerprint ridges which intersect the sample connection lines and angles formed by the sample connection lines.

10. The fingerprint verification method as defined in claim 2,
wherein, in a case where registration ridge vectors starting from each of the registration feature points are defined by using numbers of fingerprint ridges which intersect the registration connection lines as vector lengths, the registration numerical values include inner products formed by the registration ridge vectors, and
wherein, in a case where sample ridge vectors starting from each of the sample feature points are defined by using numbers of fingerprint ridges which intersect the sample connection lines as vector lengths, the sample numerical values include inner products formed by the sample ridge vectors.

11. The fingerprint verification method as defined in claim 2,
wherein a real number unit value is assigned to one of the registration feature points in a case where the one registration feature point is a first feature point, and an imaginary number unit value is assigned to the one registration feature point in a case where the one registration feature point is a second feature point,
wherein the registration numerical values include a product of the real number unit value or the imaginary number unit value assigned to each of the registration feature points located on both ends of each of the registration connection lines and a length of each of the registration connection lines,
wherein a real number unit value is assigned to one of the sample feature points in a case where the one sample feature point is the first feature point, and an imaginary number unit value is assigned to the one sample feature point in a case where the one sample feature point is the second feature point, and
wherein the sample numerical values include a product of the real number unit value or the imaginary number unit value assigned to each of the sample feature points located on both ends of each of the sample connection lines and a length of each of the sample connection lines.

12. The fingerprint verification method as defined in claim 2,
wherein a real number unit value is assigned to one of the registration feature points in a case where the one registration feature point is a first feature point, and an imaginary number unit value is assigned to the one registration feature point in a case where the one registration feature point is a second feature point,
wherein the registration numerical values include a product of an angle formed by two of the registration connection lines and the real number unit value or the imaginary number unit value assigned to each of the registration feature points located on both ends of the two registration connection lines,
wherein a real number unit value is assigned to one of the sample feature points in a case where the one sample feature point is the first feature point, and an imaginary number unit value is assigned to the one sample feature point in a case where the one sample feature point is the second feature point, and
wherein the sample numerical values include a product of an angle formed by two of the sample connection lines and the real number unit value or the imaginary number unit value assigned to each of the sample feature points located on both ends of the two sample connection lines.

13. The fingerprint verification method as defined in claim 2,
wherein a real number unit value is assigned to one of the registration feature points in a case where the one registration feature point is a first feature point, and an imaginary number unit value is assigned to the one registration feature point in a case where the one registration feature point is a second feature point,
wherein the registration numerical values include a product of the real number unit value or the imaginary number unit value assigned to each of the registration feature points located on both ends of each of the registration connection lines and a length of each of the registration connection lines and a product of an angle formed by two of the registration connection lines and the real number unit value or the imaginary number unit value assigned to each of the registration feature points located on both ends of the two registration connection lines,
wherein a real number unit value is assigned to one of the sample feature points in a case where the one sample feature point is the first feature point, and an imaginary number unit value is assigned to the one sample feature point in a case where the one sample feature point is the second feature point, and
wherein the sample numerical values include a product of the real number unit value or the imaginary number unit value assigned to each of the sample feature points located on both ends of each of the sample connection lines and a length of each of the sample connection lines and a product of an angle formed by two of the sample connection lines and the real number unit value or the imaginary number unit value assigned to each of the sample feature points located on both ends of the two sample connection lines.

14. The fingerprint verification method as defined in claim 2,
wherein a real number unit value is assigned to one of the registration feature points in a case where the one registration feature point is a first feature point, and an imaginary number unit value is assigned to the one registration feature point in a case where the one registration feature point is a second feature point,
wherein, in a case where the registration connection lines connected at each of the registration feature points as a starting point are registration vectors starting from each of the registration feature points, the registration numerical values include a product of inner products formed by the registration vectors and the real number unit value or the imaginary number unit value assigned to each of the registration feature points located at a starting point and an end point of the registration vectors, wherein a real number unit value is assigned to one of the sample feature points in a case where the one sample feature point is the first feature point, and an imaginary number unit value is assigned to the one sample feature point in a case where the one sample feature point is the second feature point, and wherein, in a case where the sample connection lines connected at each of the sample feature points as a starting point are sample vectors starting from each of the sample feature points, the sample numerical values include a product of inner products formed by the sample vectors and the real number unit value or the imaginary number unit value assigned to each of the sample feature points located at a starting point and an end point of the sample vectors.

15. The fingerprint verification method as defined in claim 2, wherein a real number unit value is assigned to one of the registration feature points in a case where the one registration feature point is a first feature point, and an imaginary number unit value is assigned to the one registration feature point in a case where the one registration feature point is a second feature point, wherein the registration numerical values include a product of the real number unit value or the imaginary number unit value assigned to each of the registration feature points located on both ends of each of the registration connection lines and number of fingerprint ridges which intersect the registration connection lines, wherein a real number unit value is assigned to one of the sample feature points in a case where the one sample feature point is the first feature point, and an imaginary number unit value is assigned to the one sample feature point in a case where the one sample feature point is the second feature point, and wherein the sample numerical values include a product of the real number unit value or the imaginary number unit value assigned to each of the sample feature points located on both ends of each of the sample connection lines and number of fingerprint ridges which intersect the sample connection lines.

16. The fingerprint verification method as defined in claim 2, wherein a real number unit value is assigned to one of the registration feature points in a case where the one registration feature point is a first feature point, and an imaginary number unit value is assigned to the one registration feature point in a case where the one registration feature point is a second feature point, wherein, in a case where registration ridge vectors starting from each of the registration feature points are defined by using numbers of fingerprint ridges which intersect the registration connection lines as vector lengths, the registration numerical values include a product of inner products formed by the registration ridge vectors and the real number unit value or the imaginary number unit value assigned to each of the registration feature points located at a starting point and an end point of each of the registration vectors, wherein a real number unit value is assigned to one of the sample feature points in a case where the one sample feature point is the first feature point, and an imaginary number unit value is assigned to the one sample feature point in a case where the one sample feature point is the second feature point, and wherein, in a case where sample ridge vectors starting from each of the sample feature points are defined by using numbers of fingerprint ridges which intersect the sample connection lines as vector lengths, the sample numerical values include a product of inner products formed by the sample ridge vectors and the real number unit value or the imaginary number unit value assigned to each of the sample feature points located at a starting point and an end point of each of the sample vectors.

17. The fingerprint verification method as defined in claim 11, wherein the first feature point is a terminal point of a fingerprint ridge, and the second feature point is a branch point of a fingerprint ridge.

18. The fingerprint verification method as defined in claim 11, wherein the first feature point is a branch point of a fingerprint ridge, and the second feature point is a terminal point of a fingerprint ridge.

* * * * *